US010904872B2

(12) United States Patent
Ren et al.

(10) Patent No.: US 10,904,872 B2
(45) Date of Patent: Jan. 26, 2021

(54) COMMUNICATION METHOD AND APPARATUS, AND SYSTEM

(71) Applicant: HUAWEI TECHNOLOGIES CO., LTD., Guangdong (CN)

(72) Inventors: Haibao Ren, Shanghai (CN); Na Deng, Shenzhen (CN); Ting Wang, Shanghai (CN); Yi Huang, Shenzhen (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/221,280

(22) Filed: Dec. 14, 2018

(65) Prior Publication Data

US 2019/0124631 A1 Apr. 25, 2019

Related U.S. Application Data

(63) Continuation of application No. PCT/CN2017/088536, filed on Jun. 15, 2017.

(30) Foreign Application Priority Data

Jun. 29, 2016 (CN) .......................... 2016 1 0493668
Jan. 6, 2017 (CN) .......................... 2017 1 0010978

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/0038* (2013.01); *H04L 5/0035* (2013.01);
(Continued)

(58) Field of Classification Search
CPC ... H04L 1/0038; H04L 5/0023; H04L 5/0035; H04L 5/0048; H04L 5/0053;
(Continued)

(56) References Cited

U.S. PATENT DOCUMENTS 9,325,472 B2   4/2016   Kim et al.
2012/0176884 A1   7/2012   Zhang et al.
(Continued)

FOREIGN PATENT DOCUMENTS

CN   102347919 A   2/2012
CN   102638851 A   8/2012
(Continued)

OTHER PUBLICATIONS

R1-1610895 Huawei et al.,"WF on DL MIMO Transmission",3GPP TSG RAN WG1 Meeting #86bis,Lisbon, Portugal, Oct. 10-14, 2016,total 3 pages.
(Continued)

*Primary Examiner* — Stephen J Clawson

(57) ABSTRACT

This application relates to a downlink control information indication method during coordinated multipoint transmission/reception in a wireless communications system. For a plurality of network side devices that send downlink data to user equipment on a same carrier and in a same subframe, downlink data transmission information used when the network side devices separately send the downlink data is indicated by using a plurality of pieces of downlink control information. Therefore, diversity transmission and/or multi-stream transmission in a multipoint coordination scenario are/is supported, and when the user equipment cannot normally receive downlink data sent by some network side devices because some downlink control information encounters an error, the user equipment may still receive, based on an indication of remaining downlink control infor-
(Continued)

mation that encounters no error, downlink data sent by a network side device corresponding to the remaining downlink control information that encounters no error.

19 Claims, 11 Drawing Sheets

(51) Int. Cl.
   *H04W 72/12* (2009.01)
   *H04W 76/27* (2018.01)
   *H04L 1/00* (2006.01)

(52) U.S. Cl.
   CPC .......... *H04L 5/0048* (2013.01); *H04L 5/0053* (2013.01); *H04W 72/0446* (2013.01); *H04W 72/0466* (2013.01); *H04W 72/12* (2013.01); *H04W 76/27* (2018.02); *H04L 5/0023* (2013.01); *H04L 5/0073* (2013.01); *H04L 5/0091* (2013.01)

(58) Field of Classification Search
   CPC ............... H04L 5/0073; H04L 5/0091; H04W 72/0446; H04W 72/0466; H04W 72/12; H04W 76/27
   See application file for complete search history.

(56) References Cited

U.S. PATENT DOCUMENTS

| | | | |
|---|---|---|---|
| 2012/0201163 A1* | 8/2012 | Jongren | H04W 24/10 370/252 |
| 2013/0114523 A1 | 5/2013 | Chatterjee et al. | |
| 2013/0178220 A1 | 7/2013 | Lee et al. | |
| 2013/0301542 A1* | 11/2013 | Krishnamurthy | H04W 52/50 370/329 |
| 2013/0308479 A1* | 11/2013 | Schober | H04L 1/20 370/252 |
| 2014/0036804 A1* | 2/2014 | Chen | H04L 5/0053 370/329 |
| 2014/0140316 A1 | 5/2014 | Nagata et al. | |
| 2014/0192734 A1 | 7/2014 | Ng et al. | |
| 2014/0313985 A1* | 10/2014 | Nimbalker | H04L 27/0012 370/329 |
| 2016/0028448 A1 | 1/2016 | Park et al. | |
| 2017/0230994 A1* | 8/2017 | You | H04W 72/042 |

FOREIGN PATENT DOCUMENTS

| | | |
|---|---|---|
| CN | 103312391 A | 9/2013 |
| CN | 103718599 A | 4/2014 |
| CN | 103947145 A | 7/2014 |
| CN | 104009820 A | 8/2014 |
| CN | 104919724 A | 9/2015 |
| CN | 105308878 A | 2/2016 |
| EP | 3557932 A1 | 10/2019 |
| EP | 3579482 A1 | 12/2019 |
| JP | 2016506690 A | 3/2016 |
| WO | 2012148170 A2 | 11/2012 |
| WO | 2013018639 A1 | 2/2013 |
| WO | 2018141246 A1 | 8/2018 |

OTHER PUBLICATIONS

R1-164911 Panasonic,"Discussion on Single level DCI and two-level DCI",3GPP TSG RAN WG1 Meeting #85, Nanjing, China May 23-27, 2016,total 5 pages.
RP-160665 Intel Corporation et al.,"New SID: Further enhancements to Coordinated Multi-Point Operation",3GPP TSG RAN Meeting #71,Göteborg, Sweden, Mar. 7-10, 2016,total 7 pages.
TS 36.212 V13.1.0 (Mar. 2016),3rd Generation Partnership Project;Technical Specification Group Radio Access Network;Evolved Universal Terrestrial Radio Access(E-UTRA);Multiplexing and channel coding(Release 13),total 129 pages.
Fujitsu,"DCI format to support CoMP in TM10",3GPP TSG RAN WG1 #70 bis R1-124124,San Diego, USA, Oct. 8-12, 2012,total 4 pages.
Notice of Reasons for Rejection for corresponding Japanese Patent Application 2019-536889, dated Aug. 3, 2020.
European Office Action issued in European Application No. 17 819 110.2 dated Sep. 7, 2020 (seven pages).

* cited by examiner (a)

(b)

(c)

COMMUNICATION METHOD AND APPARATUS, AND SYSTEM

CROSS-REFERENCE TO RELATED APPLICATIONS

This application is a continuation of International Application No. PCT/CN2017/088536, filed on Jun. 15, 2017, and claims priority to Chinese Patent Application No. 201610493668.3, filed on Jun. 29, 2016, and claims priority to Chinese Patent Application No. 201710010978.X, filed on Jan. 6, 2017. The disclosures of the aforementioned applications are hereby incorporated by reference in their entireties.

TECHNICAL FIELD

This application relates to the field of wireless communications technologies, and in particular, to a downlink control information indication method during coordinated multipoint transmission/reception in a wireless communications system.

BACKGROUND

A multiple input multiple output (MIMO) technology (may also be referred to as a multi-antenna technology) can improve system reliability through space diversity, increase a system capacity through spatial multiplexing, and improve cell coverage through beamforming. A physical layer basic technology of a Long Term Evolution (LTE) system includes the MIMO technology. A plurality of transmit antennas in a conventional centralized MIMO system are centralized on one station. Different from the centralized MIMO system, a plurality of transmit antennas in a distributed MIMO system are distributed at different geographical locations, and pairs of receiving and sending links of the transmit antennas are more independent of each other. Therefore, the distributed MIMO system has advantages such as a large capacity, low power consumption, larger coverage, and lower electromagnetic damage to a human body, and is considered as one of alternative solutions for a future wireless communications system. In a case of distributed MIMO, to improve signal reliability of edge users, a multipoint diversity coordinated transmission method may be considered. In addition, to increase a throughput of a cell, a multipoint multi-stream coordinated transmission method may be considered. The multipoint multi-stream coordinated transmission method is not limited to an edge user, and is particularly applicable to a scenario in which stations are dense and overlapped, that is, a user is covered by a plurality of base stations at the same time.

In the 3rd Generation Partnership Project (3GPP) Release 10, a new transmission mode, namely, a transmission mode 9, is introduced to LTE. The transmission mode 9 supports eight antenna ports and supports multi-user MIMO transmission. To support 8-antenna transmission, a base station needs to indicate, to a user on a physical downlink control channel (for example, a PDCCH in LTE, Physical Downlink Control Channel), information such as a quantity of layer, an antenna port, and a reference signal scrambling manner that are corresponding to physical downlink shared channel (for example, a PDSCH in LTE, Physical Downlink Shared Channel) data. User equipment (UE) may obtain, by detecting a corresponding indication field on the downlink control channel, information that downlink shared channel data received by the user equipment includes how many layers, an antenna port number corresponding to each layer, and the like. The user equipment performs channel estimation by using a reference signal sent by the antenna port, and then performs service data demodulation and decoding.

In 3GPP Release 11, to support coordinated multipoint transmission/reception, a concept of quasi co-location of antenna ports is introduced to LTE. In an LTE system, quasi co-location is quasi co-location (QCL), and it is defined as follows: Signals sent from QCL antenna ports have a same large-scale property. The large-scale property includes delay spread, Doppler spread, Doppler frequency shift, an average channel gain, and an average delay. In order that the user equipment receives downlink control information from a serving station by using the PDCCH, and receives downlink data from a coordinated station by using the PDSCH, a new transmission mode, namely, a transmission mode 10, is defined in Release 11. In the transmission mode 10, a physical downlink shared channel resource element mapping and quasi co-location indicator that is referred to as a PQI (PDSCH RE Mapping and QCL Indicator) in the LTE system, is mainly introduced to indicate, in the downlink control information, a station from which the downlink data is sent and a group of antenna ports whose channel large-scale property is consistent with that of the downlink data. The UE may learn, based on the PQI with reference to a PDSCH mapping information element configured by using radio resource control (RRC) signaling, that a radio channel parameter corresponding to which group of antenna ports needs to be used to demodulate the downlink data.

In a PQI information field indication manner in the downlink control information in the prior art, a PDSCH can be sent from only one group of QCL antenna ports, and a quantity of layer and an antenna port number that are corresponding to the PDSCH are based on a single cell (or a single station). For the distributed MIMO, such as multipoint multi-stream coordinated transmission or multipoint diversity coordinated transmission, the UE receives a plurality of PDSCHs from a plurality of stations at the same time, which cannot be supported by a downlink control information indication manner in the prior art. Therefore, a downlink control information indication method is required to support a multipoint diversity and/or multipoint multi-stream transmission mode.

SUMMARY

This specification describes a downlink control information indication method and apparatus, and a system, and is intended to support diversity transmission and/or multi-stream transmission in a multipoint coordination scenario by sending a plurality of pieces of downlink control information.

According to a first aspect, an embodiment of this application provides a downlink control information indication method, including: sending, by a first network side device, M of N pieces of downlink control information to user equipment, where M is an integer greater than or equal to 1 and less than or equal to N, N is an integer greater than 1, and the N pieces of downlink control information include downlink data transmission information used when N network side devices send downlink data to the user equipment on a same carrier and in a same subframe. Each of the N pieces of downlink control information is corresponding to one of the N network side devices, and different downlink control information is corresponding to different network side devices. For a plurality of network side devices that send downlink data to the user equipment on a same carrier and in a same subframe, a plurality of pieces of downlink control information are used to indicate downlink data transmission information used when the plurality of network side devices separately send the downlink data. Therefore, diversity transmission and/or multi-stream transmission in a coordinated multipoint transmission/reception scenario may be supported. In addition, when the user equipment cannot normally receive downlink data sent by some network side devices because some downlink control information encounters an error, the user equipment may still receive, based on an indication of remaining downlink control information that encounters no error, downlink data sent by a network side device corresponding to the downlink control information that encounters no error, thereby ensuring robustness of downlink data transmission in multipoint diversity transmission and/or multipoint multi-stream transmission scenarios, and increasing system and user throughputs. Optionally, the N network side devices that send the downlink data to the user equipment on the same carrier and in the same subframe may include the first network side device and at least one second network side device, or include at least two second network side devices. Optionally, the first network side device may be a serving network side device, and the second network side device may be a cooperative network side device.

In a possible design, the first network side device sends N pieces of downlink control information to the user equipment. N is an integer greater than 1, and the N pieces of downlink control information include the downlink data transmission information used when the N network side devices send the downlink data to the user equipment on the same carrier and in the same subframe.

In a possible design, the first network side device sends one piece of downlink control information to the user equipment, and the downlink control information is one of the N pieces of downlink control information. The N pieces of downlink control information include the downlink data transmission information used when the N network side devices send the downlink data to the user equipment on the same carrier and in the same subframe, and N is an integer greater than 1. Optionally, the other N−1 pieces of downlink control information in the N pieces of downlink control information are respectively sent by N−1 second network side devices, and the second network side devices belong to the N network side devices that send the downlink data to the user equipment on the same carrier and in the same subframe.

In a possible design, the first network side device sends k of the N pieces of downlink control information, and k is an integer greater than 1 and less than N. The k pieces of downlink control information are corresponding to k of the N network side devices that send the downlink data to the user equipment on the same carrier and in the same subframe, each of the remaining N−k second network side devices sends one piece of downlink control information, and the second network side device belongs to the N network side devices.

In a possible design, the N network side devices are N non-quasi co-located network side devices.

In a possible design, the downlink data includes at least one of service data, a reference signal (for example, a DM-RS or another type of reference signal in an LTE system), and other downlink information that needs to be transmitted. In another possible design, the downlink data includes downlink service data and/or a reference signal (for example, a DM-RS or another type of reference signal in an LTE system). The downlink service data is downlink data, carried on a physical downlink shared channel, except a signaling message such as a system message, a paging message, and control information, for example, all downlink data that is scrambled by using a C-RNTI (Cell Radio Network Temporary Identity, cell radio network temporary identity) in the LTE system.

In a possible design, the downlink data transmission information in the N pieces of downlink control information includes resource information used when the N network side devices transmit the downlink data to the user equipment on the same carrier and on a same time-domain resource.

In a possible design, the downlink data transmission information includes first information used to send the downlink data. Antenna port numbers indicated by the first information in the N pieces of downlink control information are different from each other or combinations that are of an antenna port number and a reference signal scrambling manner and that are indicated by the first information in the N pieces of downlink control information are different from each other. The first information is an antenna port, a quantity of layer, and reference signal scrambling information. That the combinations of an antenna port number and a reference signal scrambling manner are different from each other includes the following: Antenna port numbers are different, and/or the antenna port numbers are the same but used reference signal scrambling manners are different. For example, in two network side devices participating in coordinated multipoint transmission/reception, a first network side device uses an antenna port 7 (reference signal scrambling manner nSCID=0, where SCID is a scrambling identity, and nSCID is used to indicate a specific reference signal scrambling manner) and an antenna port 8 (reference signal scrambling manner nSCID=0), and a second network side device uses an antenna port 7 (reference signal scrambling manner nSCID=1), an antenna port 8 (reference signal scrambling manner nSCID=1), and an antenna port 9. This is a case in which combinations of an antenna port and a reference signal scrambling manner are different from each other. Both the first network side device and the second network side device use the antenna ports 7 and 8, but different reference signal scrambling manners. The second network side device further uses the antenna port 9, which is different from the two antenna ports used by the first network side device. The first information is used to: when the network side device sends the downlink data, indicate a used antenna port number, a used quantity of sending layer, and scrambling manners that need to be used for reference signals sent on some antenna ports, when different quantities of code words are used. For a plurality of network side devices that send downlink data to the user equipment on a same carrier and in a same subframe, antenna port numbers or combinations that are of an antenna port number and a reference signal scrambling manner and that are indicated in downlink control information corresponding to the network side devices are different from each other. Therefore, it may be ensured that reference signals in downlink data sent in a coordinated multipoint transmission/reception process are orthogonal to each other, thereby ensuring correct receiving of the downlink data.

In a possible design, the method includes one or more of the following cases: The first information in more than one piece of downlink control information in the N pieces of downlink control information indicates same or different information field values in a same first correspondence; and the first information in more than one piece of downlink control information in the N pieces of downlink control information indicates same or different information field values in different first correspondences. The first correspondence is a correspondence among a code word, an antenna port, a quantity of layer, and a reference signal scrambling manner.

In a possible design, the first information in the N pieces of downlink control information is corresponding to a same first correspondence or different first correspondences. The first correspondence is a correspondence among a code word, an antenna port, a quantity of layer, and a reference signal scrambling manner, and is used by the user equipment to determine, in combination with the first information, antenna port numbers, quantities of layer, and reference signal scrambling manners used when the N network side devices send the downlink data to the user equipment on the same carrier and in the same subframe. The first correspondence may be further used by the network side device to determine the first information to be sent. Optionally, the downlink data transmission information in the downlink control information may include information about the first correspondence used by the network side device. Optionally, the first correspondence used by the N network side devices that send the downlink data to the user equipment on the same carrier and in the same subframe may be pre-agreed or may be determined dynamically through scheduling. Optionally, first correspondences used by the N network side devices that send the downlink data to the user equipment on the same carrier and in the same subframe may be learned of by the user equipment in a pre-agreed manner, or may be notified to the user equipment by using signaling (for example, RRC signaling in an LTE system). Network side devices participating in coordinated multipoint transmission/reception may use a same first correspondence or different first correspondences, so as to more flexibly schedule and allocate the antenna port number and/or the reference signal scrambling manner.

In a possible design, the first information in more than one piece of downlink control information in the N pieces of downlink control information indicates same information field values in a same first correspondence, and the information field values indicated by the first information in the more than one piece of downlink control information are corresponding to different antenna port numbers or different combinations of an antenna port number and a reference signal scrambling manner. The first correspondence is a correspondence among a code word, an antenna port, a quantity of layer, and a reference signal scrambling manner. Optionally, that the same information field values are corresponding to different antenna port numbers or different combinations of an antenna port number and a reference signal scrambling manner may be implemented as follows: Different network side devices have different antenna port number sets. This means that all antenna port numbers included in an antenna port number set of a network side device are not included in an antenna port number set of another network side device. Information about the antenna port number set of the network side device may be learned of by the user equipment in a pre-agreed manner. For example, an antenna port number set of a first network side device participating in coordinated multipoint transmission/reception is pre-agreed as {7, 8, 9, 10}, and an antenna port number set of a second network side device participating in coordinated multipoint transmission/reception is pre-agreed as {11, 12, 13, 14}. Alternatively, the information about the antenna port number set may be notified to the user equipment by using signaling (for example, RRC signaling in an LTE system). Optionally, that the same information field values are corresponding to different antenna port numbers or different combinations of an antenna port number and a reference signal scrambling manner may be determined by the user equipment based on a rule of successively occupying antenna port numbers by network side devices participating in coordinated multipoint transmission/reception. For example, when a first network side device participating in coordination needs to use two antenna ports, antenna port numbers used by the first network side device are 7 and 8 by default. When a second network side device participating in coordination needs to use four antenna ports, antenna port numbers used by the second network side device are 9, 10, 11, and 12 by default.

In a possible design, the first information in more than one piece of downlink control information in the N pieces of downlink control information indicates different information field values in a same first correspondence, and the information field values indicated by the first information in the more than one piece of downlink control information are corresponding to different antenna port numbers or different combinations of an antenna port number and a reference signal scrambling manner.

In a possible design, the first information in more than one piece of downlink control information in the N pieces of downlink control information indicates same or different information field values in different first correspondences, and the information field values indicated by the first information in the more than one piece of downlink control information are corresponding to different antenna port numbers or different combinations of an antenna port number and a reference signal scrambling manner.

In a possible design, the first network side device notifies at least one second network side device of a first correspondence to be used by the second network side device, where the at least one second network side device is one or more of the N network side devices that send the downlink data to the user equipment on the same carrier and in the same subframe. The first network side device may determine first correspondences to be used by the N network side devices participating in coordinated multipoint transmission/reception, and send information about a first correspondence to be used by each network side device to the corresponding network side device, so that a network side device participating in coordinated multipoint transmission/reception determines a combination of an antenna port number and a reference signal scrambling manner that is to be used by the network side device.

In a possible design, the first network side device sends antenna port allocation information to at least one second network side device, where the at least one second network side device is one or more of the N network side devices that send the downlink data to the user equipment on the same carrier and in the same subframe. In a possible design, the first network side device sends information about a correspondence between a quantity of sending layer and an antenna port to the at least one second network side device. In a possible design, the first network side device sends code word mapping information to the at least one second network side device. The antenna port allocation information is used by the second network side device to learn of an available antenna port number, the information about the correspondence between a quantity of layer and an antenna port is used by the second network side device to learn of a correspondence between a quantity of layer and an antenna port that is used for sending downlink data, and the code word mapping information is used by the second network side device to learn of a code word to be sent.

In a possible design, the first network side device sends value-related information of N to the user equipment, where the information is used to determine a value of N. The value of N is used to support the user equipment in performing blind detection on downlink control information that needs to be received. Optionally, the first network side device receives the value-related information of N that is sent by a scheduling node. Optionally, the first network side device may send the value-related information of N to the user equipment, for example, notify the user equipment of a specific value of N by using signaling (for example, RRC signaling in LTE). Optionally, a relationship between N and other related information may be pre-agreed, and the network side device may send the other related information to make the user equipment learn of the value of N. For example, in an LTE system, a correspondence between a specific transmission mode and N may be agreed. When the network side device notifies the user equipment of a transmission mode, the user equipment may determine a value of N that is corresponding to the current transmission mode.

In a possible design, the downlink control information includes aggregation level information of any other one or more pieces of downlink control information in the N pieces of downlink control information. In a coordinated multipoint transmission/reception process, a plurality of pieces of downlink control information include aggregation level information of other downlink control information, so that when detecting one piece of downlink control information, the user equipment performs blind detection on other downlink control information based on aggregation level information that is of the other downlink control information and that is carried in the currently detected downlink control information, thereby helping the user equipment to quickly detect the other downlink control information.

In a possible design, the downlink data transmission information in the downlink control information further includes resource indication information used by a network side device corresponding to the downlink control information to send downlink data. Resources that are indicated by the resource indication information in the N pieces of downlink control information and that are used to send the downlink data are the same or different. That is, resources used by the N network side devices that send the downlink data to the user equipment on the same carrier and in the same subframe to perform downlink data transmission are the same or different. Time-domain and/or frequency-domain resources used by a plurality of network side devices participating in coordinated multipoint transmission/reception may be separately indicated in downlink control information corresponding to the network side devices, so as to more flexibly allocate resources to the network side devices. That the used resources are the same or different includes using completely same resources, or using completely different resources, or using not all the same resources.

In a possible design, the first network side device may send one or more of the N pieces of downlink control information on an enhanced control channel.

In a possible design, the first network side device sends enhanced downlink control channel information of at least one network side device to the user equipment, and an enhanced downlink control channel of the at least one network side device is used by at least one of the N network side devices that send the downlink data to the user equipment on the same carrier and in the same subframe, to send downlink control information. Optionally, the first network side device receives the enhanced downlink control channel information that is sent by the scheduling node and that is of the at least one network side device. Optionally, the first network side device may further receive enhanced downlink control channel information that is sent by at least one second network side device in the N network side devices that send the downlink data to the user equipment on the same carrier and in the same subframe. The enhanced downlink control channel information is used to indicate a search space of an enhanced downlink control channel. One or more of the N pieces of downlink control information may be sent on the enhanced downlink control channel, and in this case, the first network side device may notify the user equipment of required enhanced downlink control channel information, so that the user equipment receives the downlink control information sent on the enhanced downlink control channel. It may be understood that a network side device may send one or more pieces of downlink control information within a search space of an enhanced downlink control channel corresponding to the network side device. It may be understood that the enhanced downlink control channel may be determined by the first network side device, or may be determined and notified by the scheduling node to the first network side device, or may be determined and notified to the first network side device by a second network side device that needs to use the enhanced downlink control channel.

In a possible design, the first network side device sends N pieces of downlink control information to the user equipment, where the N pieces of downlink control information include first-format downlink control information and/or second-format downlink control information. Downlink data transmission information in the second-format downlink control information includes downlink data resource element mapping information and quasi co-location indicator information, and the downlink data resource element mapping information and the quasi co-location indicator information are used to receive downlink data that is sent by a network side device corresponding to the second-format downlink control information to the user equipment. Optionally, the first-format downlink control information is corresponding to the first network side device, and the second-format downlink control information is corresponding to a second network side device. Downlink control information in different formats is applied to N network side devices, different network side devices may be distinguished by using different downlink control information formats, and a quantity of network side device indication information added to the downlink control information is reduced.

In a possible design, the first network side device sends N pieces of downlink control information to the user equipment, where downlink data transmission information in the downlink control information includes network side device indication information of a network side device corresponding to the downlink control information. Optionally, the first network side device receives network side device indication information that is sent by the scheduling node that is of the N network side devices that send the downlink data to the user equipment on the same carrier and in the same subframe. Adding the network side device indication information to the downlink control information may notify the user equipment of network side devices corresponding to different downlink control information, so that more network side devices can be supported in simultaneously sending downlink data to the user equipment.

In a possible design, the first network side device may notify the user equipment, by using signaling (for example, RRC signaling in an LTE system) whether currently different downlink control information formats are used to distinguish between downlink control information corresponding to different network side devices, or network side device indication information is used to distinguish between downlink control information corresponding to different network side devices, or a combination of the foregoing two manners is used to distinguish between downlink control information corresponding to different network side devices. In another possible design, the user equipment may further learn of, in a predetermined manner, a manner of distinguishing between downlink control information corresponding to different network side devices. For example, it may be agreed that downlink control information corresponding to different network side devices is distinguished by using different downlink control information formats in a transmission mode. In addition, the first network side device uses the first-format downlink control information. The second network side device uses the second-format downlink control information. When learning of a current transmission mode, the user equipment learns of current network side devices corresponding to different downlink control information.

In a possible design, the first network side device sends N pieces of downlink control information to the user equipment. The first network side device receives downlink data transmission information that is sent by the scheduling node and that is used when at least one second network side device sends downlink data to the user equipment on a same carrier and in a same subframe; or receives downlink data transmission information that is sent by at least one second network side device and that is used when the at least one second network side device sends downlink data to the user equipment on a same carrier and in a same subframe. The at least one second network side device is one or more of the N network side devices that send the downlink data to the user equipment on the same carrier and in the same subframe. Optionally, the downlink data transmission information used to send the downlink data includes the first information. The first network side device receives, from the scheduling node or the second network side device, the downlink data transmission information used by the second network side device, so as to send the N pieces of downlink control information. It may be understood that the first network side device may receive, from the scheduling node or the second network side device, other information (for example, resource indication information used for downlink data transmission) included in the N pieces of downlink control information, so as to send the N pieces of downlink control information.

In a possible design, the sending, by the first network side device, one piece of downlink control information to the user equipment further includes: sending, by the first network side device to the user equipment, search space information of a downlink control channel of at least one second network side device in the N network side devices. Optionally, the first network side device receives search space information that is sent by the scheduling node and that is of a downlink control channel of at least one second network side device in the N network side devices that send the downlink data to the user equipment on the same carrier and in the same subframe. Optionally, the first network side device receives the search space information that is sent by the at least one second network side device and that is of the downlink control channel of the at least one second network side device in the N network side devices that send the downlink data to the user equipment on the same carrier and in the same subframe. The search space information of the downlink control channel is used to notify the user equipment of a search space of the downlink control channel, and instruct the user equipment to perform blind detection on to-be-received downlink control information in the search space.

In a possible design, the sending, by the first network side device, one piece of downlink control information to the user equipment further includes: sending, by the first network side device to at least one second network side device, information used to determine a user-specific search space of a downlink control channel of the user equipment, where the at least one second network side device is one or more of the N network side devices that send the downlink data to the user equipment on the same carrier and in the same subframe. The information used to determine the user-specific search space of the downlink control channel of the user equipment is used by the second network side device to determine the user-specific search space of the downlink control channel of the user equipment. For example, in the prior art, the information used to determine the user-specific search space of the downlink control channel of the user equipment includes a cell radio network temporary identity (C-RNTI). The information used to determine the user-specific search space of the downlink control channel of the user equipment is sent to the at least one second network side device, so that a conflict can be avoided when the at least one second network side device allocates the foregoing information to other user equipment, thereby avoiding interference between downlink control information of different user equipment.

In a possible design, the sending, by the first network side device, one piece of downlink control information to the user equipment further includes: sending, by the first network side device to at least one second network side device, at least one piece of enhanced downlink control channel information configured for the user equipment, where the at least one second network side device is one or more of the N network side devices that send the downlink data to the user equipment on the same carrier and in the same subframe. The at least one piece of enhanced downlink control channel information is used by the at least one second network side device to send downlink control information on an enhanced downlink control channel. Optionally, the first network side device receives the at least one piece of enhanced downlink control channel information sent by the scheduling node. Optionally, the at least one piece of enhanced downlink control channel information may also be sent by the scheduling node to the at least one second network side device. The first network side device or the scheduling node notifies the second network side device of the enhanced downlink control channel information configured for the user equipment, so that the second network side device sends the downlink control information to the user equipment on the enhanced downlink control channel.

It may be understood that when the first network side device sends k of the N pieces of downlink control information, where k is an integer greater than 1 and less than N, the k pieces of downlink control information are corresponding to k of the N network side devices that send the downlink data to the user equipment on the same carrier and in the same subframe. When the remaining N–k second network side devices separately send one piece of downlink control information, the first aspect and any one or more possible design manners of the first aspect may still be applied. For example, when the first network side device sends the k pieces of downlink control information, the first aspect and any one or more possible design manners of the first aspect that are corresponding to sending of the N pieces of downlink control information by the first network side device may be applied. When the remaining N−k pieces of downlink control information are sent, the first aspect and any one or more possible design manners of the first aspect that are corresponding to sending of one piece of downlink control information by the first network side device may be applied.

According to a second aspect, an embodiment of this application provides a downlink control information indication method, including: receiving, by user equipment, N pieces of downlink control information, where N is an integer greater than 1, and the N pieces of downlink control information include downlink data transmission information used when the user equipment receives, on a same carrier and in a same subframe, downlink data sent by N network side devices. Optionally, the N network side devices that send the downlink data to the user equipment on the same carrier and in the same subframe may include a first network side device and at least one second network side device, or include at least two second network side devices. Optionally, the first network side device may be a serving network side device, and the second network side device may be a cooperative network side device.

In a possible design, the N network side devices are N non-quasi co-located network side devices.

In a possible design, the downlink data transmission information includes first information used to receive the downlink data. Antenna port numbers indicated by the first information in the N pieces of downlink control information are different from each other or combinations that are of an antenna port number and a reference signal scrambling manner and that are indicated by the first information in the N pieces of downlink control information are different from each other. The first information is an antenna port, a quantity of layer, and reference signal scrambling information. That the combinations of an antenna port number and a reference signal scrambling manner are different from each other includes the following: Antenna port numbers are different, and/or the antenna port numbers are the same but used reference signal scrambling manners are different.

In a possible design, the method further includes the following: The first information in the N pieces of downlink control information is corresponding to a same first correspondence or different first correspondences. The first correspondence is a correspondence among a code word, an antenna port, a quantity of layer, and a reference signal scrambling manner. The first correspondence is used by the user equipment to determine, in combination with the first information, antenna ports, quantities of layer, and reference signal scrambling manners used when the N network side devices send the downlink data to the user equipment on the same carrier and in the same subframe. The first information is used to: when the network side device sends the downlink data, indicate a used antenna port, a used quantity of sending layer, and scrambling manners that need to be used for reference signals sent on some antenna ports. Optionally, first correspondences used by the N network side devices that send the downlink data to the user equipment on the same carrier and in the same subframe may be learned of by the user equipment in a pre-agreed manner, or may be learned of by the user equipment by receiving signaling (for example, RRC signaling in an LTE system).

In a possible design, the first information in more than one piece of downlink control information in the N pieces of downlink control information indicates same information field values in a same first correspondence, and the information field values indicated by the first information in the more than one piece of downlink control information are separately corresponding to different antenna port numbers or different combinations of an antenna port number and a reference signal scrambling manner that are of different network side devices. Optionally, that the same information field values are separately corresponding to different antenna port numbers or different combinations of an antenna port number and a reference signal scrambling manner that are of different network side devices may be implemented as follows: Different network side devices have different antenna port number sets. That the different network side devices have different antenna port number sets means that all antenna port numbers included in an antenna port number set of a network side device are not included in an antenna port number set of another network side device. Information about the antenna port number set of the network side device may be learned of by the user equipment in a pre-agreed manner. The user equipment may also learn of the information about the antenna port number set of the network side device by receiving signaling (for example, RRC signaling in an LTE system). Optionally, that the same information field values are separately corresponding to different antenna port numbers or different combinations of an antenna port number and a reference signal scrambling manner that are of different network side devices may be determined by the user equipment based on a rule of successively occupying antenna port numbers by network side devices participating in coordinated multipoint transmission/reception.

In a possible design, the first information in more than one piece of downlink control information in the N pieces of downlink control information indicates different information field values in a same first correspondence. The information field values indicated by the first information in the more than one piece of downlink control information are corresponding to different antenna port numbers of different network side devices, or the different information field values are corresponding to different combinations that are of an antenna port number and a reference signal scrambling manner and that are of different network side devices.

In a possible design, the first information in more than one piece of downlink control information in the N pieces of downlink control information indicates same or different information field values in different first correspondences, and the information field values indicated by the first information in the more than one piece of downlink control information are corresponding to different antenna port numbers or different combinations that are of an antenna port number and a reference signal scrambling manner and that are of different network side devices.

In a possible design, the downlink data transmission information in the downlink control information includes information about a first correspondence used by a network side device corresponding to the downlink control information.

In a possible design, the user equipment receives value-related information of N that is sent by the first network side device, where the information is used to determine a value of N.

In a possible design, the downlink control information includes aggregation level information of any other one or more pieces of downlink control information in the N pieces of downlink control information.

In a possible design, the downlink data transmission information in the downlink control information further includes resource indication information used by a network side device corresponding to the downlink control information to send downlink data. Resources that are indicated by the resource indication information in the N pieces of downlink control information and that are used to send the downlink data are the same or different.

In a possible design, the user equipment receives enhanced downlink control channel information that is of at least one network side device and that is sent by the first network side device, so that the user equipment receives downlink control information on an enhanced downlink control channel of the at least one network side device, and the at least one network side device is one or more of the N network side devices that send the downlink data to the user equipment on the same carrier and in the same subframe. It may be understood that the user equipment may receive one or more pieces of downlink control information within a search space of an enhanced downlink control channel of a network side device.

In a possible design, the receiving, by user equipment, N pieces of downlink control information includes: receiving, by the user equipment, the N pieces of downlink control information sent by a first network side device.

In a possible design, the N pieces of downlink control information include first-format downlink control information and/or second-format downlink control information, where downlink data transmission information in the second-format downlink control information includes downlink data resource element mapping information and quasi co-location indicator information, and the downlink data resource element mapping information and the quasi co-location indicator information are used to receive downlink data that is sent by a network side device corresponding to the second-format downlink control information. Optionally, the first-format downlink control information is corresponding to the first network side device, and the second-format downlink control information is corresponding to a second network side device.

In a possible design, the user equipment receives the N pieces of downlink control information sent by the first network side device, where the downlink data transmission information in the downlink control information includes network side device indication information of a network side device corresponding to the downlink control information.

In a possible design, the user equipment may receive a signaling (for example, RRC signaling in an LTE system) indication from the first network side device to learn whether currently different downlink control information formats are used to distinguish between downlink control information corresponding to different network side devices, or network side device indication information is used to distinguish between downlink control information corresponding to different network side devices, or a combination of the foregoing two manners is used to distinguish between downlink control information corresponding to different network side devices. In another possible design, the user equipment may further determine, in a predetermined manner, a current manner of distinguishing between downlink control information corresponding to different network side devices. For example, it may be agreed that downlink control information corresponding to different network side devices is distinguished by using different downlink control information formats in a transmission mode. In addition, the first network side device uses the first-format downlink control information. The second network side device uses the second-format downlink control information. When learning of a current transmission mode, the user equipment learns of current network side devices corresponding to different downlink control information.

In a possible design, the receiving, by user equipment, N pieces of downlink control information includes: receiving, by the user equipment, the N pieces of downlink control information sent by at least two network side devices. Optionally, the at least two network side devices may include a first network side device and at least one second network side device, or may include at least two second network side devices.

In a possible design, the method further includes: receiving, by the user equipment, search space information that is sent by the first network side device and that is of a downlink control channel of at least one second network side device in the N network side devices.

According to a third aspect, an embodiment of this application provides a downlink control information indication method, including: sending, by a second network side device, one piece of downlink control information to user equipment, where the downlink control information is one of N pieces of downlink control information, the N pieces of downlink control information include downlink data transmission information used when N network side devices send downlink data to the user equipment on a same carrier and in a same subframe, and N is an integer greater than 1. Optionally, the other N−1 pieces of downlink control information in the N pieces of downlink control information may be sent by a first network side device, or sent by the other N−1 second network side devices, or sent by a first network side device and another at least one second network side device. The second network side device belongs to the N network side devices that send the downlink data to the user equipment on the same carrier and in the same subframe.

In a possible design, the N network side devices are N non-quasi co-located network side devices.

In a possible design, the second network side device receives a first correspondence that is used by the second network side device and that is sent by the first network side device or a scheduling node. The first correspondence is a correspondence among a code word, an antenna port, a quantity of layer, and a reference signal scrambling manner.

In a possible design, the second network side device receives at least one of antenna port allocation information, information about a correspondence between a quantity of layer and an antenna port, and code word mapping information that are sent by the first network side device.

In a possible design, the second network side device receives at least one of antenna port allocation information, information about a correspondence between a quantity of layer and an antenna port, and code word mapping information that are sent by the scheduling node.

In a possible design, the second network side device sends, to the first network side device, information about an enhanced downlink control channel used by the second network side device to send the downlink data.

In a possible design, the second network side device sends, to the first network side device, downlink data transmission information used by the second network side device to send the downlink data.

In a possible design, the second network side device sends search space information of a downlink control channel of the second network side device to the first network side device.

In a possible design, the second network side device receives information that is sent by the first network side device or the scheduling node and that is used to determine a user-specific search space of a downlink control channel of the user equipment.

In a possible design, the second network side device receives enhanced downlink control channel information that is sent by the first network side device or the scheduling node and that is configured for the user equipment.

In a possible design, the second network side device may send the one piece of downlink control information to the user equipment on an enhanced downlink control channel.

According to a fourth aspect, an embodiment of this application provides a downlink control information indication method, including: sending, by a scheduling node, at least one of antenna port allocation information, information about a correspondence between a quantity of layer and an antenna port, and code word mapping information to N network side devices that send downlink data to user equipment on a same subcarrier and in a same subframe.

In a possible design, the N network side devices are N non-quasi co-located network side devices.

In a possible design, the scheduling node notifies first correspondences to be used by the N network side devices that send the downlink data to the user equipment on the same carrier and in the same subframe. The first correspondence is a correspondence among a code word, an antenna port, a quantity of layer, and a reference signal scrambling manner.

In a possible design, the scheduling node sends value-related information of N to a first network side device.

In a possible design, the scheduling node sends enhanced downlink control channel information of at least one network side device to the first network side device. The at least one network side device is one or more of the N network side devices that send the downlink data to the user equipment on the same carrier and in the same subframe.

In a possible design, the scheduling node sends, to the first network side device, network side device indication information of the N network side devices that send the downlink data to the user equipment on the same carrier and in the same subframe.

In a possible design, the scheduling node sends, to the first network side device, downlink data transmission information used when at least one second network side device sends downlink data to the user equipment on a same carrier and in a same subframe. The second network side device belongs to the N network side devices that send the downlink data to the user equipment on the same carrier and in the same subframe.

In a possible design, the scheduling node sends, to the first network side device, search space information of a downlink control channel of at least one second network side device in the N network side devices that send the downlink data to the UE on the same carrier and in the same subframe. The second network side device belongs to the N network side devices that send the downlink data to the user equipment on the same carrier and in the same subframe. The scheduling node sends search space information of another network side device to the first network side device, so that the first network side device sends the search space information to the user equipment.

In a possible design, the scheduling node sends, to at least one second network side device, information used to determine a user-specific search space of a downlink control channel of the user equipment. The second network side device belongs to the N network side devices that send the downlink data to the user equipment on the same carrier and in the same subframe.

In a possible design, the scheduling node sends at least one piece of enhanced downlink control channel information to the N network side devices that send the downlink data to the user equipment on the same carrier and in the same subframe.

According to a fifth aspect, an embodiment of this application provides a first network side device, where the first network side device has functions of implementing behavior of the first network side device in the foregoing method implementation. The functions may be implemented by hardware, or may be implemented by hardware by executing corresponding software. The hardware or software includes one or more modules corresponding to the foregoing functions.

According to a sixth aspect, an embodiment of this application provides a second network side device, where the second network side device has functions of implementing behavior of the second network side device in the foregoing method implementation. The functions may be implemented by hardware, or may be implemented by hardware by executing corresponding software. The hardware or software includes one or more modules corresponding to the foregoing functions.

According to a seventh aspect, an embodiment of this application provides a scheduling node, where the scheduling node has functions of implementing behavior of the scheduling node in the foregoing method implementation. The functions may be implemented by hardware, or may be implemented by hardware by executing corresponding software. The hardware or software includes one or more modules corresponding to the foregoing functions.

According to an eighth aspect, an embodiment of this application provides user equipment, where the user equipment has functions of implementing behavior of the user equipment in the foregoing method implementation. The functions may be implemented by hardware, or may be implemented by hardware by executing corresponding software. The hardware or software includes one or more modules corresponding to the foregoing functions.

According to a ninth aspect, an embodiment of this application provides a first network side device, where a structure of the first network side device includes a transmitter. The transmitter is configured to support the first network side device in sending the information or the instruction in the foregoing method to user equipment. In a possible implementation, the structure of the first network side device may further include a processor. The processor is configured to support the first network side device in performing a corresponding function in the foregoing method, for example, generating or processing the signaling information (for example, downlink control information or RRC signaling) and/or the downlink data in the foregoing method. In a possible implementation, the first network side device may further include a receiver, and the receiver is configured to receive information or an instruction sent by the user equipment. In a possible implementation, the first network side device may further include a communications unit. The communications unit is configured to support communication between the first network side device and another network side device, for example, receive information or an instruction sent by a scheduling node or another network side device, and/or send information or an instruction to another network side device. The structure of the first network side device may further include a memory, and the memory is configured to couple to the processor and store a program instruction and data necessary for the first network side device.

According to a tenth aspect, an embodiment of this application provides a second network side device, where a structure of the second network side device includes a transmitter. The transmitter is configured to support the second network side device in sending the information or the instruction in the foregoing method to user equipment, for example, sending downlink control information to the user equipment. In a possible implementation, the structure of the second network side device may further include a processor. The processor is configured to support the second network side device in performing a corresponding function in the foregoing method, for example, generating or processing the signaling information (for example, downlink control information or RRC signaling) and/or the downlink data in the foregoing method. In a possible implementation, the second network side device may further include a receiver, and the receiver is configured to receive information or an instruction sent by the user equipment. In a possible implementation, the second network side device may further include a communications unit. The communications unit is configured to support communication between the second network side device and another network side device, for example, receive information or an instruction sent by a scheduling node or another network side device, and/or send information or an instruction to another network side device. The structure of the second network side device may further include a memory, and the memory is configured to couple to the processor and store a program instruction and data necessary for the second network side device.

According to an eleventh aspect, an embodiment of this application provides a scheduling node, where a structure of the scheduling node may include a processor, a memory, and a communications unit. The processor may be configured to coordinate cooperation, resource management, and scheduling among a plurality of network side devices, and configured to support the scheduling node in performing a corresponding function in the foregoing method, for example, scheduling a plurality of network side devices participating in coordinated multipoint transmission/reception, and/or allocating downlink data transmission resources to the network side devices. The memory may be configured to store program code and data of the scheduling node. The communications unit is configured to support communication between the scheduling node and another network side device, for example, send scheduling information to the another network side device. It may be understood that the scheduling node described in this application may be an independent network side device different from the first network side device and the second network side device, or may be a software and/or hardware function module integrated into the first network side device and/or the second network side device. This is not limited in this application. The corresponding function of the scheduling node described in this application may also be completed by the first network side device and/or the second network side device described in this application. This is not limited in this application.

According to a twelfth aspect, an embodiment of this application provides user equipment, and a structure of the user equipment includes a receiver. The receiver is configured to support the user equipment in receiving the information or the data in the foregoing method. In a possible implementation, the structure of the user equipment may further include a processor. The processor is configured to support the user equipment in performing a corresponding function in the foregoing method. In a possible implementation, the structure of the user equipment may further include a transmitter, configured to send information or an instruction to a network side device. The structure of the user equipment may further include a memory. The memory is configured to couple to the processor, and store a program instruction and data necessary for the user equipment.

According to a thirteenth aspect, an embodiment of this application provides a communications system, and the system includes the first network side device and the user equipment described in the foregoing aspects. Optionally, the communications system may further include the second network side device described in the foregoing aspects. Optionally, the communications system may further include the scheduling node described in the foregoing aspects.

According to a fourteenth aspect, an embodiment of this application provides a computer storage medium, configured to store a computer software instruction used by the foregoing first network side device. The computer storage medium includes a program designed for executing the foregoing aspects.

According to a fifteenth aspect, an embodiment of this application provides a computer storage medium, configured to store a computer software instruction used by the foregoing second network side device. The computer storage medium includes a program designed for executing the foregoing aspects.

According to a sixteenth aspect, an embodiment of this application provides a computer storage medium, configured to store a computer software instruction used by the foregoing scheduling node. The computer storage medium includes a program designed for executing the foregoing aspects.

According to a seventeenth aspect, an embodiment of this application provides a computer storage medium, configured to store a computer software instruction used by the foregoing user equipment. The computer storage medium includes a program designed for executing the foregoing aspects.

According to still another aspect, an embodiment of this application provides a network side device. The network side device includes a transmitter, configured to send N pieces of downlink control information to user equipment, where N is an integer greater than 1, and the N pieces of downlink control information include downlink data transmission information used when N network side devices send downlink data to the user equipment on a same carrier and in a same subframe; or configured to send one piece of downlink control information to user equipment, where the downlink control information is one of N pieces of downlink control information, the N pieces of downlink control information include downlink data transmission information used when N network side devices send downlink data to the user equipment on a same carrier and in a same subframe, and N is an integer greater than 1.

In a possible design, the N pieces of downlink control information are corresponding to the N network side devices, and the N network side devices are N non-quasi co-located network side devices.

In a possible design, the downlink data transmission information includes first information used to send the downlink data. Antenna port numbers indicated by the first information in the N pieces of downlink control information are different from each other or combinations that are of an antenna port number and a reference signal scrambling manner and that are indicated by the first information in the N pieces of downlink control information are different from each other. The first information is an antenna port, a quantity of layer, and reference signal scrambling information.

In a possible design, the downlink control information includes aggregation level information of any other one or more pieces of downlink control information in the N pieces of downlink control information.

In a possible design, that the transmitter is configured to send the N pieces of downlink control information to the user equipment includes one or more of the following cases (1) and (2):

(1) the N pieces of downlink control information include first-format downlink control information and/or second-format downlink control information, where the second-format downlink control information includes downlink data resource element mapping information and quasi co-location indicator information, and the downlink data resource element mapping information and the quasi co-location indicator information are used to receive downlink data; and (2) the downlink data transmission information in the downlink control information includes network side device indication information of a network side device corresponding to the downlink control information.

In a possible design, the transmitter is configured to send one piece of downlink control information to the user equipment. The transmitter is further configured to send, to the user equipment, search space information of a downlink control channel of at least one second network side device in the N network side devices.

According to still another aspect, an embodiment of this application further provides user equipment. The user equipment includes: a receiver, configured to receive N pieces of downlink control information, where N is an integer greater than 1, and the N pieces of downlink control information include downlink data transmission information used when the user equipment receives, on a same carrier and in a same subframe, downlink data sent by N network side devices.

In a possible design, the N pieces of downlink control information are corresponding to the N network side devices, and the N network side devices are N non-quasi co-located network side devices.

In a possible design, the downlink data transmission information includes first information used to receive the downlink data. Antenna port numbers indicated by the first information in the N pieces of downlink control information are different from each other or combinations that are of an antenna port number and a reference signal scrambling manner and that are indicated by the first information in the N pieces of downlink control information are different from each other. The first information is an antenna port, a quantity of layer, and reference signal scrambling information.

In a possible design, the downlink control information includes aggregation level information of any other one or more pieces of downlink control information in the N pieces of downlink control information.

In a possible design, that the receiver is configured to receive the N pieces of downlink control information sent by a first network side device includes one or more of the following cases (1) and (2):

(1) the N pieces of downlink control information include first-format downlink control information and/or second-format downlink control information, where downlink data transmission information in the second-format downlink control information includes downlink data resource element mapping information and quasi co-location indicator information, and the downlink data resource element mapping information and the quasi co-location indicator information are used to receive downlink data; and (2) the downlink data transmission information in the downlink control information includes network side device indication information of a network side device corresponding to the downlink control information.

In a possible design, the receiver is configured to receive the N pieces of downlink control information sent by at least two network side devices. The receiver is further configured to receive search space information that is sent by the first network side device to the user equipment and that is of a downlink control channel of at least one second network side device in the N network side devices.

Compared with the prior art, the embodiments of this application provide a downlink control information indication method and apparatus, and a system, and are intended to support diversity transmission and/or multi-stream transmission in a multipoint coordination scenario by sending a plurality of pieces of downlink control information. Further, downlink data transmission information of a plurality of network side devices is indicated by a plurality of pieces of downlink control information, so that when the user equipment cannot normally receive downlink data sent by some network side devices because some downlink control information encounters an error, the user equipment may still receive, based on an indication of remaining downlink control information that encounters no error, downlink data sent by a network side device corresponding to the remaining downlink control information that encounters no error, thereby ensuring robustness of downlink data transmission in multipoint diversity transmission and/or multipoint multi-stream transmission scenarios, and increasing system and user throughputs.

This application further provides a communication method and apparatus, and a system, so as to reduce processing complexity of a transmission reception point and UE during coordinated transmission.

According to one aspect of an embodiment of the present invention, a communication method is provided. In this method, a transmission reception point (TRP) determines quantity information of control information to be sent to same UE, and sends, to the UE, the determined quantity information of the control information to be sent to the UE. A quantity of control information to be sent to the UE is N, and N is an integer greater than or equal to 1.

According to another aspect of an embodiment of the present invention, a communication method is provided. In this method, UE receives quantity information that is sent by a TRP and that is of control information to be sent to the UE, the UE determines, based on the quantity information, that a quantity of control information that needs to be detected is N, and the UE detects the control information from N TRPs. A total quantity of control information to be detected is N, and control information sent by the N TRPs is separately detected on the N TRPs.

In a possible implementation, the quantity information of the control information to be sent to the user equipment is included in a first transmission parameter set, and the control information is included in a second transmission parameter set. Alternatively, the quantity information of the control information to be sent to the user equipment is included in level-1 downlink control information of a second transmission parameter set, and the control information is included in level-2 downlink control information of the second transmission parameter set.

In a possible implementation, the quantity information of the control information to be sent to the UE may be determined based on a quantity of TRPs that are to send control information to the UE, or the quantity information of the control information to be sent to the UE may be set to a fixed value, and the fixed value may be an integer greater than or equal to 1. The quantity of control information to be sent to the UE is determined based on different situations, which may flexibly adapt to different scenario requirements. The quantity of control information may not exceed a threshold, so that excessive control information transmission can be avoided, avoid affecting system performance because excessive physical resources are occupied, and reduce complexity of processing excessive control information by the UE and reduce resulted energy consumption. The quantity of control information may be a quantity of second transmission parameter sets.

In a possible implementation, the TRP that sends the control information to be sent to the same UE may be one of the N TRPs. Alternatively, the TRP that sends the control information to be sent to the same UE may not belong to the N TRPs.

In a possible implementation, the quantity information of the control information to be sent to the user equipment is included in a first transmission parameter set, the first transmission parameter set may further include resource information for transmitting a second transmission parameter set, and the resource information indicates a candidate resource that is to transmit the second transmission parameter set, so that the UE performs detection on the second transmission parameter set flexibly and quickly.

In a possible implementation, N may be equal to 1, and N may also be greater than or equal to 2. When N is 1, single-point transmission may be implemented. When N is greater than or equal to 2, multipoint transmission may be implemented, so as to improve transmission efficiency.

In a possible implementation, when N is greater than or equal to 2, content of the N pieces of control information to be sent to the UE may be the same or may be different.

Optionally, the UE determines whether the N pieces of control information are the same.

In a possible implementation, when N is greater than or equal to 3, some of the N pieces of control information to be sent to the UE may be the same.

In a possible implementation, when the quantity information of the control information to be sent to the user equipment is included in a first transmission parameter set, the first transmission parameter set may further include content indication information of a second transmission parameter set, and the content indication information of the second transmission parameter set indicates whether N second transmission parameter sets to be sent to the UE are the same. Alternatively, when the quantity information of the control information to be sent to the user equipment is included in level-1 downlink control information of a second transmission parameter set, the level-1 downlink control information of the second transmission parameter set may further include control information content indication information, and the control information content indication information indicates whether the N pieces of control information to be sent to the UE are the same.

In a possible implementation, the UE determines, based on associated control channel resource information configured for sending the N pieces of control information, whether the N pieces of control information are the same. The control channel resource information may include a search space, control information associated with a same search space in the N pieces of control information is the same, and control information associated with different search spaces in the N pieces of control information is different. The control channel resource information may include a time-frequency resource, and in the N pieces of control information, control information of control channels that belong to different time-domain resources and that belong to a same frequency-domain resource is the same, and control information of control channels that belong to different time-domain resources and different frequency-domain resources is different.

In a possible implementation, when the UE detects more than one second transmission parameter set or more than one piece of control information, and content of the more than one second transmission parameter set or the more than one piece of control information is the same, the UE may combine a plurality of second transmission parameter sets or a plurality of pieces of control information that are detected, so as to improve sending reliability of the second transmission parameter set or the control information.

In a possible implementation, when the UE detects more than one second transmission parameter set or more than one piece of control information, and content of the more than one second transmission parameter set or the more than one piece of control information is different, at least two different data channels may be scheduled by at least two second transmission parameter sets having different content or at least two pieces of control information having different content, and the UE may separately perform uplink data sending and downlink data receiving on N data channels. Therefore, non-coherent joint transmission may be implemented, and data transmitted on different data channels may be the same, so that a possibility of data transmission can be further improved. Data transmitted on different data channels may also be different, and a system capacity may be further increased.

In a possible implementation, data transmission performed by different TRPs and same UE during multipoint transmission may be performed on a same carrier, or may be performed on different carriers. Data that is independently pre-coded may be the same, so that data transmission reliability can be improved. Data that is independently pre-coded may be different, so that a data transmission capacity of the entire system can be increased.

In a possible implementation, the quantity information of the control information to be transmitted may uniformly indicate a transmission mode, and the UE may determine the transmission mode based on the quantity information of the control information to be transmitted. The transmission mode and a channel state information measurement configuration parameter may be decoupled. The TRP may independently send the channel state information measurement configuration parameter to the UE. In this way, accuracy of channel state information measurement and feedback may be improved, so that communication can be effectively enabled to adapt to an actual channel change, and communication efficiency can be improved.

In a possible implementation, the second transmission parameter set includes a parameter indicated by using a physical downlink control channel.

In a possible implementation, the quantity of control information to be sent to the UE is a quantity of physical layer code words that need to be received or sent, or may be a quantity of beams that perform uplink communication at the same time.

In a possible implementation, when the quantity information of the control information to be sent to the user equipment is included in the level-1 downlink control information of the second transmission parameter set, the TRP may further send the first transmission parameter set to the UE.

In a possible implementation, the first transmission parameter set further includes antenna port group information.

In a possible implementation, the first transmission parameter set further includes rank information, and the rank information may be rank information indicating scheduling data of the second transmission parameter set.

In a possible implementation, the first transmission parameter set may further include layer mapping information, which is used to predefine a mapping relationship from a code word to a layer.

In a possible implementation, during uplink scheduling, the second transmission parameter set may further include at least one of subband precoding information and power control information.

In a possible implementation, the first transmission parameter set further includes quasi co-location parameter configuration information of an antenna port of a channel that carries the second transmission parameter set, or may include quasi co-location parameter configuration information of an antenna port of a data channel scheduled by the second transmission parameter set. When an antenna port for sending the second parameter set and an antenna port for sending the data channel scheduled by the second parameter set are different or do not meet a quasi co-location requirement, the quasi co-location parameter configuration information may include quasi co-location parameter configuration information of the antenna port for sending the second parameter set and quasi co-location parameter configuration information of the antenna port for sending the data channel scheduled by the second parameter set, where the two types of quasi co-location parameter configuration information are different.

In a possible implementation, the first transmission parameter set further includes quasi co-location parameter indication information.

In a possible implementation, when the quantity information of the control information to be sent to the user equipment is included in the level-1 downlink control information of the second transmission parameter set, the level-1 downlink control information of the second transmission parameter set may further include the quasi co-location parameter indication information.

In a possible implementation, when the quantity information of the control information to be sent to the user equipment is included in the level-1 downlink control information of the second transmission parameter set, the level-1 downlink control information of the second transmission parameter set further includes rank information, and the rank information may be rank information indicating data scheduled by the downlink control information.

In a possible implementation, the first transmission parameter set further includes beam information, and the beam information indicates a transmit beam of the second transmission parameter set, or indicates a receive beam of the second transmission parameter set, or may indicate a transmit beam and a receive beam of the second transmission parameter set.

In a possible implementation, when the quantity information of the control information to be sent to the user equipment is included in the level-1 downlink control information of the second transmission parameter set, the level-1 downlink control information of the second transmission parameter set further includes beam information, and the beam information indicates a transmit beam of the level-2 downlink control information of the second transmission parameter set, or indicates a receive beam of the level-2 downlink control information of the second transmission parameter set, or indicates a transmit beam and a receive beam of the level-2 downlink control information of the second transmission parameter set.

In a possible implementation, the first transmission parameter set is sent by using a radio resource control message. This may save a control channel resource, and the first transmission parameter set may be sent by using relatively low modulation order and code rate, thereby ensuring transmission reliability.

In a possible implementation, the first transmission parameter set is sent by using a medium access control (MAC) control element; or the first transmission parameter set is sent by using downlink control information in a complete format; or the first transmission parameter set is sent by using level-1 downlink control information, and the second transmission parameter set is sent by using level-2 downlink control information, and the level-1 downlink control information and the level-2 downlink control information form downlink control information in a complete format. Therefore, control channel configuration information may be quickly sent to the UE, and may be fast updated to better match an actual physical channel.

According to another aspect, an embodiment of the present invention provides UE, where the UE has functions of implementing behavior of the UE in the foregoing method implementation. The functions may be implemented by hardware, or may be implemented by hardware by executing corresponding software. The hardware or software includes one or more modules corresponding to the foregoing functions.

In a possible implementation, a structure of the UE includes a transceiver and a processor. The transceiver is configured to implement a corresponding receiving function and a corresponding notification or sending function in the foregoing method. For example, the transceiver may be configured to receive quantity information that is sent by a TRP and that is of control information to be sent to the user equipment, for example, receive a first transmission parameter set that includes the quantity information of the control information to be sent to the user equipment or level-1 downlink control information that is of a second transmission parameter set and that includes the quantity information of the control information to be sent to the user equipment. The transceiver may be further configured to receive second transmission parameter sets sent by N TRPs. Further, the transceiver may further receive downlink data sent by a plurality of TRPs on different data channels or send uplink data to a plurality of TRPs during multipoint transmission. The processor may be configured to determine, based on the quantity information, that a quantity of second transmission parameter sets that need to be detected is N, and detect the control information from N TRPs. The processor may be further configured to combine the control information of the detected N second transmission parameter sets when content of at least two second transmission parameters or at least two pieces of control information is the same, or obtain scheduling information of N data channels based on the control information of the detected N second transmission parameter sets when content of at least two second transmission parameters or at least two pieces of control information is different. The UE may further include a memory. The memory is configured to couple to the processor, and store a program instruction and data necessary for the UE.

In a possible implementation, the structure of the UE may include a transceiver unit and a processing unit. The transceiver unit may be configured to receive quantity information that is sent by a TRP and that is of control information to be sent, may further receive control information sent by at least one TRP, and may further receive downlink data sent by at least one TRP or send uplink data to the at least one TRP. The processing unit may be configured to determine, based on the quantity information of the control information to be sent, a quantity of control information that needs to be received, and detect the corresponding determined quantity of control information.

According to still another aspect, an embodiment of the present invention provides a TRP, where the TRP has functions of implementing behavior of the TRP in the foregoing method implementation. The functions may be implemented by hardware, or may be implemented by hardware by executing corresponding software. The hardware or software includes one or more modules corresponding to the foregoing functions. The module may be software and/or hardware.

In a possible implementation, a structure of the TRP includes a transceiver and a processor. The processor may be configured to determine quantity information of control information to be sent to UE, and send a first transmission parameter set to the UE. The transceiver may be configured to send, to the UE, the determined quantity information of the control information to be sent to the UE. The transceiver may further send a second transmission parameter set to the UE. The TRP may further include a memory, and the memory is configured to couple to the processor, and store a program instruction and data necessary for the TRP.

In a possible implementation, the TRP may include a processing unit and a transceiver unit. The processing unit may be configured to determine quantity information of control information to be sent, and the transceiver unit may be configured to send, to the UE, the quantity information of the control information to be sent, and may send the control information to the UE. Further, the transceiver unit may further send downlink data to the UE, and receive uplink data sent by the UE.

According to still another aspect, an embodiment of the present invention provides a communications system, and the system includes the at least one TRP described in the foregoing aspects.

According to another aspect, an embodiment of the present invention provides a communications system, and the system includes the UE described in the foregoing aspects.

According to another aspect, an embodiment of the present invention provides a communications system, and the system includes the at least one TRP and the UE described in the foregoing aspects.

According to yet another aspect, an embodiment of the present invention provides a computer storage medium, configured to store a computer software instruction used by the foregoing UE. The computer storage medium includes a program implemented to execute the foregoing aspects.

According to yet another aspect, an embodiment of the present invention provides a computer storage medium, configured to store a computer software instruction used by the foregoing TRP. The computer storage medium includes a program implemented to execute the foregoing aspects.

According to yet another aspect, an embodiment of the present invention provides a communication method, where the method includes: receiving, by user equipment, quantity information that is sent by a transmission reception point TRP and that is of control information to be sent to the user equipment, where a quantity of the control information to be sent to the user equipment is N, and N is an integer greater than or equal to 1; determining, by the user equipment based on the quantity information, that a quantity of control information that needs to be detected is N; and detecting, by the user equipment, the control information from N TRPs.

In a possible implementation, the quantity information of the control information to be sent to the user equipment is included in a first transmission parameter set, and the control information is included in a second transmission parameter set.

In a possible implementation, N is an integer greater than or equal to 2, the first transmission parameter set further includes content indication information of a second transmission parameter set, and the content indication information of the second transmission parameter set indicates whether N second transmission parameter sets to be sent to the user equipment are the same.

In a possible implementation, content of the N second transmission parameter sets is the same, and the method further includes: combining, by the user equipment, the detected N second transmission parameter sets.

In a possible implementation, content of the N second transmission parameter sets is different, and the method further includes: obtaining, by the user equipment, scheduling information of N data channels based on the N second transmission parameter sets detected from the N TRPs, and separately performing, by the user equipment, data transmission on the N data channels.

In a possible implementation, the quantity information of the control information to be sent to the user equipment is included in level-1 downlink control information of a second transmission parameter set, and the control information is included in level-2 downlink control information of the second transmission parameter set.

In a possible implementation, N is an integer greater than or equal to 2, and the level-1 downlink control information of the second transmission parameter set further includes control information content indication information, and the control information content indication information indicates whether the N pieces of control information to be sent to the user equipment are the same.

In a possible implementation, content of the N pieces of control information is the same, and the method further includes: combining, by the user equipment, the detected N pieces of control information.

In a possible implementation, content of the N pieces of control information is different, and the method further includes: obtaining, by the user equipment, scheduling information of N data channels based on the N pieces of control information detected from the N TRPs, and separately performing, by the user equipment, data transmission on the N data channels.

In a possible implementation, the N pieces of control information schedule data transmission on a same carrier.

According to yet another aspect, an embodiment of the present invention provides user equipment. The user equipment includes: a transceiver, configured to receive quantity information that is sent by a transmission reception point TRP and that is of control information to be sent to the user equipment, where a quantity of the control information to be sent to the user equipment is N, and N is an integer greater than or equal to 1; and a processor, configured to determine, based on the quantity information, that a quantity of control information that needs to be detected is N, and detect the control information from N TRPs In a possible implementation, the quantity information of the control information to be sent to the user equipment is included in a first transmission parameter set, and the control information is included in a second transmission parameter set.

In a possible implementation, N is an integer greater than or equal to 2, the first transmission parameter set further includes content indication information of a second transmission parameter set, and the content indication information of the second transmission parameter set indicates whether the second transmission parameter sets are the same.

In a possible implementation, content of the N second transmission parameter sets is the same, and the processor is further configured to combine the detected N second transmission parameter sets.

In a possible implementation, content of the N second transmission parameter sets is different, the processor is further configured to obtain scheduling information of N data channels based on the detected N second transmission parameter sets, and the transceiver is further configured to separately perform data transmission on the N data channels.

In a possible implementation, the quantity information of the control information to be sent to the user equipment is included in level-1 downlink control information of a second transmission parameter set, and the control information is included in level-2 downlink control information of the second transmission parameter set.

In a possible implementation, N is an integer greater than or equal to 2, and the level-1 downlink control information of the second transmission parameter set further includes control information content indication information, and the control information content indication information indicates whether the N pieces of control information to be sent to the user equipment are the same.

In a possible implementation, content of the N pieces of control information is the same, and the processor is further configured to combine the detected N pieces of control information.

In a possible implementation, content of the N pieces of control information is different, the processor is further configured to obtain scheduling information of N data channels based on the N pieces of control information detected from the N TRPs, and the transceiver is further configured to separately perform data transmission on the N data channels.

In a possible implementation, the N pieces of control information schedule data transmission on a same carrier.

According to the technical solutions provided in the embodiments of the present invention and the method provided in the embodiments of the present invention, the TRP may use downlink control information in a same format in both single-point transmission and multipoint transmission, and there is no need to extend the downlink control information or frequently change the format of the downlink control information. Therefore, both the TRP and the UE can easily implement different transmission, and can also be well backward compatible with UE single-connection transmission.

BRIEF DESCRIPTION OF DRAWINGS

To describe the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following describes the technical solutions in the embodiments of this application with reference to the accompanying drawings in the embodiments of this application.

Figure 1A:
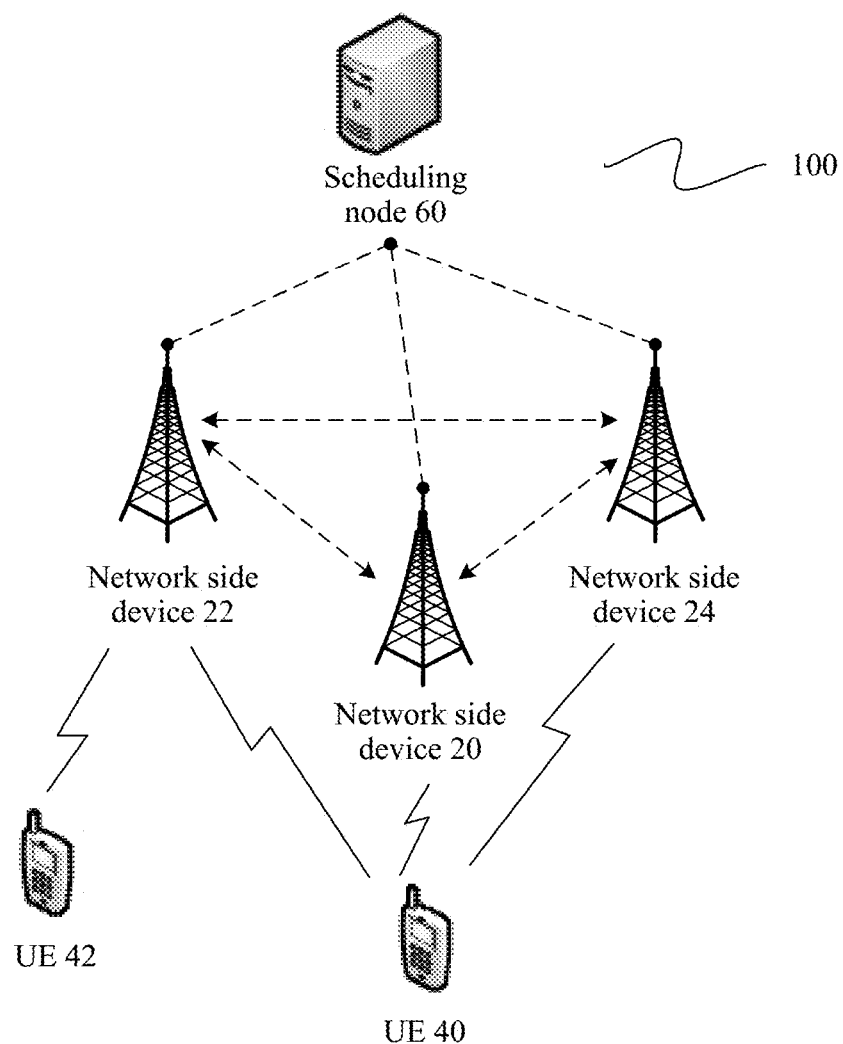
FIG. 1A is a schematic diagram of a communications system according to an embodiment of this application.
Figure 1B:
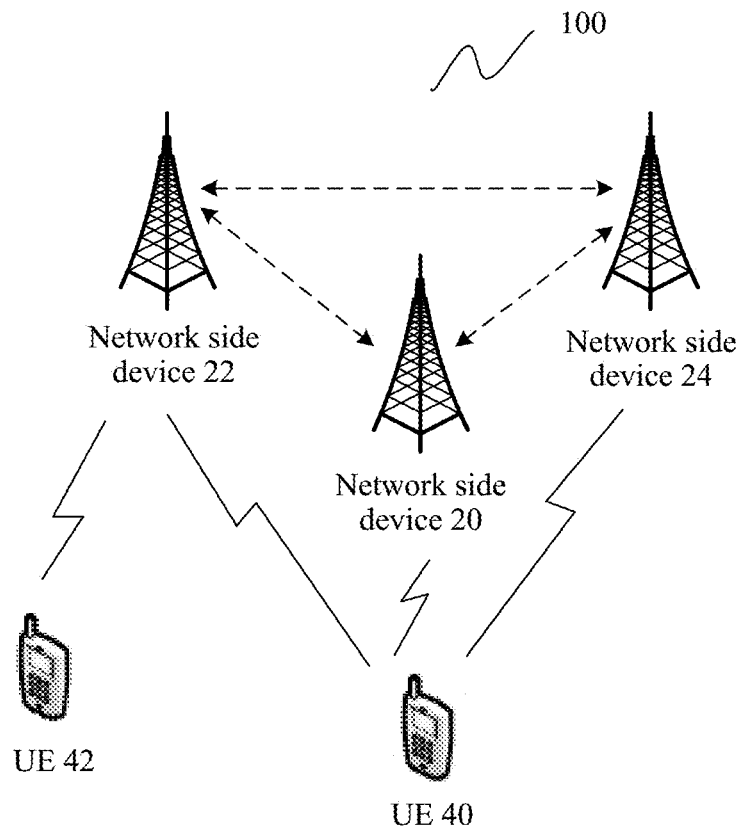
FIG. 1B is a schematic diagram of another communications system according to an embodiment of this application.

To resolve a prior-art problem that downlink control information does not support diversity transmission and/or multi-stream transmission in a multipoint coordination scenario, the embodiments of this application provide a downlink control information indication solution based on a communications system shown in FIG. 1A or FIG. 1B, so as to support diversity transmission and/or multi-stream transmission in the multipoint coordination scenario.

As shown in FIG. 1A and FIG. 1B, an embodiment of this application provides a communications system 100. The communications system 100 includes at least two network side devices and at least one user equipment. The user equipment (UE) accesses the network side device by using a radio interface to perform communication, or may communicate with another UE, for example, communication in a device to device (D2D) scenario or an machine to machine (M2M) scenario. The network side device may communicate with the UE, or may communicate with another network side device, for example, communication between a macro base station and an access point. In the communications system 100, one network side device may provide a communications service for one or more UEs. For example, a network side device 22 provides a communications service for UE 42. One UE may communicate with a plurality of network side devices on a same carrier. For example, UE 40 may simultaneously receive, on a same carrier and in a same time period, downlink data transmitted by a network side device 20, the network side device 22, and a network side device 24. That is, at least two network side devices transmit downlink data to the UE in a multipoint diversity and/or multipoint multi-stream transmission mode. The multipoint diversity and/or multipoint multi-stream transmission mode may be implemented by using a technology such as space diversity and/or spatial multiplexing. This is not limited in this application.

In a scenario in which multipoint diversity and/or multipoint multi-stream technologies are applied, a network side device that provides services such as an radio resource control (RRC) connection, a non-access stratum (NAS) mobility management, and security input for the user equipment by using a radio air interface protocol is defined as a serving network side device of the UE, and other one or more network side devices that send downlink data to the UE are defined as cooperative network side devices. Communication may be performed between the serving network side device and the cooperative network side device and between a plurality of cooperative network side devices, for example, control message and/or indication information transfer may be performed. In the communications system 100 provided in this embodiment of this application, the plurality of network side devices that transmit the downlink data to the UE in the multipoint diversity and/or multipoint multi-stream transmission mode may be different transmit points of a same device, for example, a plurality of radio units (RU) of a distributed base station; or may be a plurality of independent network side devices, for example, a plurality of base stations; or may be a mixture of the foregoing two cases, as may be understood. This is not limited in this application. Optionally, in the embodiments of this application, a first network side device may be the foregoing serving network side device, and a second network side device may be the foregoing cooperative network side device.

Optionally, the plurality of network side devices may be controlled and/or scheduled by a scheduling node. For example, in FIG. 1A, the network side device 20, the network side device 22, and the network side device 24 may be controlled and/or scheduled by a scheduling node 60, and the scheduling node sends a control message and/or indication information to the plurality of network side devices. Optionally, a function of the scheduling node may also be completed by one or more network side devices. For example, in FIG. 1B, the network side device 20 may implement the function of the scheduling node, and send a control message and/or indication information to the network side device 22 and/or the network side device 24. It should be noted that the scheduling node may be an independent physical device (for example, the scheduling node 60 shown in FIG. 1A), or may be a software and/or hardware function module integrated into the network side device. For example, in FIG. 1A or FIG. 1B, the network side device 20 may implement the function of the scheduling node. In this case, the network side device 20 may perform centralized resource scheduling and management and the like based on information sent by another network side device and information obtained and maintained by the network side device 20, and certainly another network side device may implement the function of the scheduling node. This is not limited in this application.

In this embodiment of this application, the communications system 100 may be various radio access technology (RAT) systems, for example, a Code Division Multiple Access (CDMA) system, a Time Division Multiple Access (TDMA) system, a Frequency Division Multiple Access (FDMA) system, an orthogonal frequency division multiple access (OFDMA) system, and a single carrier frequency division multiple access (single carrier FDMA, SC-FDMA) system. The terms "network" and "system" may be interchanged. A radio technology such as Universal Terrestrial Radio Access (UTRA) or CDMA2000 may be implemented in the CDMA system. UTRA may include a Wideband CDMA (WCDMA) technology and another technology transformed from CDMA. CDMA2000 may cover interim standards (IS) 2000 (IS-2000), IS-95, and IS-856. A radio technology such as a Global System for Mobile Communications (GSM) may be implemented in the TDMA system. A radio technology such as evolved Universal Terrestrial Radio Access (evolved UTRA, E-UTRA), Ultra Mobile Broadband (UMB), IEEE 802.11 (Wi-Fi), IEEE 802.16 (WiMAX), IEEE 802.20, or Flash OFDMA may be implemented in the OFDMA system. UTRA is corresponding to UMTS, and E-UTRA is corresponding to an evolved version of UMTS. A new version of UMTS, namely, E-UTRA, is used in 3GPP Long Term Evolution (LTE) and various versions evolved based on LTE. In addition, the communications system 100 may be applied to a future communications technology, such as the 5th Generation mobile communication (5G). The technical solutions provided in the embodiments of this application are applicable to a communications system that uses multipoint diversity and/or multipoint multi-stream transmission technologies. A system architecture and a service scenario described in the embodiments of this application are intended to more clearly describe the technical solutions in the embodiments of this application, and do not constitute a limitation on the technical solutions provided in the embodiments of this application. A person of ordinary skill in the art may learn that, with evolution of a network architecture and emergence of a new service scenario, the technical solutions provided in the embodiments of this application are applicable to similar technical problems.

In the embodiments of this application, a network side device in this application includes a base station (BS), a network controller, a mobile switching center, or the like. An apparatus that performs direct communication with user equipment over a radio channel is usually a base station, and the base station may include a macro base station, a micro base station (also referred to as a small cell), a relay node, an access point, an remote radio unit (RRU), and the like that are in various forms. In systems using different radio access technologies, devices having a function of the base station may have different names. For example, the device is referred to as an evolved NodeB (eNB, or eNodeB) in an LTE system, and is referred to as a NodeB in a 3rd Generation (3G) system. For ease of description, in all the embodiments of this application, all the foregoing apparatuses that provide a wireless communication function for the UE are collectively referred to as a base station or a BS.

The UE in the embodiments of this application may include various handheld devices, in-vehicle devices, wearable devices, or computing devices that have a wireless communication function, or other processing devices connected to a wireless modem. The UE may also be referred to as a mobile station (MS), a terminal, or a terminal device, and may further include a subscriber unit, a cellular phone, a smartphone, a wireless data card, a personal digital assistant (PDA), a tablet computer, a wireless modem, a handheld device, a laptop computer, a cordless phone or a wireless local loop (WLL) station, a machine type communication (MTC) terminal, or the like. For ease of description, the devices mentioned above are collectively referred to as UE in all the embodiments of this application.

It should be noted that in the communications system 100 shown in FIG. 1A or FIG. 1B, a quantity of included network side devices and a structure of the network side device, a quantity and distribution of different network side devices and a quantity and distribution of UEs that communicate with the network side devices, a quantity of network side devices that use the multipoint diversity and/or multipoint multi-stream transmission technologies in a same time period and on a same carrier to send data to same UE, and a quantity and types of UEs are merely examples. The embodiments of this application are not limited thereto. In addition, in the communications system 100 shown in FIG. 1A or FIG. 1B, although the network side device 20, the network side device 22, the network side device 24, and a plurality of UEs are shown, the communications system 100 may further include, for example, a core network device or a device configured to carry a virtualized network function in addition to the network side device and the UE. This is obvious to a person of ordinary skill in the art, and details are not described herein.

The following explains some common concepts or definitions in the embodiments of this application. It should be noted that some English abbreviations in an LTE system are used as examples in this specification for describing the embodiments of this application. This may vary with evolution of a network. For a specific evolution, refer to descriptions in corresponding standards.

"Antenna ports" described in this application are different logical ports defined to distinguish between different channels. A channel that a symbol sent on an antenna port passes may be determined based on a channel that another symbol sent on the same antenna port passes. For example, a data receiving end may perform channel estimation and data demodulation by using a demodulation-reference signal (DM-RS) sent on a same antenna port used for sending data. An "antenna port number" described in this application is used to indicate a specific antenna port, for example, an antenna port number 7 indicates an antenna port 7.

A "carrier" in this application is corresponding to a specific frequency band, for example, a frequency band whose central frequency is 800 M or 900 M.

"Non-quasi co-location" described in this application means that signals sent by antenna ports of any two of a plurality of network side devices that perform data transmission may not have a same large-scale property. The plurality of network side devices that perform data transmission may belong to a same cell or belong to different cells. This is not limited in the embodiments of this application. For a same large-scale property, refer to a definition in a 3GPP (3rd Generation Partnership Project, 3rd Generation Partnership Project) standard; or the same large-scale property may be configured based on an actual system requirement. Having the same large-scale property is defined as follows in a current 3GPP standard: A large-scale property of a channel passing by a symbol when transmitted through an antenna port may be derived by using a large-scale property of a channel passing by a symbol when transmitted through another antenna port. For the large-scale property, refer to a definition in a 3GPP standard; or the large-scale property may be configured based on an actual system requirement. In a current 3GPP standard definition, the large-scale property may include one or more of delay spread, Doppler spread, a Doppler frequency shift, an average gain, and an average delay.

"Coordinated multipoint transmission/reception" in this application includes but is not limited to "multipoint diversity and/or multipoint multi-stream (coordinated) transmission." In this application, "multipoint diversity and/or multipoint multi-stream (coordinated) transmission" refers to coordinated multipoint transmission/reception of downlink data sent by a plurality of network side devices to same user equipment on a same carrier and a same time-domain resource (for example, a same subframe).

The "subframe" described in this application refers to a time unit defined in time domain. For example, a subframe defined in the LTE system includes two slots, and each timeslot includes seven symbols. The "subframe" in this application may be the subframe in the LTE system, or may be another time unit defined based on a system requirement, for example, a subframe that includes only one timeslot, or a subframe that includes only one symbol. This is not limited in this application. A "resource element" described in this application refers to a resource unit specified to describe a frequency-domain resource and/or a time-domain resource, and may have different specified forms in different systems, for example, a resource element (Resource Element, RE) in the LTE system. This is not limited in this application.

A physical downlink control channel or an enhanced physical downlink control channel described in this application is mainly used to carry resource scheduling information and other downlink control information, for example, a physical downlink control channel (PDCCH), an enhanced physical downlink control channel (EPDCCH), and another downlink channel that has the foregoing function and that is defined as a network evolves. A physical downlink shared channel described in this application is mainly used to carry service data or other data required by a system, for example, a physical downlink shared channel (PDSCH) in the LTE system and another downlink channel that has the foregoing function and that is defined as a network evolves. The downlink control information described in this application is mainly used to carry uplink and/or downlink scheduling information, for example, downlink control information (DCI) in the LTE system and other downlink control information that has the foregoing function and that is defined as a network evolves. Based on different specific formats of the downlink control information, the downlink control information may further carry other information required by the system, such as an uplink power control command.

The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

In addition, it may be understood that the terms "first" and "second" in this application are merely for ease of description and understanding, and shall not constitute any limitation on the embodiments of this application.

The following describes in more detail the solutions provided in the embodiments of this application with reference to the accompanying drawings.

Figure 2A:
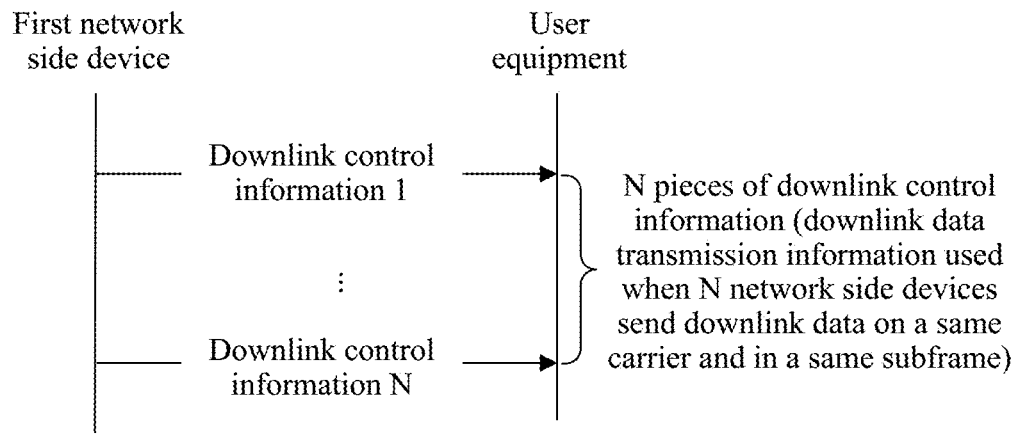
FIG. 2A is a schematic diagram of a downlink control information indication method according to an embodiment of this application.

FIG. 2A is a schematic diagram of a downlink control information indication method according to an embodiment of this application.

A first network side device sends N pieces of downlink control information to user equipment. N is an integer greater than 1, and the N pieces of downlink control information include downlink data transmission information used when N network side devices send downlink data to the user equipment on a same carrier and in a same subframe. In a scenario in which the N network side devices perform multipoint diversity and/or multipoint multi-stream coordinated transmission, a plurality of network side devices send downlink data to the UE on a same carrier and in a same time period. The UE needs to learn of, by using downlink control information, downlink data transmission information used when each network side device sends the downlink data, for example, information about an antenna port used by each network side device. For example, in an LTE system, when a plurality of network side devices send downlink data to the UE by using a PDSCH, the UE needs to be notified of related information of the PDSCH by using DCI, so that the UE receives the downlink data on the PDSCH. The N pieces of downlink control information are used to separately indicate the downlink data transmission information used when the N network side devices that participate in coordinated multipoint transmission/reception perform downlink data transmission. Therefore, coordinated multipoint transmission/reception is supported, and when the user equipment cannot normally receive downlink data sent by some network side devices because some downlink control information encounters an error, the user equipment may still receive, based on an indication of remaining downlink control information that encounters no error, downlink data sent by a network side device corresponding to the remaining downlink control information that encounters no error, thereby ensuring robustness of downlink data transmission in the multipoint diversity transmission and/or multipoint multi-stream transmission scenarios, and increasing system and user throughputs.

Optionally, the N network side devices may be N non-quasi co-located network side devices.

Optionally, the first network side device may be a serving network side device.

Optionally, the first network side device may be one of the N network side devices that send the downlink data to the UE on the same carrier and in the same subframe, or may not belong to the N network side devices. When the first network side device serves as a serving network side device of the UE, even if the first network side device does not participate in multipoint diversity and/or multipoint multi-stream transmission at a current moment (for example, a current subframe), the first network side device may still send the downlink control information to the UE, so as to support the UE in receiving downlink data from another cooperative network side device.

Optionally, the first network side device sends value-related information of N to the UE, and the information is used to determine a value of N. In an example, a relationship between N and other related information may be pre-agreed, and the network side device sends the other related information, so that the user equipment learns of the value of N. For example, the UE determines a size of N by using a transmission mode indicated by the first network side device. For example, there are two network side devices by default to perform data transmission during multipoint multi-stream coordinated transmission or multipoint diversity coordinated transmission, and when the first network side device notifies the UE that a transmission mode of multipoint multi-stream or multipoint diversity is currently used, correspondingly N=2. In another example, the first network side device may notify the user equipment of a possible value of N. For example, the first network side device notifies, by using RRC signaling, the UE of a quantity M (M>1) of network side devices that may participate in coordinated multipoint transmission/reception (multipoint multi-stream coordinated transmission and/or multipoint diversity coordinated transmission). A quantity N of actually sent downlink control information in different subframes depends on a current scheduling policy and meets 1<N≤M. In this example, the UE attempts to detect M pieces of downlink control information, and a quantity of finally received downlink control information is subject to an actually detected quantity of downlink control information. In still another example, the first network side device may notify the user equipment of value information of N. For example, the first network side device notifies, by using RRC signaling, the UE of a quantity N of network side devices that participate in coordinated multipoint transmission/reception at a current moment, and the UE attempts to detect N pieces of downlink control information. After learning of a quantity of downlink control information that needs to be detected, the UE may detect a plurality of pieces of downlink control information according to the quantity. For example, in an LTE system, N=2 is used as an example. After the UE learns that a quantity of DCI required for blind detection is 2, if the first network side device does not configure an EPDCCH for the UE, the UE performs blind detection on two pieces of DCI in a PDCCH search space corresponding to the first network side device; or if the first network side device configures an EPDCCH for the UE, the UE performs blind detection on two pieces of DCI in an EPDCCH search space configured by a serving base station for the UE. If no DCI is detected on the EPDCCH during blind detection performed by the UE, or a quantity of DCI detected by the UE during blind detection is less than 2, the UE performs blind detection on remaining DCI in the PDCCH search space corresponding to the first network side device. The search space is a group of candidate control channel element sets, the control channel elements are aggregated at a specific level, different aggregation levels are corresponding to different search spaces, and the user equipment performs, in different search spaces, blind detection on downlink control information to be received by the user equipment.

In another example, the first network side device may notify the user equipment of a possible value of N. For example, the first network side device notifies, by using RRC signaling, the UE of a quantity M (M>1) of network side devices that may participate in coordinated multipoint transmission/reception (multipoint multi-stream coordinated transmission and/or multipoint diversity coordinated transmission). A quantity N of actually sent downlink control information in different subframes depends on a current scheduling policy and meets 1<N≤M. In this example, the UE attempts to detect M pieces of downlink control information, until M pieces of downlink control information are detected or detection is completed in all search spaces (for example, a PDCCH search space), and a quantity of finally received downlink control information is subject to an actually detected quantity of downlink control information. Optionally, value information of M may also be notified to the UE by using other signaling (for example, physical layer signaling). This is not limited in this application.

Optionally, the network side device may implicitly notify the UE of quantity information of the downlink control information, for example, value-related information of N or M (M is a quantity of network side devices that may participate in coordinated multipoint transmission/reception and meets 1<N≤M, that is, M is a maximum value of a quantity of downlink control information that needs to be detected by the UE). The implicit notification means that a relationship between a quantity of downlink control information and other information (for example, configuration information, resource information, or indication information) is determined by using a pre-agreement or a preset message, and the UE may determine the quantity of downlink control information by using the other configuration information. The network side device that notifies the UE of the quantity information of the downlink control information may be the first network side device in this application.

In an example, the UE may determine the quantity information of the downlink control information by using information about a control channel resource set, for example, value-related information of N or M. The control channel resource set includes at least one resource element group (REG), and includes at least one search space. The information about the control channel resource set may be at least one of quantity information of the control channel resource set, and quantity information of a search space included in the control channel resource set. If the network side device configures or activates P control channel resource sets, the UE may consider by default that each control channel resource set is corresponding to one piece of downlink control information, that is, the UE needs to detect P pieces of downlink control information. For example, when performing control information detection, the UE attempts to detect and receive one piece of downlink control information for each control channel resource set or each activated control channel resource set, and if one piece of downlink control information is detected or a maximum quantity of blind detection is reached for the control channel resource set, the UE stops performing detection on the control channel resource set, and continues to perform detection on another control channel resource set, until detection on configured or activated control channel resource sets is completed. The quantity of downlink control information and a quantity of control channel resource sets may be the same or may be different. For example, one control channel resource set is corresponding to one piece of downlink control information, or one control channel resource set is corresponding to at least two pieces of downlink control information, or at least two control channel resource sets are corresponding to one piece of downlink control information. A specific correspondence may be predefined, or may be notified by the network side device to the UE, for example, by using physical layer signaling or higher layer signaling. This is not limited herein. In actual transmission, the network side device may transmit less than or equal to P pieces of downlink control information. For example, in a non-ideal backhaul case, the network side device is independently scheduled. A network side device does not know whether another network side device transmits downlink control information. Therefore, the network side device configures a maximum quantity (for example, M) of downlink control information that needs to be detected by the UE, and a quantity (for example, N) of actually transmitted downlink control information may be less than or equal to the maximum quantity.

In another example, the UE may determine the quantity information of the downlink control information by using demodulation reference signal (DMRS) antenna port group information, for example, value-related information of N or M. For example, if the network side device predefines or configures Q DMRS antenna port groups, and each DMRS antenna port group includes at least one DMRS antenna port, the UE may consider by default that each DMRS antenna port group is corresponding to one piece of downlink control information, that is, the UE needs to detect Q pieces of downlink control information. When detecting the downlink control information, the UE stops detection if the UE detects Q pieces of downlink control information or reaches a maximum quantity of blind detection. The quantity of downlink control information may be the same as or different from a quantity of DMRS antenna port groups. For example, one DMRS antenna port group may be corresponding to one piece of downlink control information, or one DMRS antenna port group is corresponding to at least two pieces of downlink control information, or at least two DMRS antenna port groups are corresponding to one piece of downlink control information. A specific correspondence may be predefined, or may be notified by the network side device to the UE, for example, by using physical layer signaling or higher layer signaling. This is not limited herein. In actual transmission, the network side device may transmit less than or equal to Q pieces of downlink control information. For example, in a non-ideal backhaul case, network side devices are independently scheduled, and do not know whether each other transmits downlink control information. Therefore, the network side device configures a maximum quantity of downlink control information that needs to be detected by the UE, and a quantity of actually transmitted downlink control information may be less than or equal to the maximum quantity.

In still another example, the UE may determine the quantity information of the downlink control information by using quasi co-location (QCL) indicator information, for example, value-related information of N or M. For example, if the network side device predefines or configures R pieces of quasi co-location indicator information, the UE may consider by default that each piece of quasi co-location indicator information is corresponding to one piece of downlink control information, that is, the UE needs to detect R pieces of downlink control information. When detecting the downlink control information, the UE stops detection if the UE detects R pieces of downlink control information or reaches a maximum quantity of blind detection. The quantity of downlink control information may be the same as or different from a quantity of quasi co-location indicator information. For example, one piece of quasi co-location indicator information is corresponding to one piece of downlink control information, or one piece of quasi co-location indicator information is corresponding to at least two pieces of downlink control information, or at least two pieces of quasi co-location indicator information are corresponding to one piece of downlink control information. A specific correspondence may be predefined, or may be notified by the network side device to the UE, for example, by using physical layer signaling or higher layer signaling. This is not limited herein. In actual transmission, the network side device may transmit less than or equal to R pieces of downlink control information. For example, in a non-ideal backhaul case, network side devices are independently scheduled, and do not know whether each other transmits downlink control information. Therefore, the network side device configures a maximum quantity of downlink control information that needs to be detected by the UE, and a quantity of actually transmitted downlink control information may be less than or equal to the maximum quantity.

Optionally, the network side device may notify the UE of the quantity information of the downlink control information by using configuration information, and the configuration information is used to indicate that the UE needs to detect at least one piece of downlink control information. The network side device may flexibly implement dynamic switching between single-cell transmission and coordinated transmission by using the configuration information. For example, if it is configured that the UE detects one piece of downlink control information, it indicates that currently single-cell transmission is performed, that is, the UE may stop detection after detecting one piece of downlink control information or reaching a maximum quantity of blind detection. This reduces detection complexity of the UE. If it is configured that the UE detects at least two pieces of downlink control information, it indicates that currently coordinated transmission may be performed, and the UE can stop detection only after detecting at least two pieces of downlink control information or reaching a maximum quantity of blind detection. This avoids missed detection of the UE and prevents the UE from stopping detection when detecting one piece of downlink control information. The quantity information of the downlink control information is notified to the UE by using the configuration information, thereby avoiding that the UE can stop detection only after reaching the maximum quantity of blind detection because the UE does not know the quantity information of the downlink control information, and reducing time and complexity required for detecting the downlink control information by the UE. The network side device that notifies the UE of the quantity information of the downlink control information may be the first network side device in this application.

Optionally, when the first network side device simultaneously implements a scheduling function, the first network side device may learn of, by using a scheduling result, the quantity N of network side devices that currently participate in coordinated multipoint transmission/reception.

Optionally, the first network side device may further receive value-related information of N that is sent by a scheduling node. When the N network side devices are centrally scheduled by the scheduling node to perform coordinated multipoint transmission/reception, the scheduling node may send the value-related information of N to the first network side device, and then the first network side device sends the value-related information of N to the UE. It may be understood that the value-related information of N that is sent by the scheduling node to the first network side device may be the same as or different from the value-related information of N that is sent by the first network side device to the UE. This is not limited in this application. Optionally, the scheduling node may send the information to the first network side device by using an X2 interface. Optionally, the first network side device may also determine, by using a quantity that is of downlink data transmission information of other network side devices and that is sent by the scheduling node, the quantity N of network side devices that currently participate in coordinated multipoint transmission/reception. When the N network side devices are centrally scheduled by the scheduling node to perform coordinated multipoint transmission/reception, the scheduling node further needs to send downlink data transmission information of another network side device that participates in coordinated multipoint transmission/reception to the first network side device, so that the first network side device sends N pieces of downlink control information. In this case, the first network side device may also determine the value of N by receiving a quantity of downlink data transmission information.

Optionally, the downlink control information includes network side device indication information of a network side device corresponding to the downlink control information. A plurality of pieces of downlink control information are sent by the first network side device to the UE, and each piece of downlink control information is corresponding to downlink data transmission information used when a different network side device sends downlink data. To enable the UE to determine that downlink data transmission information indicated by each piece of downlink control information is used by which network side device when sending downlink data, there is a need to indicate, in the downlink control information, a network side device corresponding to the downlink control information. Optionally, the first network side device may receive network side device indication information that is sent by the scheduling node and that is of N network side devices that send downlink data to the user equipment on a same carrier and in a same subframe, and send the network side device indication information to the UE by adding the network side device indication information to corresponding downlink control information. In a specific example, an indication field may be added to the downlink control information, to indicate different network side devices. For example, a transmit point indicator (transmit point indicator) field is added to the downlink control information. Table 1 provides an example of a transmit point indicator field that supports coordinated transmission of two network side devices, '0' indicates a transmit point 0 (TP0), and '1' indicates a transmit point 1 (TP1). Optionally, the transmit point 0 may be corresponding to a serving network side device (also referred to as a serving transmit point, Serving Transmit Point/Serving TP), and the transmit point 1 may be corresponding to a cooperative network side device (also referred to as a cooperative transmit point, Cooperative Transmit Point/Cooperative TP). Table 2 provides a design example of a transmit point indicator field that supports coordinated multipoint transmission/reception of at most four network side devices. '00' to '11' respectively indicate a transmit point 0 (TP0) to a transmit point 3 (TP3). Optionally, the transmit point 0 may be corresponding to a serving network side device, and the transmit point 1 to the transmit point 3 may be corresponding to cooperative network side devices. An indication field is added to the downlink control information to indicate different network side devices, can instruct a relatively large quantity of network side devices to perform coordinated multipoint transmission/reception, and is easy to extend.

TABLE 1

Design example of possible network side device indication information

| 'Transmit Point Indicator' field value | Network side device indicated by a specific value |
|---|---|
| '0' | TP0 (Serving TP) |
| '1' | TP1 (Cooperative TP) |

TABLE 2

Design example of another possible network side device indication information

| 'Transmit Point Indicator' field value | Network side device indicated by a specific value |
| --- | --- |
| '00' | TP0 (Serving TP) |
| '01' | TP1 (Cooperative TP) |
| '10' | TP2 (Cooperative TP) |
| '11' | TP3 (Cooperative TP) |

It should be noted that a specific information indication design manner in the downlink control information and/or other information provided in this application, including a name, a length, a value, and a correspondence of a specific information field or information element, is merely used as an example. A person skilled in the art may understand that another information element design manner may also complete indicating of the information in the solution of this application. This is not limited in this application. For example, for the design of the foregoing network side device indication information, in actual, a value range of the information field may be designed based on a quantity of network side devices included in a supported maximum coordinated transmission set.

Optionally, the N pieces of downlink control information may be downlink control information in a same format, or may include downlink control information in two or more formats. The N pieces of downlink control information include downlink control information in different formats, so that the UE distinguishes between different network side devices based on formats of the downlink control information, and there is no need to add, to the downlink control information, an information field used to indicate a network side device, so as to reduce bit quantity of the downlink control information. Optionally, the N pieces of downlink control information may include first-format downlink control information and/or second-format downlink control information, where the second-format downlink control information includes downlink data resource element mapping information and quasi co-location indicator information, and the downlink data resource element mapping information and the quasi co-location indicator information are used to receive downlink data. Optionally, the first-format downlink control information is corresponding to the first network side device, and the second-format downlink control information is corresponding to a second network side device. Optionally, the first network side device may be a serving network side device, and the second network side device may be a cooperative network side device. In a specific example, two network side devices including a serving network side device in an LTE system perform coordinated multipoint transmission/reception. The serving network side device does not need a PQI (PDSCH RE Mapping and QCL Indicator, physical downlink shared channel resource element mapping and quasi co-location indicator) indicator field to indicate, to the UE, downlink data resource element mapping information and quasi co-location indicator information used to receive PDSCH downlink data. Therefore, a DCI format 2C may be used. A cooperative network side device uses a DCI format 2D including a PQI field. Information carried in the PQI field is used to notify the UE of downlink data resource element mapping information and quasi co-location indicator information that are required to receive downlink data sent by the cooperative network side device on a PDSCH. When performing blind detection on the two pieces of downlink control information, the UE attempts to separately perform blind detection on the two DCI formats. Optionally, the two manners: using the format of the downlink control information to distinguish between different network side devices, and adding network side device indication information to downlink control information may be mixed. For example, one network side device participating in coordinated multipoint transmission/reception uses the first-format downlink control information, and other one or more network side devices use the second-format downlink control information. The second-format downlink control information includes downlink data resource element mapping information and quasi co-location indicator information and the network side device indication information. For a specific implementation of the network side device indication information, refer to the description in the previous paragraph. Details are not described herein again. Optionally, the first network side device may indicate, to the UE by using signaling, which solution is currently used to indicate different network side devices. For example, in the LTE system, RRC signaling may be used to notify the UE of a specific used network side device indication solution.

Optionally, the downlink data transmission information includes first information used to send the downlink data. Antenna port numbers indicated by the first information in the N pieces of downlink control information are different from each other, or combinations that are of an antenna port number and a reference signal scrambling manner and that are indicated by the first information in the N pieces of downlink control information are different from each other. The first information is an antenna port, a quantity of layer, and reference signal scrambling information. That the combinations of an antenna port number and a reference signal scrambling manner are different from each other includes the following: Antenna port numbers are different, and/or the antenna port numbers are the same but used reference signal scrambling manners are different. The first information is used to indicate a code word, an antenna port number, a quantity of sending layer, and scrambling manners required for reference signals sent on some antenna ports that are used when the network side device sends the downlink data. For example, information fields: Antenna port(s), and scrambling identity and number of layers in DCI formats 2C/2D in an LTE system provide the first information. For coordinated multipoint transmission/reception, network side devices transmit downlink data to same UE on a same time-domain resource (for example, a same subframe) on a same carrier, and the network side devices independently determine, based on a channel condition, a quantity of data transmission layer. In addition, to avoid mutual interference between reference signals (such as DM-RSs) from different network side devices, a plurality of network side devices participating in coordinated multipoint transmission/reception need to use different antenna port numbers or use different scrambling manners for reference signals on a same antenna port number. Therefore, the antenna port number or the reference signal scrambling manner needs to be separately indicated in downlink control information corresponding to the network side devices participating in coordination. Antenna port numbers or combinations that are of an antenna port number and a reference signal scrambling manner and that are indicated in the downlink control information corresponding to the network side devices participating in coordination are different from each other. Therefore, reference signals in downlink data sent in a multipoint coordination process are orthogonal to each other, thereby ensuring correct receiving of the downlink data.

Optionally, the first information indicates the antenna port, the quantity of layer, and the reference signal scrambling information in a joint coding indication manner or in an independent indication manner. For the joint coding indication manner, the foregoing three pieces of information may be indicated by using one information element, for example, a correspondence between a bit (bit) information of one information element and the foregoing three pieces of information is established. Alternatively, two pieces of information may be jointly indicated by using one information element, and the other piece of information is indicated by using another information element. For example, bit information of one information element is used to indicate the antenna port and information about the quantity of layer, and a correspondence between the bit information of the information element and the antenna port and the information about the quantity of layer is established. Bit information of another information element indicates the reference signal scrambling information. For another example, bit information of one information element is used to indicate the antenna port and the reference signal scrambling information, for example, a correspondence between the bit information of the information element and the antenna port and the reference signal scrambling information is established. Bit information of another information element indicates the information about the quantity of layer. For still another example, bit information of one information element is used to indicate the quantity of layer and the reference signal scrambling information, and a correspondence between the bit information of the information element and the quantity of layer and the reference signal scrambling information is established. Bit information of another information element indicates information about the antenna port. For the independent indication manner, bit information of one information element may be used to indicate information about the antenna port, bit information of another information element indicates information about the quantity of layer, and bit information of still another information element indicates the reference signal scrambling information.

Optionally, the first information may be at least one of the antenna port, the quantity of layer, and the reference signal scrambling information. For example, the antenna port may be determined by configuring the quantity of layer and an antenna port group to which the antenna port belongs. In a specific example, if antenna ports in an antenna port group are {7, 8, 11, 13}, and the quantity of layer is 2, the antenna ports are determined to be 7 and 8; if the antenna ports in the antenna port group are {9, 10, 12, 14}, and the quantity of layer is 2, the antenna ports are determined to be 9 and 10; and so on. For another example, the antenna port may be determined by configuring a quantity of antenna ports and an antenna port group to which the antenna port belongs. In a specific example, if antenna ports in an antenna port group are {7, 8, 11, 13}, and the quantity of antenna ports is 2, the antenna ports are determined to be 7 and 8; if the antenna ports in the antenna port group are {9, 10, 12, 14}, and the quantity of antenna ports is 2, the antenna ports are determined to be 9 and 10; and so on. Information about the antenna port group may be predefined or notified by using other signaling. Optionally, the antenna port group to which the antenna port belongs may be explicitly or implicitly indicated. For example, during explicit indication, at least one bit is used to indicate a group number of the antenna port group. For example, during implicit indication, quasi co-location indicator information is used to determine the antenna port group to which the antenna port belongs. The scrambling information may be predefined or notified by using other signaling. This solution can reduce control information overloads.

Optionally, the first information may be a correspondence between an antenna port and a quantity of layer. The first information in the N pieces of downlink control information is corresponding to a same correspondence or different correspondences between an antenna port and a quantity of layer.

In a specific example, the first information in the N pieces of downlink control information is corresponding to a same first correspondence. The first correspondence is a correspondence among a code word, an antenna port, a quantity of layer, and a reference signal scrambling manner, and is used to determine, in combination with the first information, code words, antenna ports, quantities of layer, and reference signal scrambling manners used when the N network side devices send the downlink data to the user equipment on the same carrier and in the same subframe. A unified first correspondence is established for a plurality of network side devices participating in coordination, a set of antenna ports that can be used by each network side device is pre-allocated, and an antenna port number used by each network side device may be flexibly allocated and changed without changing the used first correspondence. A network side device participating in coordinated multipoint transmission/reception determines, based on a channel condition, a quantity of data transmission layer, determines, based on a quantity of code words to be sent and a set of antenna ports that can be used by the network side device and in combination with the first correspondence, an antenna port number or a combination that is of an antenna port number and a reference signal scrambling manner and that is to be used by the network side device, and in the downlink control information, indicates, to the UE by using the first information, a selected antenna port number or combination of an antenna port number and a reference signal scrambling manner. In a specific example, the first information in more than one piece of downlink control information in the N pieces of downlink control information indicates same or different information field values in a same first correspondence, and the same information field values or the different information field values are corresponding to different antenna port numbers or different combinations of an antenna port number and a reference signal scrambling manner.

For example, Table 3 provides a design example of a possible first correspondence. The first information indicates an information field value in the table. A port number index corresponding to each information field value in the table is in a one-to-one correspondence with a specific antenna port number in a set of antenna port numbers of a network side device. The set of antenna port numbers may be pre-agreed or may be dynamically indicated to the UE by using RRC signaling. For example, two network side devices participate in coordinated transmission, and a set of antenna ports of each network side device includes four antenna ports. A set of antenna ports of a first network side device is {7, 8, 11, 13}, and a set of antenna ports of a second network side device is {9, 10, 12, 14}. It is assumed that the first network side device transmits two code words, and a corresponding information field value is 1; and the second network side device transmits one code word, and a corresponding information field value is 0. Therefore, the UE learns, by parsing the information field values, that a quantity of transmission layer of the first network side device is 3, and corresponding antenna port numbers are 7, 8, and 11; and a quantity of transmission layer of the second network side device is 1, and a corresponding antenna port number is 9. It may be understood that specific antenna port numbers included in a set of antenna port numbers of a network side device, a quantity of antenna ports, and sorting of the antenna port numbers may be random or arbitrarily configured based on a system requirement. For example, the antenna port numbers are sorted in ascending or descending order, or based on parity, or based on different frequency domains of the antenna port numbers. This is not limited in this application.

TABLE 3

Example of a possible first correspondence

| One code word (One code word) Code word 0 enabled (Code word 0 enabled) Code word 1 disabled (Code word 1 disabled) | | Two code words (Two code words) Code word 0 enabled (Code word 0 enabled) Code word 1 enabled (Code word 1 enabled) | |
|---|---|---|---|
| Information field value (Value) | Quantity of layer and antenna port information (Message) | Information field value (Value) | Quantity of layer and antenna port information (Message) |
| 0 | One layer (layer), port index (port index) 1 | 0 | Two layers, port indexes 1-2 |
| 1 | Two layers, port indexes 1-2 | 1 | Three layers, port indexes 1-3 |
| 2 | Three layers, port indexes 1-3 | 2 | Four layers, port indexes 1-4 |
| 3 | Four layers, port indexes 1-4 | 3 | Reserved (Reserved) |

For another example, Table 4 provides an example of another possible first correspondence, where nSCID (Scrambling identity, SCID) is used to indicate a reference signal scrambling manner on an antenna port 7 or 8, and port (or ports) indicates a port. This table is inheritance of a correspondence table that is specified in 3GPP TS 36.212 and that is of indication fields: Antenna port(s), scrambling identity, and number of layers indication (Antenna port(s), scrambling identity, and number of layers indication) in DCI formats 2C/2D in an LTE system, and may be compatible with an indication manner that is in the prior art and/or an existing protocol and that is of an antenna port, a quantity of layer, and reference signal scrambling information in downlink control information. Optionally, when Table 4 is applied to a coordinated multipoint transmission/reception scenario, antenna port numbers used by network side devices may be successively corresponding to the network side devices according to a sorting sequence of the network side devices participating in coordination. Optionally, an index indication of a serving network side device is a TP0 (or 0) by default, and cooperative network side devices are successively indicated in ascending order based on a quantity of network side devices participating in coordination, that is, a TP1, a TP2, . . . (or 1, 2, . . . ). Based on a received index sequence of a TP and an information field value (namely, value in the table) in first information in downlink control information corresponding to the TP, the UE determines an antenna port number used by the network side device during actual transmission. For example, two network side devices participate in coordinated transmission. If a first network side device (TP0) transmits two code words, and an information field value is 2, it indicates that a quantity of transmission layer is 3, and antenna port numbers are 7-9. If a second network side device (TP1) transmits two code words, and an information field value is 2, it indicates that a quantity of transmission layer is 3. However, because the first network side device is sorted before the second network side device and has used the antenna port numbers 7-9, antenna port numbers used by the second network side device are 10-12 accordingly. When a quantity of network side devices that participate in coordinated transmission is greater than 2, extension may be performed directly based on the foregoing method to determine antenna port numbers or antenna port numbers and reference signal scrambling manners used by all network side devices.

TABLE 4

Example of another possible first correspondence

| One code word: Code word 0 enabled, Code word 1 disabled | | Two code words: Code word 0 enabled, Code word 1 enabled | |
|---|---|---|---|
| Value | Message | Value | Message |
| 0 | 1 layer, port 7, nSCID = 0 | 0 | 2 layers, ports 7-8, nSCID = 0 |
| 1 | 1 layer, port 7, nSCID = 1 | 1 | 2 layers, ports 7-8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

For another example, when Table 4 is applied to the coordinated multipoint transmission/reception scenario, an antenna port number or a combination that is of an antenna port number and a reference signal scrambling manner and that is used by the network side device may be further determined directly based on an indication of an information field of first information in downlink control information. When each network side device transmits only one layer of data, four network side devices may be supported at most in participating in coordinated transmission. That is, one of values 0-3 is indicated by downlink control information corresponding to each network side device, and an antenna port 7 (reference signal scrambling manner nSCID=0), an antenna port 7 (reference signal scrambling manner nSCID=1), an antenna port 8 (reference signal scrambling manner nSCID=0), and an antenna port 8 (reference signal scrambling manner nSCID=1) are correspondingly used. When each network side device transmits two layers of data, two network side devices may be supported at most in participating in coordinated transmission. That is, values 0 and 1 are respectively indicated by downlink control information corresponding to the two network side devices, indicating that each of the two network side devices uses antenna ports 7 and 8, but the two network side devices perform reference signal scrambling by using different nSCIDs. When some network side devices transmit one layer, and some network side devices transmit two layers, three network side devices may be supported at most in participating in coordinated transmission. For example, a TP0 (may be corresponding to a first network side device or a second network side device) transmits two layers, and a value indicated by downlink control information of the TP0 is 0. That is, the TP0 uses antenna ports 7 and 8, and a scrambling manner nSCID=0. Each of a TP1 and a TP2 (may be corresponding to two second network side devices) transmits one layer, and values respectively indicated by downlink control information of the TP1 and the TP2 are 1 and 3. That is, the TP1 and the TP2 respectively use the antenna ports 7 and 8 and a scrambling manner nSCID=1.

For still another example, Table 5 provides an example of still another possible first correspondence, where nSCID (Scrambling identity, SCID) is used to indicate reference signal scrambling manners on antenna ports 7, 8, 11 and 13, and an OCC (Orthogonal Cover Code) is an orthogonal cover code. This table is inheritance of another correspondence table that is specified in 3GPP TS 36.212 and that is of indication fields: Antenna port(s), scrambling identity, and number of layers indication in DCI formats 2C/2D in an LTE system, and may be compatible with an indication manner that is in the prior art and/or an existing protocol and that is of an antenna port, a quantity of layer, and reference signal scrambling information in downlink control information. When each network side device transmits only one layer of data, eight network side devices may be supported at most in participating in coordinated transmission. That is, one of values 4-11 is indicated in downlink control information corresponding to each network side device. In this case, the eight network side devices respectively use antenna ports 7 (nSCID=0, OCC=4), 8 (nSCID=0, OCC=4), 11 (nSCID=0, OCC=4), 13 (nSCID=0, OCC=4), 7 (nSCID=1, OCC=4), 8 (nSCID=1, OCC=4), 11 (nSCID=1, OCC=4), and 13 (nSCID=1, OCC=4). When each network side device transmits two layers of data, four network side devices may be supported at most in participating in coordinated transmission. That is, one of values 2-5 is indicated in downlink control information corresponding to each network side device. It may be understood that when two network side devices participate in coordinated transmission, the two network side devices may use a same antenna port number but different reference signal scrambling manners or may use different antenna ports.

TABLE 5

Example of still another possible first correspondence

| One code word:<br>Code word 0 enabled,<br>Code word 1 disabled | | Two code words:<br>Code word 0 enabled,<br>Code word 1 enabled | |
| --- | --- | --- | --- |
| Value | Message | Value | Message |
| 0 | 1 layer, port 7, nSCID = 0 (OCC = 2) | 0 | 2 layers, ports 7-8, nSCID = 0 (OCC = 2) |
| 1 | 1 layer, port 7, nSCID = 1 (OCC = 2) | 1 | 2 layers, ports 7-8, nSCID = 1 (OCC = 2) |
| 2 | 1 layer, port 8, nSCID = 0 (OCC = 2) | 2 | 2 layers, ports 7-8, nSCID = 0 (OCC = 4) |
| 3 | 1 layer, port 8, nSCID = 1 (OCC = 2) | 3 | 2 layers, ports 7-8, nSCID = 1 (OCC = 4) |
| 4 | 1 layer, port 7, nSCID = 0 (OCC = 4) | 4 | 2 layers, port 11, 13, nSCID = 0 (OCC = 4) |
| 5 | 1 layer, port 7, nSCID = 1 (OCC = 4) | 5 | 2 layers, port 11, 13, nSCID = 1 (OCC = 4) |
| 6 | 1 layer, port 8, nSCID = 0 (OCC = 4) | 6 | 3 layers, ports 7-9 |
| 7 | 1 layer, port 8, nSCID = 1 (OCC = 4) | 7 | 4 layers, ports 7-10 |
| 8 | 1 layer, port 11, nSCID = 0 (OCC = 4) | 8 | 5 layers, ports 7-11 |
| 9 | 1 layer, port 11, nSCID = 1 (OCC = 4) | 9 | 6 layers, ports 7-12 |
| 10 | 1 layer, port 13, nSCID = 0 (OCC = 4) | 10 | 7 layers, ports 7-13 |
| 11 | 1 layer, port 13, nSCID = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In another specific example, the first information in the N pieces of downlink control information is corresponding to different first correspondences. In a specific example, the first information in more than one piece of downlink control information in the N pieces of downlink control information indicates same or different information field values in different first correspondences, and the same or different information field values are corresponding to different antenna port numbers or different combinations of an antenna port number and a reference signal scrambling manner. For example, two network side devices participate in coordinated transmission. Table 6 and Table 7 respectively provide an example of a first correspondence used by a first network side device and an example of a first correspondence used by a second network side device. In the examples provided in Table 6 and Table 7, antenna port numbers that can be used by the first network side device are 7-10, and antenna port numbers that can be used by the second network side device are 11-14. Each of the two network side devices independently determines, based on a quantity of code words that need to be sent by the network side device and a channel condition, a quantity of data transmission layer; determines, based on a set of antenna ports that can be used by the network side device and in combination with the first correspondence used by the network side device, an antenna port number or a combination that is of an antenna port number and a reference signal scrambling manner and that needs to be used by the network side device; and in the downlink control information, indicates, to the UE by using the first information, a selected antenna port number or a selected combination of the antenna port number and the reference signal scrambling manner. It is assumed that the first network side device transmits two code words and four layers of data, the antenna ports 7-10 are used, and a corresponding information field value is 2; and the second network side device transmits one code word and two layers of data, the antenna ports 11 and 12 are used, and a corresponding information field value is 1. After receiving the information field values, the UE determines, in the first correspondence used by each network side device, an antenna port number or a combination that is of an antenna port number and a reference signal scrambling manner and that is used by the network side device. It may be understood that a plurality of tables for describing the first correspondence may be formulated based on different antenna port allocation and/or combination manners, so as to support more network side devices in performing coordinated multipoint transmission/reception. Optionally, the downlink data transmission information in the downlink control information may include information about the first correspondence used by the network side device. For example, different first correspondences may be numbered, and the number may be carried in corresponding downlink control information to notify the UE of a first correspondence used by a network side device. The UE is notified, in the downlink control information, of the first correspondence used by the network side device, so that the first correspondence can be more flexibly used to adapt to a rapid channel change. Optionally, a pre-agreed manner may also be used to determine that different network side devices use which first correspondences. For example, a TP0 uses a correspondence 1, and a TP1 uses a correspondence 2. Optionally, that different network side devices use which first correspondences may further be dynamically indicated to the UE by using signaling (for example, RRC signaling in an LTE system).

TABLE 6

Example of yet another possible first correspondence

| One code word:<br>Code word 0 enabled,<br>Code word 1 disabled | | Two code words:<br>Code word 0 enabled,<br>Code word 1 enabled | |
| --- | --- | --- | --- |
| Value | Message | Value | Message |
| 0 | 1 layer, port 7 | 0 | 2 layers, ports 7-8 |
| 1 | 2 layers, ports 7-8 | 1 | 3 layers, ports 7-9 |
| 2 | 3 layers, ports 7-9 | 2 | 4 layers, ports 7-10 |
| 3 | 4 layers, ports 7-10 | 3 | Reserved |

TABLE 7

Example of yet another possible first correspondence

| One code word:<br>Code word 0 enabled,<br>Code word 1 disabled | | Two code words:<br>Code word 0 enabled,<br>Code word 1 enabled | |
| --- | --- | --- | --- |
| Value | Message | Value | Message |
| 0 | 1 layer, port 11 | 0 | 2 layers, ports 11-12 |
| 1 | 2 layers, ports 11-12 | 1 | 3 layers, ports 11-13 |
| 2 | 3 layers, ports 11-13 | 2 | 4 layers, ports 11-14 |
| 3 | 4 layers, ports 11-14 | 3 | Reserved |

It may be understood that in a coordinated multipoint transmission/reception process, among network side devices participating in coordination, some network side devices may use a same first correspondence, and the other network side devices use other one or more different first correspondences. This is not limited in this application.

Optionally, the first network side device sends the information about the first correspondence to at least one second network side device, where the at least one second network side device is one or more of the N network side devices that send the downlink data to the user equipment on the same carrier and in the same subframe. The first network side device may serve as a scheduling node to schedule all network side devices participating in coordination, or may serve as a network side device participating in coordination. In this case, the first network side device determines a first correspondence used by a network side device participating in coordination, and notifies the network side device participating in coordination of the first correspondence, so as to support the network side device participating in coordination in determining information such as an antenna port used by the network side device participating in coordination.

Optionally, the scheduling node may notify the N network side devices that send the downlink data to the user equipment on the same carrier and in the same subframe, of first correspondences to be used the N network side devices. When network side devices participating in coordination are centrally scheduled by the scheduling node, the scheduling node determines first correspondences used by the network side devices participating in coordination, and notifies the network side devices participating in coordination of the first correspondences, so as to support the network side devices participating in coordination in determining information such as antenna ports used by the network side devices participating in coordination. Optionally, the scheduling node may also notify the first network side device of the foregoing information, so that the first network side device notifies the UE of information about first correspondences used by different network side devices (for example, the UE is notified in downlink control information or other signaling).

It should be noted that a quantity of code words, a maximum quantity of transmission layer, a quantity of antenna ports, and a correspondence and combination relationship among them that can be supported in the first correspondence may be designed based on a system requirement (for example, any one or more of the quantity of code words, the maximum quantity of transmission layer, and the quantity of antenna ports are extended). This is not limited in this application. In actual application, a quantity of network side devices participating in coordinated multipoint transmission/reception may also be scheduled based on a specific network environment. The network side devices participating in coordinated multipoint transmission/reception are not limited to the first network side device and one second network side device (for example, may be the first network side device and a plurality of second network side devices; or may be a plurality of second network side devices). Specific examples in the foregoing embodiment are merely used as examples of the implementation, and do not constitute any limitation on this embodiment of this application. In addition, different correspondence and combination relationships that are among the code word, the quantity of layer, the antenna port number, and the reference signal scrambling manner and that are supported in the first correspondence may be applied to initial data transmission and/or data retransmission. For example, a transmission mode of one code word and a plurality of layer of data may be used during the initial data transmission. This is not limited in this application.

Optionally, the first network side device sends antenna port allocation information to at least one second network side device, where the at least one second network side device is one or more of the N network side devices that send the downlink data to the user equipment on the same carrier and in the same subframe. The antenna port allocation information is used by the second network side device to learn of a set of antenna ports that can be used by the second network side device. When the first network side device serves as a serving network side device and completes a function of the scheduling node, the first network side device needs to schedule and allocate antenna ports used by network side devices participating in coordination, and sends antenna port allocation information to the network side devices participating in coordination. Optionally, the scheduling node may schedule and allocate the antenna ports used by the network side devices participating in coordination, and sends the antenna port allocation information to the network side devices participating in coordination. Optionally, the scheduling node may further send the antenna port allocation information to the first network side device. Optionally, the antenna port allocation information may be sent, by using an X2 interface, to the network side devices participating in coordination. For example, in an LTE system, a DM-RS port (DM-RS port) information element shown in Table 8 may be added to Coordinated MultiPoint (CoMP) information (CoMP Information), so as to indicate a set of antenna ports that can be used by a network side device participating in coordination. A DM-RS port set (DM-RS port set) is used to indicate a specific available antenna port. For example, when a set of antenna ports that can be used by a network side device participating in coordination is antenna ports 10-12, information sent in a DM-RS port set information field is "00011100". A DM-RS scrambling identity (DM-RS scrambling identity) is used to indicate an ID used by a network side device to scrambles a reference signal.

TABLE 8

Design example of antenna port allocation information

| IE/Group Name Information element name | IE type and reference Information element type and reference | Semantics description Semantics description |
|---|---|---|
| >DM-RS port | M (Mandatory) | |
| DM-RS port set | 8-bit indication | If an $i^{th}$ bit is 0, it indicates that an antenna port i + 7 is not configured; and if the $i^{th}$ bit is 1, it indicates that the antenna port i + 7 is configured. |
| DM-RS scrambling identity | Integer (INIEGER) (0..503) | DM-RS scrambling ID |

Optionally, the first network side device may further determine and send information about a correspondence between a quantity of layer and an antenna port to the at least one second network side device. Optionally, the information about the correspondence between a quantity of sending layer and an antenna port may also be determined by the scheduling node and sent to the network side device participating in coordination. Optionally, the scheduling node may further send the information about the correspondence between a quantity of sending layer and an antenna port to the first network side device. The information about the correspondence between a quantity of sending layer and an antenna port is used by the network side device to determine, based on a specific quantity of sending layer, a specific antenna port number used by the network side device after determining the quantity of sending layer that is used by the network side device, for example, a used antenna port is determined in a set of antenna ports according to which rule (for example, sequential selection or random selection) when different quantities of layer are sent.

Optionally, the first network side device may further determine and send code word mapping information to the at least one second network side device. Optionally, the scheduling node may further send the code word mapping information to the first network side device. Optionally, the code word mapping information may also be determined by the scheduling node and sent to a network side device participating in coordination. The code word mapping information is used by the second network side device to learn of a code word to be sent by the second network side device.

Optionally, the first network side device may receive downlink data transmission information that is sent by the scheduling node and that is used when the at least one second network side device sends downlink data to the user equipment on a same carrier and in a same subframe, or may receive downlink data transmission information that is sent by the at least one second network side device and that is used when the at least one second network side device sends downlink data to the user equipment on a same carrier and in a same subframe. The downlink data transmission information used for sending the downlink data may include first information, and may further include other downlink data transmission information required in downlink control information. This is not limited in this application. In a unified scheduling scenario of the scheduling node, the scheduling node may notify the first network side device of downlink data transmission information of network side devices participating in coordination, so that the first network side device indicates the downlink data transmission information to the UE by using the N pieces of downlink control information. Certainly, another network side device participating in coordination may also send downlink data transmission information of the network side device to the first network side device.

Optionally, the downlink control information includes aggregation level information of any one or more pieces of downlink control information in the N pieces of downlink control information. In a coordinated multipoint transmission/reception process, a plurality of pieces of downlink control information include aggregation level information of other downlink control information, so that when detecting one piece of downlink control information, the user equipment performs blind detection on other downlink control information based on aggregation level information that is of the other downlink control information and that is carried in the currently detected downlink control information, thereby helping the user equipment to quickly detect the other downlink control information. For example, Table 9 provides a design example of "aggregation level indicator (aggregation level indicator)" information. For example, in an LTE system, two network side devices (such as a TP0 and a TP1) participate in coordinated transmission, downlink control information corresponding to the two network side devices is respectively DCI0 and DCI1, and a first network side device separately uses a PDCCH and an EPDCCH whose aggregation levels are 4 and 8 to send the DCI0 and the DCI1. Therefore, the aggregation level 8 (namely, "11") of the DCI1 is indicated in the DCI0, and the aggregation level 4 (namely, "10") of the DCI0 is indicated in the DCI1. When either of the two pieces of DCI is parsed out by the UE, for example, the DCI0 is parsed out, the UE learns that the aggregation level of the DCI1 is 8, and the UE directly performs blind detection on DCI whose aggregation level is 8 in a search space, thereby quickly shrinking a blind detection range of the UE. It may be understood that when a quantity of network side devices participating in coordinated transmission is greater than 2, this solution may be directly extended. For example, each piece of downlink control information successively indicates an aggregation level corresponding to a next piece of downlink control information, and the last piece of DCI indicates an aggregation level of the first piece of DCI.

TABLE 9

Design example of aggregation level indicator information

| 'Aggregation level indicator' field value | Aggregation level indicated by a specific value |
|---|---|
| '00' | 1 |
| '01' | 2 |
| '10' | 4 |
| '11' | 8 |

Optionally, the downlink data transmission information in the downlink control information further includes resource indication information used by a network side device corresponding to the downlink control information to send downlink data. Resources used by the N network side devices that send the downlink data to the user equipment on the same carrier and in the same subframe to perform downlink data transmission are the same or different. Time-domain and/or frequency-domain resources used by a plurality of network side devices participating in coordinated multipoint transmission/reception may be separately indicated in downlink control information corresponding to the network side devices, so as to more flexibly allocate resources to the network side devices.

Optionally, the first network side device sends enhanced downlink control channel information to the user equipment, and an enhanced downlink control channel is used to send at least one of the N pieces of downlink control information. One or more of the N pieces of downlink control information may be sent on the enhanced downlink control channel, and in this case, the first network side device notifies the user equipment of required enhanced downlink control channel information, so that the user equipment receives the downlink control information sent on the enhanced downlink control channel. For example, in an LTE system, an EPDCCH-Config-r11 information element in an RRC message may be used to configure an EPDCCH resource.

Figure 2B:
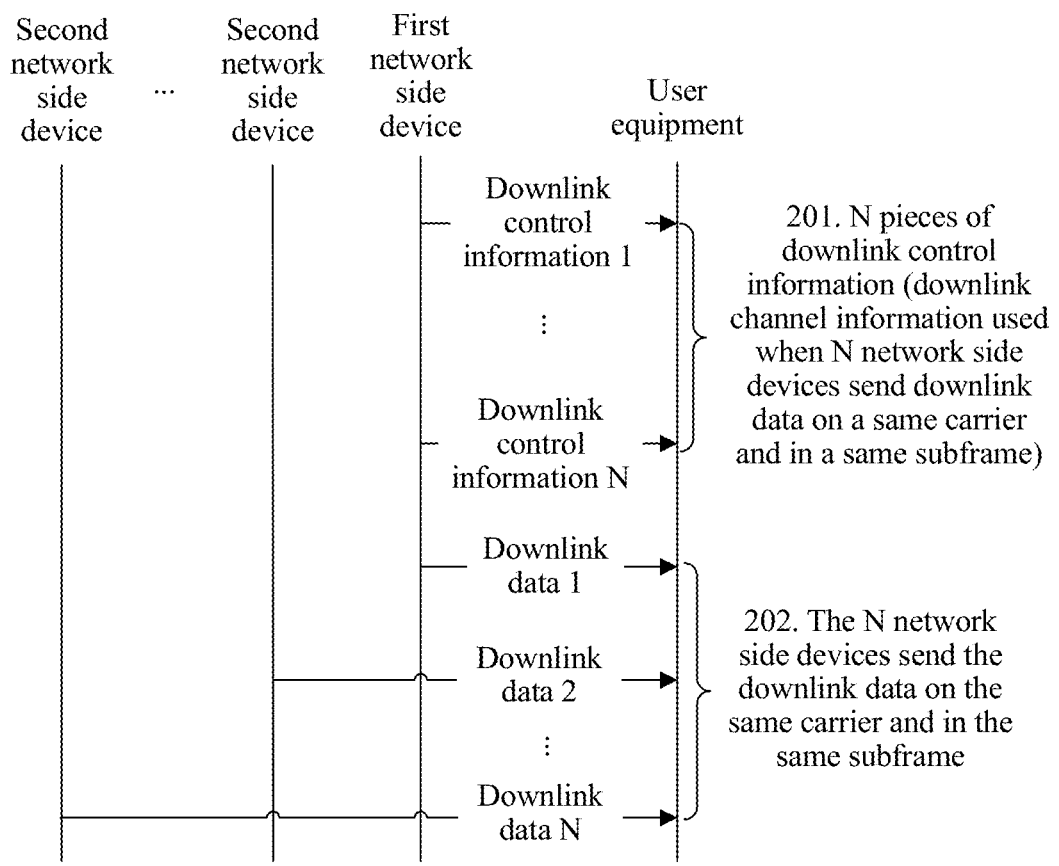
FIG. 2B is a schematic flowchart of performing coordinated multipoint transmission/reception by N network side devices according to an embodiment of this application.

FIG. 2B is a schematic flowchart of performing coordinated multipoint transmission/reception by N network side devices according to an embodiment of this application.

In part 201, a first network side device sends N pieces of downlink control information to user equipment, and the user equipment obtains, from the N pieces of downlink control information, downlink data transmission information used when N quasi co-located network side devices send downlink data to the user equipment on a same carrier and in a same subframe. For a specific implementation, refer to the description of the embodiment corresponding to FIG. 2A, and details are not described herein again.

In part 202, the user equipment receives, based on the downlink data transmission information, the downlink data that is sent by the N network side devices on the same carrier and in the same subframe. In an example corresponding to FIG. 2B, the N network side devices include the first network side device and at least one second network side device. It may be understood that the N network side devices may also be at least two second network side devices. This is not limited in this application.

Figure 3A:
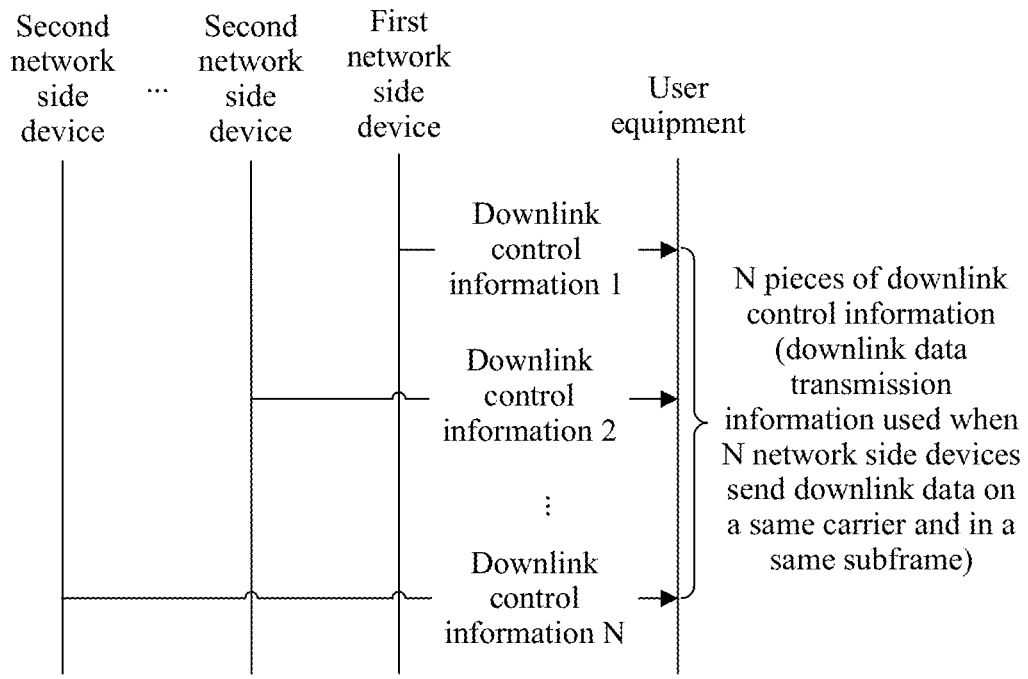
FIG. 3A is a schematic diagram of another downlink control information indication method according to an embodiment of this application.
Figure 3B:
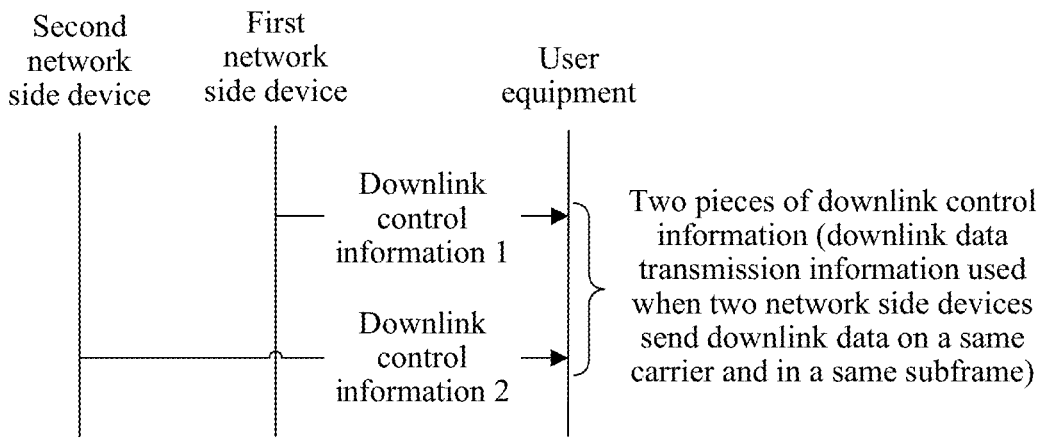
FIG. 3B is a schematic diagram of still another downlink control information indication method according to an embodiment of this application.
Figure 3C:
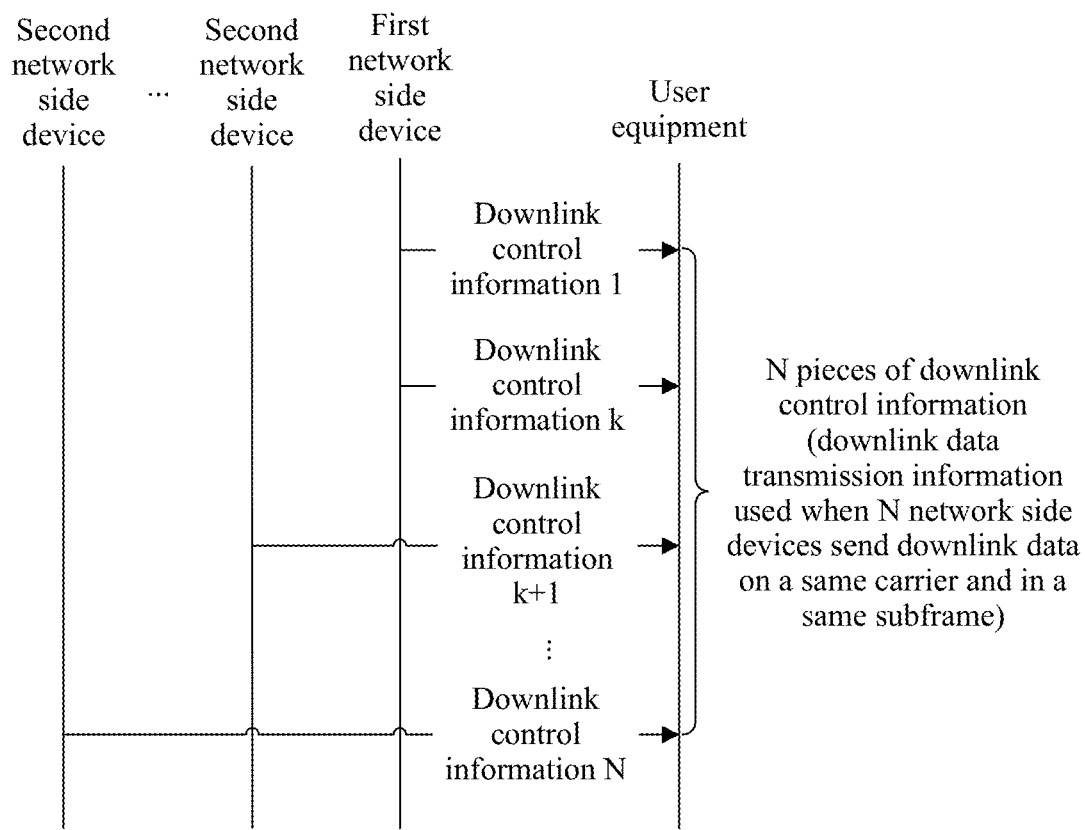
FIG. 3C is a schematic diagram of yet another downlink control information indication method according to an embodiment of this application.

FIG. 3A to FIG. 3C are schematic diagrams of other three downlink control information indication methods according to embodiments of this application.

In a scenario in which N network side devices perform multipoint diversity and/or multipoint multi-stream coordinated transmission, at least two network side devices may send N pieces of downlink control information to UE. The N pieces of downlink control information include downlink data transmission information used when the N network side devices send downlink data to the user equipment on a same carrier and in a same subframe, and N is an integer greater than 1. In this way, the UE obtains the downlink data transmission information used when the network side devices send the downlink data. The at least two network side devices may include a first network side device and at least one second network side device, or may include at least two second network side devices. Optionally, the first network side device may be a serving network side device, and the second network side device may be a cooperative network side device. Optionally, the first network side device may be one of the N network side devices that send the downlink data to the UE on the same carrier and in the same subframe, or may not belong to the N network side devices. Optionally, the second network side device belongs to the N network side devices that send the downlink data to the user equipment on the same carrier and in the same subframe.

In a specific example, FIG. 3A shows a case in which N network side devices separately send respective corresponding downlink control information when participating in coordinated transmission. In the example corresponding to FIG. 3A, the N network side devices include a first network side device and at least one second network side device. Each of the N network side devices sends one piece of downlink control information to user equipment: downlink control information 1 to downlink control information N in FIG. 3A. The N pieces of downlink control information include downlink data transmission information used when the N network side devices send downlink data to the user equipment on a same carrier and in a same subframe, and N is an integer greater than 1. In a more specific example, when N=2, FIG. 3B shows a case in which two network side devices separately send respective corresponding downlink control information when participating in coordinated transmission.

In another specific example, a first network side device sends k of N pieces of downlink control information (k is an integer greater than 1 and less than N), and the remaining N−k pieces of downlink control information are sent by N−k second network side devices. FIG. 3C shows a case in which a first network side device sends k of N pieces of downlink control information (k is an integer greater than 1 and less than N), and the remaining N−k pieces of downlink control information are respectively sent by corresponding second network side devices. The k pieces of downlink control information sent by the first network side device include downlink data transmission information of k of the N network side devices, and the remaining N−k second network side devices respectively send the remaining N−k pieces of downlink control information.

With reference to the foregoing possible sending manners of the N pieces of downlink control information, the following describes specific possible implementations.

Optionally, the N network side devices may be N non-quasi co-located network side devices.

Optionally, when the first network side device is a serving network side device, the first network side device may be one of the N network side devices that send the downlink data to the UE on the same carrier and in the same subframe, or may not belong to the N network side devices.

Optionally, the first network side device or a scheduling node sends, to at least one second network side device, information used to determine a user-specific search space of a downlink control channel of the user equipment. The at least one second network side device is one or more of the N network side devices that send the downlink data to the user equipment on the same carrier and in the same subframe. The information used to determine the user-specific search space of the downlink control channel of the user equipment is used by the second network side device to determine the user-specific search space of the downlink control channel of the user equipment. For example, in the prior art, the information used to determine the user-specific search space of the downlink control channel of the user equipment includes a cell radio network temporary identity (C-RNTI). In addition, the information used to determine the user-specific search space of the downlink control channel of the user equipment is sent to the at least one second network side device, so that a conflict can be avoided when the at least one second network side device allocates the foregoing information to other user equipment, thereby avoiding interference between downlink control information of different user equipment. When the first network side device serves as a serving network side device and completes a related function of the scheduling node, the first network side device sends the information (for example, a C-RNTI) used to determine the user-specific search space of the downlink control channel of the user equipment to a network side device participating in coordinated transmission; or the scheduling node sends the information used to determine the user-specific search space of the downlink control channel of the user equipment to a network side device participating in coordinated transmission. Optionally, the information used to determine the user-specific search space of the downlink control channel of the user equipment may be sent by using an X2 interface. For example, in an LTE system, a C-RNTI information element shown in Table 10 may be sent over the X2 interface.

TABLE 10

Design example of a C-RNTI information element

| IE/Group Name | IE type and reference | Semantics description |
|---|---|---|
| >C-RNTI | M | C-RNTI allocated by a serving base station to target user equipment |

Optionally, the first network side device sends, to at least one second network side device, at least one piece of enhanced downlink control channel information configured for the user equipment. The at least one second network side device is one or more of the N network side devices that send the downlink data to the user equipment on the same carrier and in the same subframe. The at least one piece of enhanced downlink control channel information is used by the at least one second network side device to send downlink control information on an enhanced downlink control channel. If a cooperative network side device uses an enhanced downlink control channel (for example, an EPDCCH in an LTE system) to send downlink control information to the UE, a serving network side device needs to notify the cooperative network side device of enhanced downlink control channel information (for example, EPDCCH-PRB-set information in an LTE system) configured by the serving network side device for the UE. Optionally, the enhanced downlink control channel information may be sent by using an X2 interface. For example, in an LTE system, an EPDCCH-PRB-set information element shown in Table 11 may be sent by using the X2 interface, and x may be determined based on a quantity of available EPDCCH-PRB-sets. For example, if a cell to which the cooperative network side device belongs includes two EPDCCH search spaces, x=2. Optionally, the first network side device may further receive at least one piece of enhanced downlink control channel information from the scheduling node or from at least one second network side device that needs to use an enhanced downlink control channel. In this case, the scheduling node or the at least one second network side device that needs to use the enhanced downlink control channel determines information about a to-be-used enhanced downlink control channel, and sends the information about the to-be-used enhanced downlink control channel to the first network side device, so that the first network side device configures the enhanced downlink control channel for the UE. Optionally, when the scheduling node determines an enhanced downlink control channel, the scheduling node may further notify a second network side device that needs to use the enhanced downlink control channel, of information about the determined enhanced downlink control channel.

TABLE 11

Design example of enhanced downlink control channel information

| IE/Group Name | IE type and reference | Semantics description |
|---|---|---|
| >EPDCCH-PRB-set | M | x-bit indication | An $i^{th}$ bit is 1, indicating that an $i^{th}$ EPDCCH search space is configured for sending DCI to target UE. |

Optionally, the first network side device sends, to the user equipment, search space information of a downlink control channel of at least one second network side device in the N network side devices that send the downlink data to the user equipment on the same carrier and in the same subframe. Optionally, the first network side device receives search space information that is sent by the scheduling node and that is of a downlink control channel of at least one second network side device in the N network side devices that send the downlink data to the user equipment on the same carrier and in the same subframe. Optionally, the first network side device receives search space information that is sent by at least one second network side device and that is of a downlink control channel of the at least one second network side device in the N network side devices that send the downlink data to the user equipment on the same carrier and in the same subframe. The search space information of the downlink control channel is used by the user equipment to learn of a search space of the downlink control channel of the corresponding network side device, and perform blind detection on to-be-received downlink control information in the search space. When not all the N pieces of downlink control information are sent to the UE by the serving network side device, the UE needs to learn of search space information of a downlink control channel of another network side device that sends downlink control information. The serving network side device may notify the UE of the foregoing information by using signaling (for example, RRC signaling in an LTE system). Optionally, when the serving network side device does not implement the function of the scheduling node, the serving network side device may receive the search space information of the another network side device from the scheduling node or the another network side device. In a specific example, the serving network side device notifies the UE of cooperative network side devices participating in coordinated multipoint transmission/reception, and numbers the cooperative network side devices. For example, the serving network side device is 0 by default, and other cooperative network side devices are numbered successively starting from 1. In addition, the serving network side device sends, to the UE, a group of parameters including search space and corresponding to each cooperative network side device. For example, in an LTE system, the serving network side device may perform configuration by using a PDSCH-RE-MappingQCL-ConfigId information element in an RRC message. The PDSCH-RE-MappingQCL-ConfigId information element carries PDSCH resource mapping information (such as one or more of cell-specific reference signal (Cell-specific Reference Signal, CRS) port information, CRS frequency offset information, mbsfn subframe configuration information, and PDSCH start location information) and QCL configuration information (such as one or more of non-zero power channel state information reference signal (Channel-State Information Reference Signal, CSI-RS) configuration information). For a specific information element included in the information element and a configuration method, refer to a definition in 3GPP TS 36.331. In addition, to support the UE in performing blind detection on downlink control information in a search space corresponding to a cooperative network side device, phich-Resource information further needs to be added to the PDSCH-RE-MappingQCL-ConfigId, so as to notify the UE of a resource reserved by the cooperative network side device for a PHICH (Physical HARQ Indicator Channel, physical HARQ indicator channel). The following paragraph provides a specific design example of adding the phich-Resource information to the PDSCH-RE-MappingQCL-ConfigId. PHICH-ConfigId information elements are used to indicate a network side device ID corresponding to current information, and PHICH-Config information elements are used to configure specific phich-Resource information. It should be noted that a current LTE system supports configuration of a maximum of four candidate cooperative network side devices. However, this is not limited in this application. A quantity of groups of configured parameters may be increased based on a quantity of candidate cooperative network side devices that need to be supported. It may be understood that the network side device may also define new RRC signaling, so as to notify the user equipment of the information in the foregoing PDSCH-RE-MappingQCL-ConfigId message and the newly added phich-Resource information. For a specific design manner, still refer to the design example of adding the phich-Resource information to the PDSCH-RE-MappingQCL-ConfigId.

Optionally, the first network side device may further send, to the user equipment, search space information of all network side devices that may participate in coordinated multipoint transmission/reception. For a specific information design manner, refer to the foregoing example, and details are not described herein again. Optionally, the first network side device may further notify, by using signaling, the user equipment of a specific network side device that currently participates in coordinated multipoint transmission/reception. For example, the first network side device notifies, by using RRC signaling, the user equipment of indication information of a network side device that currently participates in coordinated multipoint transmission/reception.

Optionally, the first network side device sends enhanced downlink control channel information of at least one network side device to the user equipment, and an enhanced downlink control channel of the at least one network side device is used by at least one of the N network side devices that send the downlink data to the user equipment on the same carrier and in the same subframe, to send the downlink control information to the user equipment. When one or more network side devices participating in coordination need to use an enhanced downlink control channel to send downlink control information to the UE, a serving network side device needs to correspondingly configure one or more enhanced downlink control channels for the UE. For example, in an LTE system, the serving network side device needs to configure one or more EPDCCH-PRB-sets for the UE. In the existing LTE system, an EPDCCH-Config-r11 information element in an RRC message is used to configure an EPDCCH resource. The serving network side device may add one indication field based on the information element to indicate a network side device corresponding to the current information element, so as to support the serving network side device in configuring one or more EPDCCHs. For example, the following paragraph provides a design example of adding the indication field to the EPDCCH-Config-r11. The EPDCCH-ConfigId information elements are used to indicate a network side device corresponding to a current configuration message.

```
        csi-RS-ConfigZPId-r11           CSI-RS-ConfigZPId-r11,
        qcl-CSI-RS-ConfigNZPId-r11      CSI-RS-ConfigNZPId-r11
     OPTIONAL,-- Need OR
        phich-ConfigId-r14   PHICH-ConfigId-r14,      OPTIONAL,     -- Need
ON
        PHICH-ConfigId information elements
        -- ASN1START
        PHICH-ConfigId-r14 ::=       INTEGER (1..maxPHICH-Config-r14)
        -- ASN1STOP
        PHICH-Config information elements
        -- ASN1START
        PHICH-Config-r14 ::=         SEQUENCE{
           phich-ConfigId   PHICH-ConfigId-r14,
           phich-Duration   ENUMERATED {normal, extended},
           phich-Resource   ENUMERATED {oneSixth, half, one, two}
        -- ASN1STOP
```

```
EPDCCH-Config-r11 ::=        SEQUENCE{
epdcch-ConfigId-r14          EPDCCH-ConfigId-r14,
config-r11        CHOICE {
    release                      NULL,
    setup                        SEQUENCE {
    subframePatternConfig-r11        CHOICE {
        release                      NULL,
        setup                        SEQUENCE {
        subframePattern-r11              MeasSubframePattern-r10
        }
    }                            OPTIONAL, -- Need ON
    startSymbol-r11       INTEGER (1..4)           OPTIONAL, -- Need OP
    setConfigToReleaseList-r11       EPDCCH-SetConfigToReleaseList-r11
OPTIONAL, -- Need ON
    setConfigToAddModList-r11        EPDCCH-SetConfigToAddModList-r11
OPTIONAL -- Need ON
    }
  }
}
EPDCCH-ConfigId information elements
-- ASN1START
EPDCCH-ConfigId-r14 ::=       INTEGER (1..maxEPDCCH-Config-r14)
-- ASN1STOP
```

Optionally, the first network side device sends value-related information of N to the UE, and the information is used to determine a value of N. For a specific implementation, refer to the corresponding description of the embodiment corresponding to FIG. 2A, and details are not described herein again.

Optionally, when the first network side device sends more than one piece of downlink control information, the downlink control information sent by the first network side device includes network side device indication information of a network side device. Optionally, when the first network side device sends more than one piece of downlink control information, the downlink control information sent by the first network side device may be downlink control information in a same format, or may include downlink control information in two or more formats. For a specific implementation, refer to the corresponding description of the embodiment corresponding to FIG. 2A, and details are not described herein again. It may be understood that, when the first network side device sends more than one piece of downlink control information, the downlink control information sent by the first network side device may be applied to all or some of embodiments described in the embodiment of FIG. 2A. An only difference lies in that, in this embodiment, the first network side device sends k (k is an integer greater than 1 and less than N) of the N pieces of downlink control information, and details are not described herein again.

Optionally, the downlink data transmission information includes first information used to send the downlink data. Antenna port numbers indicated by the first information in the N pieces of downlink control information are different from each other or combinations that are of an antenna port number and a reference signal scrambling manner and that are indicated by the first information in the N pieces of downlink control information are different from each other. The first information is an antenna port, a quantity of layer, and reference signal scrambling information. For a specific implementation, refer to the corresponding description of the embodiment corresponding to FIG. 2A, and details are not described herein again.

Optionally, the first information in the N pieces of downlink control information may be corresponding to a same first correspondence or different first correspondences. For a specific implementation and a design example of the correspondence, refer to the corresponding description of the embodiment corresponding to FIG. 2A, and details are not described herein again.

Optionally, the first network side device or the scheduling node may send one or more of antenna port allocation information, information about a correspondence between a quantity of sending layer and an antenna port, and code word mapping information to a network side device participating in coordinated transmission.

Optionally, in this embodiment, because the serving network side device has sent the UE a parameter that includes search space information and that is corresponding to a cooperative network side device, downlink control information corresponding to the cooperative network side device may not include PQI information, so as to reduce a quantity of bits of the downlink control information.

Optionally, the downlink control information includes aggregation level information of any one or more pieces of downlink control information in the N pieces of downlink control information. For example, Table 12 provides a design example of "aggregation level indicator (aggregation level indicator)" information. For example, in an LTE system, two network side devices (such as a TP0 and a TP1) participate in coordinated transmission, downlink control information corresponding to the two network side devices are respectively DCI0 and DCI1, and the DCI0 and the DCI1 are sent by respectively using a PDCCH and an EPDCCH whose aggregation levels are 4 and 8. Therefore, the aggregation level 8 (namely, "11") of the DCI1 is indicated in the DCI0, and the aggregation level 4 (namely, "10") of the DCI0 is indicated in the DCI1. When either of the two pieces of DCI is parsed out by the UE, for example, the DCI0 is parsed out, the UE learns that the aggregation level of the DCI1 is 8, and the UE directly performs blind detection on DCI whose aggregation level is 8 in a search space corresponding to the TP1, thereby quickly shrinking a blind detection range of the UE. It may be understood that when a quantity of network side devices participating in coordinated transmission is greater than 2, this solution may be directly extended. For example, each piece of downlink control information successively indicates an aggregation level corresponding to a next piece of downlink control information, and the last piece of DCI indicates an aggregation level of the first piece of DCI.

TABLE 12

Design example of aggregation level indicator information

| 'Aggregation level indicator' field value | Aggregation level indicated by a specific value |
|---|---|
| '00' | 1 |
| '01' | 2 |
| '10' | 4 |
| '11' | 8 |

According to the downlink control information indication method provided in this embodiment of this application, a plurality of pieces of downlink control information may be sent to support diversity transmission and/or multi-stream transmission in a multipoint coordination scenario.

Optionally, with reference to one or more of the foregoing possible examples, after the user equipment obtains, from the N pieces of downlink control information, the downlink data transmission information used when the N quasi co-located network side devices send the downlink data to the user equipment on the same carrier and in the same subframe, the user equipment may receive, based on the downlink data transmission information, the downlink data that is sent by the N network side devices on the same carrier and in the same subframe.

In the foregoing embodiments provided in this application, the downlink control information indication methods provided in the embodiments of this application are described separately from a perspective of each network element itself and from a perspective of interaction between the network elements. It may be understood that, to implement the foregoing functions, the network elements, such as the UE, the network side device, and the scheduling node, include corresponding hardware structures and/or software modules that are used to perform the functions. A person skilled in the art should be easily aware that units and algorithm operations in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

An embodiment of this application further provides an apparatus for the downlink control information indication method, and the apparatus may be a network side device.

Figure 4:
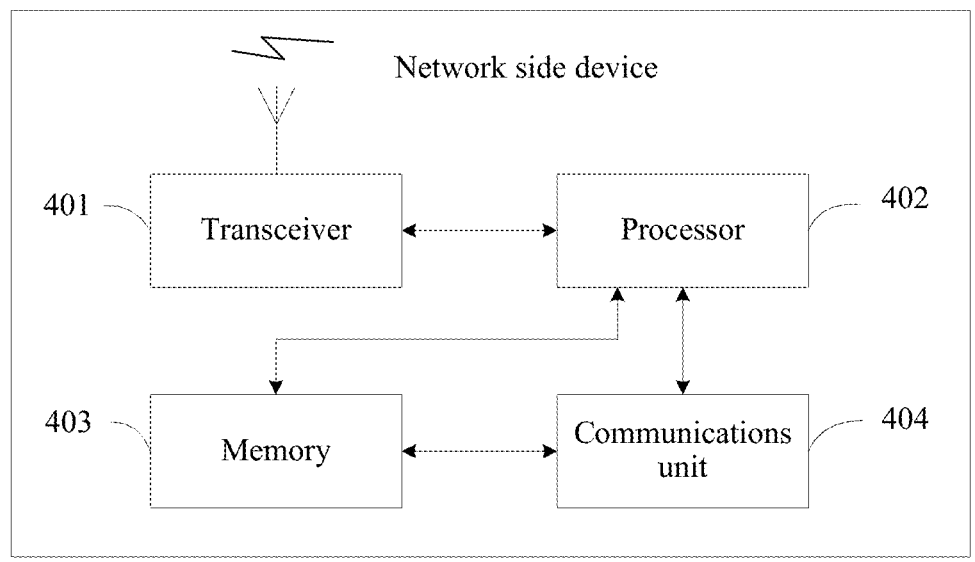
FIG. 4 is a schematic structural diagram of a network side device according to an embodiment of this application.

FIG. 4 shows a possible schematic structural diagram of the network side device (including the first network side device and the second network side device) in the foregoing embodiment. The network side device may be the network side device 20, the network side device 22, or the network side device 24 shown in FIG. 1A or FIG. 1B.

A structure of the network side device provided in this embodiment of this application includes a transmitter. Optionally, the structure of the network side device may further include a processor. Optionally, the network side device may further include a receiver. Optionally, the network side device may further include a communications unit. Optionally, the structure of the network side device may further include a memory. The network side device shown in FIG. 4 includes a transceiver 401, a processor 402, a memory 403, and a communications unit 404. The transceiver 401 may be configured to support information receiving and sending between the network side device and the UE in the foregoing embodiment. The processor 402 may be configured to perform various functions used for communicating with the UE or another network side device. In an uplink, an uplink signal from the UE is received by an antenna, demodulated by the transceiver 401, and further processed by the processor 402, so as to restore service data and signaling information that are sent by the UE. In a downlink, service data and a signaling message are processed by the processor 402, and are demodulated by the transceiver 401 to generate a downlink signal, and the downlink signal is transmitted to the UE by using an antenna. The processor 402 is further configured to perform the downlink control information indication method described in the foregoing embodiment. The network side device may further include the communications unit 404, configured to support a base station in communicating with another network entity, for example, configured to support the network side device in communicating with another communications network entity shown in FIG. 1A or FIG. 1B. The network side device may further include the memory. The memory 403 is configured to store program code and data of the network side device. Optionally, the memory may be used as an independent module or structure, or may be integrated into the processor. FIG. 4 shows a case in which the memory is used as an independent module or structure.

An embodiment of this application further provides a network side device. A structure of the network side device includes a processor and a transmitter, and may further include a memory. The processor is configured to support or control the network side device to perform processing performed by the network side device (which may be the first network side device or the second network side device) in the foregoing embodiment. For example, the processor may be configured to generate at least one of the N pieces of downlink control information in the foregoing embodiment. Further, the processor may be further configured to determine to send, to the user equipment, a maximum quantity M of downlink control information that needs to be detected. The transmitter is configured to send the information and/or the data in the foregoing embodiment to the user equipment, for example, send at least one of the N pieces of downlink control information to the user equipment. Further, the transmitter may be further configured to send, to the user equipment, information about the maximum quantity M of downlink control information that needs to be detected, search space information of a downlink control channel of another network side device, downlink data, and the like. The memory may be coupled to the processor and configured to store program code and data of the network side device.

It may be understood that FIG. 4 merely shows a simplified design of the network side device. In actual application, a base station may include any quantity of transmitters, receivers, processors, controllers, memories, communications units, and the like, and all base stations that can implement this application fall within the protection scope of this application.

An embodiment of this application further provides an apparatus for the downlink control information indication method, and the apparatus may be a user side device.

Figure 5:
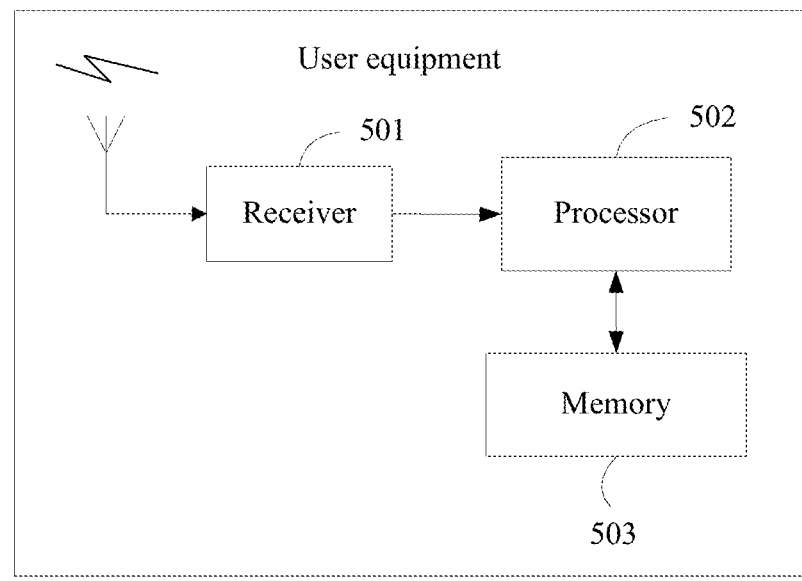
FIG. 5 is a schematic structural diagram of user equipment according to an embodiment of this application.

FIG. 5 shows a simplified schematic diagram of a possible design structure of the UE in the foregoing embodiment.

The structure of the user equipment provided in this embodiment of this application includes a receiver. Optionally, the structure of the user equipment may further include a processor. Optionally, the structure of the user equipment may further include a transmitter. Optionally, the structure of the user equipment may further include a memory. The UE shown in FIG. 5 includes a receiver 501, a processor 502, and a memory 503.

In a downlink, an antenna receives a downlink signal transmitted by the network side device in the foregoing embodiment. The receiver 501 adjusts (for example, through filtering, amplification, down-conversion, and digitization) a signal received from the antenna and provides an input sample. The processor 502 processes service data and a signaling message and controls and manages actions of the UE, and is configured to perform processing performed by the UE in the foregoing embodiment. The memory 503 is configured to store program code and data used for the UE. Optionally, the memory may be used as an independent module or structure, or may be integrated into the processor. FIG. 5 shows a case in which the memory is used as an independent module or structure.

An embodiment of this application further provides user equipment. A structure of the user equipment includes a receiver and a processor, and may further include a memory. The receiver is configured to receive information and/or data sent by the network side device (may be the first network side device, the second network side device, or any one of the N network side devices) in the foregoing embodiment, for example, may be configured to receive the N pieces of downlink control information. Further, the receiver may be further configured to receive information about a maximum quantity M of downlink control information that needs to be detected, search space information of a downlink control channel of the network side device, downlink data, and the like. The processor is configured to support or control the user equipment to complete a method or an action completed by the user equipment in the foregoing embodiment. For example, the processor may be configured to control the receiver to receive, on a same carrier and on a same time-domain resource based on the N pieces of downlink control information, downlink data sent by the N network side devices. The memory may be coupled to the processor and configured to store program code and data of the user equipment.

Figure 6:
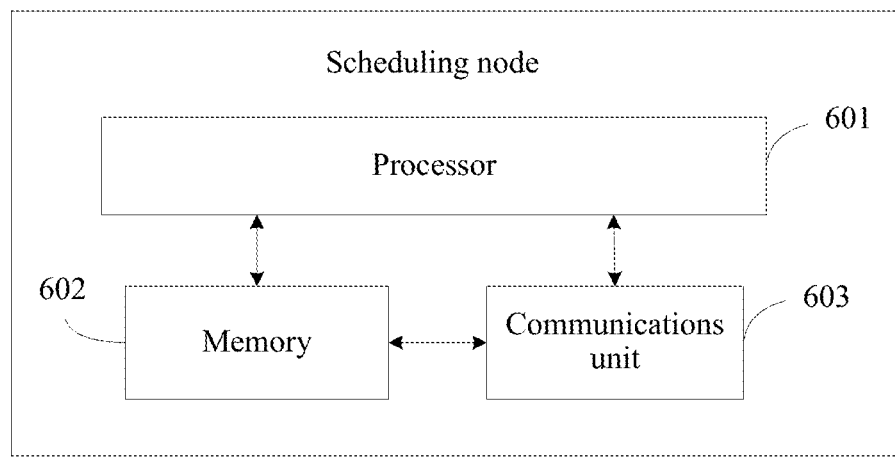
FIG. 6 is a schematic structural diagram of a scheduling node according to an embodiment of this application.

FIG. 6 shows a schematic structural diagram of the scheduling node in the foregoing embodiment. The scheduling node may be the scheduling node 60 shown in FIG. 1A. The scheduling node may include a processor 601, a memory 602, and a communications unit 603. The processor 601 may be configured to coordinate resource management and configuration between a plurality of network side devices, and may be configured to execute related actions in the foregoing embodiment for scheduling a plurality of network side devices to perform coordinated multipoint transmission/reception. The memory 602 may be configured to store program code and data of the scheduling node. Optionally, the memory may be used as an independent module or structure, or may be integrated into the processor. FIG. 6 shows a case in which the memory is used as an independent module or structure. The communications unit 603 is configured to support communication between the scheduling node and a network side device, for example, send information about a configured resource to the network side device.

In this embodiment of this application, the scheduling node may be an independent network entity, or may be integrated into one or more network side devices to implement functions of the scheduling node in a form of hardware and/or software.

The processor that is of the network side device, the UE, or the scheduling node and that is configured to perform this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of sub-processors implementing a computing function, for example, a combination of one or more microprocessors, or a combination of a DSP and a microprocessor.

Method or algorithm operations described in combination with the content disclosed in this application may be implemented by hardware, or may be implemented by the processor by executing a software instruction. The software instruction may be executed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. An example storage medium is coupled to the processor, so that the processor can read information from the storage medium and write information into the storage medium. Certainly, the storage medium may be a component of the processor. The processor and the storage medium may be located in the ASIC. In addition, the ASIC may be located in the user equipment. Certainly, the processor and the storage medium may exist in the user equipment as discrete components.

A person skilled in the art should be aware that in one or more of the foregoing examples, the functions described in this application may be implemented by using hardware, software, firmware, or any combination thereof. When the functions are implemented by using software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. In addition, this application further provides the following embodiment. A TRP described in the following embodiment may be the network side device in the foregoing embodiment. For example, the TRP may be the first network side device, the second network side device, or any one of the N network side devices. Control information or downlink control information described in the following embodiment may be the downlink control information in the foregoing embodiment.

To improve performance of a cell-edge user equipment (UE), improve cell-edge spectrum efficiency, and optimize overall system performance of a plurality of cells, when the UE is in a same coverage area of a plurality of base stations, the plurality of base stations may cooperate to provide data transmission for the UE.

In the prior art, when a plurality of base stations provide coordinated data transmission for same UE, a serving base station of the UE sends control information to the UE. The control information includes scheduling information of the serving base station and another base station that provides coordinated transmission for the UE. The UE receives the control information delivered by the serving base station, and receives, based on the scheduling information that is of each base station participating in coordinated transmission and that is included in the control information, data transmitted by each base station. To enable the control information to indicate the scheduling information of the base station participating in coordinated transmission, a format of the control information needs to be extended. A quantity of base stations participating in coordinated transmission may be different each time. Therefore, a format of control information used to indicate scheduling information of the base station participating in coordinated transmission may change each time.

In the prior art, there is still a case in which the UE is in a coverage area of a single base station, and the UE performs single-point transmission with the base station. When only one base station schedules the UE and provides data transmission, control information delivered by the base station to the UE does not need to be extended, and a format of the control information is different from a format of control information used when a plurality of base stations perform coordinated transmission.

Therefore, in the prior art, formats of different control information need to be changed in different scenarios. The base station needs to generate control information in different formats, the UE needs to process control information in different formats, and processing of the base station and the UE is excessively complex.

To achieve the objective of the present invention and other purposes in this embodiment, this embodiment of the present invention provides a communications system. In the communications system, a network side may include at least one transmission reception point (TRP), and a terminal side may include at least one UE. The TRP may be a device used on an access network side to support the UE in accessing a system, for example, a base station (BS), a relay node (relay node), or an access point (AP). The base station may be a macro base station, a micro base station, a home base station, or the like. The TRP may be fixed or mobile. In this embodiment of the present invention, the UE may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, a tablet computer (pad), or the like. With development of the Internet of Things technology, a device that can access a wireless communications network, can communicate with a wireless network system side, or can communicate with another object by using a wireless network may be the UE in this embodiment of the present invention, such as a terminal and a vehicle in intelligent transportation, a household device in a smart household, a terminal in a smart grid, an electricity meter reading instrument, a voltage monitoring instrument, an environment monitoring instrument, a video surveillance instrument in an intelligent security network, or a cash register. In this embodiment of the present invention, the UE may communicate with the TRP. The UE may be static or mobile.

In the communications system provided in this embodiment of the present invention, the TRP may send transmission parameters to the at least one UE. The transmission parameters may include at least two transmission parameter sets, for example, a transmission parameter set 1 and a transmission parameter set 2. The transmission parameter set 1 may also be referred to as a first transmission parameter set, and the transmission parameter set 2 may also be referred to as a second transmission parameter set. In this embodiment of the present invention, a specific parameter may be included in the first transmission parameter set or the second transmission parameter set as required. A name of the transmission parameter set itself does not limit the parameter. The first transmission parameter set and the second transmission parameter set may be carried on channels of a same type for transmission, or may be carried on channels of different types for transmission, or may be carried on channels of a same type but in different formats for transmission. The first transmission parameter set and the second transmission parameter set may be transmitted as a whole. In this case, it may be considered that transmission parameters in the different sets are carried in one message or information element for sending. The different transmission parameter sets may also be separately sent, for example, sent in different messages or information.

The first transmission parameter set may include a parameter defined by layer 1, layer 2, or layer 3. Layer 1 usually refers to a physical layer, layer 2 usually refers to a medium access control (MAC) layer, and layer 3 usually refers to a radio resource control (RRC) layer. For a default transmission scheme, a default value of a parameter in the first transmission parameter set may be specified. The parameter in the first transmission parameter set may be sent by a same message or a plurality of different messages at a same layer, or may be carried by different messages at different layers for sending.

Figure 7:
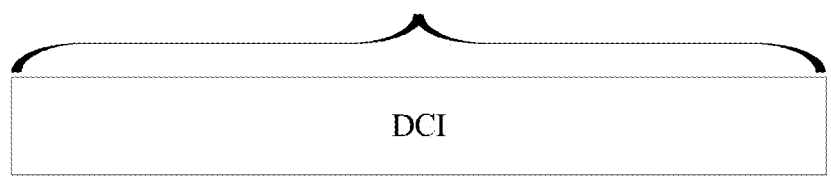
FIG. 7 is a schematic diagram of a downlink control information format according to an embodiment of the present invention.
Figure 7:
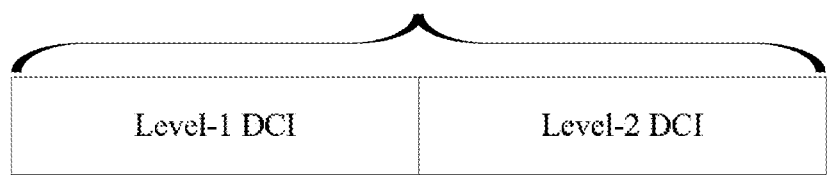
Figure 7:
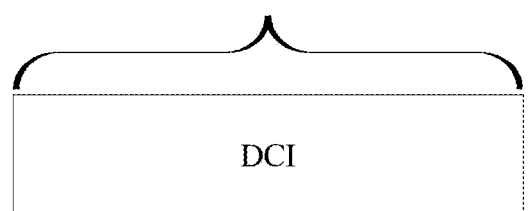
Figure 7:
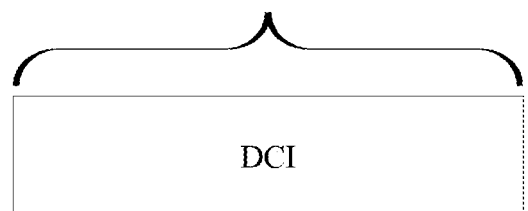

The second transmission parameter set includes a parameter indicated by using the physical layer, for example, a parameter indicated by using a physical downlink control channel. The second transmission parameter set may be downlink control information (DCI). In this embodiment, the DCI may be DCI in a complete DCI format, that is, single complete DCI or one-level DCI. For example, the DCI may be carried on a physical downlink control channel (PDCCH) in a DCI format. In this embodiment, a person skilled in the art may refer to an existing LTE standard protocol for the DCI in the complete DCI format, which is the same or similar to a DCI format in an LTE system. Alternatively, based on a new definition, downlink control information that is carried on a PDCCH and that has different functions forms one piece of integral downlink control information. Optionally, DCI in a two-level or multi-level format is provided in this embodiment of the present invention. As shown in FIG. 7, DCI in a complete DCI format may be divided into two or more parts. The different parts may also be referred to as different sub-level DCI, that is, the DCI in the complete DCI format may be divided into two or more pieces of sub-level DCI. That is, the DCI in this embodiment may be two-level or multi-level DCI, and the two-level or multi-level DCI may form the DCI in the complete DCI format. For example, this embodiment provides two-level DCI, including level-1 DCI and level-2 DCI. The level-1 DCI includes broadband information, or may include control information corresponding to common information such as system broadcast information or random access information, or includes information indicating a transmission policy, or includes carrier indication information, or includes scheduling information of a common part of different transmission policies. The level-2 DCI may be used to indicate some or all of resource allocation information, modulation and coding scheme information, subband-level precoding matrix indication information, and the like.

If the DCI is two-level DCI, the second transmission parameter set may be the level-2 DCI. When the second transmission parameter set is the level-2 DCI, the first transmission parameter set may be the level-1 DCI, or some content in the first transmission parameter set includes the level-1 DCI. Alternatively, the second transmission parameter set may be DCI in a complete format that includes a plurality of levels of DCI. For example, the second transmission parameter set includes level-1 DCI and level-2 DCI. The level-1 DCI may be carried by using a PDCCH, and the level-2 DCI may be carried by using a same PDCCH or different PDCCHs, or may be carried by using a physical downlink shared channel (physical downlink shared channel, PDSCH). Optionally, in this embodiment of the present invention, the DCI may further be at least two pieces of DCI in different DCI formats, and each piece of DCI has a complete DCI format and is carried by using a PDCCH in a corresponding DCI format. As shown in FIG. 7, FIG. 7 (a) shows DCI in a complete DCI format, and the DCI is carried by using a PDCCH in the DCI format. FIG. 7 (b) shows an example of two-level DCI, and the level-1 DCI and the level-2 DCI may form one piece of DCI in the complete DCI format, as shown in FIG. 7 (a). FIG. 7 (c) shows two pieces of DCI in different DCI formats, and the two types of DCI may be separately carried by using PDCCHs in corresponding different formats. The two types of DCI in different formats may be different from the format of the DCI in the existing system, and certainly, may be the same as the format of the DCI in the existing system. It may be understood that the various types of DCI shown in FIG. 7 are merely schematic illustrations for ease of understanding, and do not have any substantial limitation on the DCI in this embodiment.

Optionally, the second transmission parameter set depends on parameter setting in the first transmission parameter set, and a size of the second transmission parameter set, for example, a DCI size, may change.

In this embodiment, the DCI in the complete format, the multi-level DCI, or the DCI in different formats may be carried by using a PDCCH in a specific DCI format. The DCI in the complete DCI format may be carried by using a PDCCH in the DCI format. If the DCI is two-level or multi-level DCI, the two-level or multi-level DCI may also be carried by using a plurality of PDCCHs or may be carried by using one PDCCH. The DCI in different formats is separately carried by using PDCCHs in different DCI formats. Optionally, the second transmission parameter set may be transmitted by using a PDCCH in a second transmission parameter set format. The second transmission parameter set may also be understood as a set of parameters carried by a PDCCH. That the TRP sends the second transmission parameter set may also be referred to as that the TRP sends the PDCCH. That the UE detects or receives the second transmission parameter set may also be referred to as that the UE detects or receives DCI, or the UE detects or receives a PDCCH in a DCI format or a PDCCH in the second transmission parameter set format.

Figure 8A:
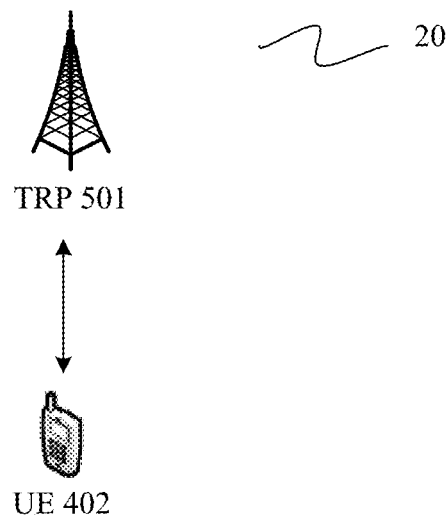
FIG. 8A is a schematic diagram of a communications system according to an embodiment of the present invention.
Figure 8B:
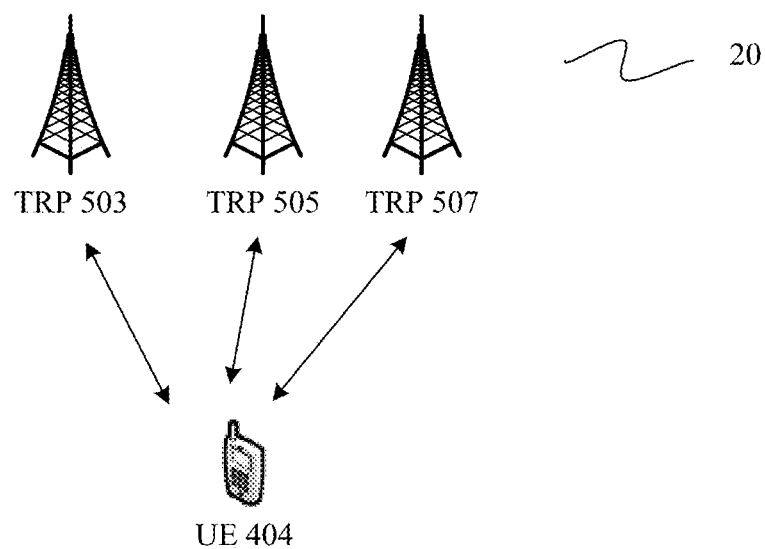
FIG. 8B is a schematic diagram of another communications system according to an embodiment of the present invention.

In a communications system 20 shown in FIG. 8, for example, the communications system includes at least one UE 40 and at least one TRP 50. The UE 40 may include UE 402, UE 404, and the like, and the TRP 50 may include a TRP 501, a TRP 503, a TRP 505, and the like. In this embodiment of the present invention, in communication between the UE and a network side, as shown in FIG. 8A, the UE 402 may receive a second transmission parameter set sent by one TRP such as the TRP 501, the UE communicates with the TRP 501, and the TRP 501 transmits data to the UE 402. The TRP 501 is a serving TRP of the UE 402. In the implementation shown in FIG. 8A, the UE communicates with the network side by using one TRP. This case may be referred to as centralized transmission, single-point transmission, single-TRP transmission, or non-multipoint transmission. Optionally, as shown in FIG. 8B, the UE 404 is covered by at least two TRPs, and the UE 404 may receive second transmission parameter sets separately sent by the at least two TRPs such as the TRP 503 and the TRP 505. The UE 404 is scheduled to perform data transmission with the TRP 503 and the TRP 505. The data transmission includes at least one of uplink data sending and downlink data receiving. In the implementation shown in FIG. 8B, the UE communicates with the network side by using at least two TRPs. This case may be referred to as distributed transmission, multipoint joint transmission, multi-TRP transmission, or coordinated multipoint transmission/reception. The TRP 503 and the TRP 505 are mutually cooperative TRPs, and the TRP 505 may be a serving TRP of the UE. The serving TRP may be a TRP that provides services such as a radio resource control (RRC) connection, non-access stratum (NAS) mobility management, or security input for the UE by using a radio air interface protocol. The cooperative TRP and the serving TRP may separately schedule data and indicate their respective scheduling result information by using the second transmission parameter sets, and send the scheduling result information to the UE. In this embodiment of the present invention, there may be more TRPs to transmit second transmission parameter sets to same UE. Different TRPs may also transmit second transmission parameter sets to another UE. Therefore, the cases numerated in FIG. 8A and FIG. 8B are not restrictive.

In this embodiment of the present invention, the TRP may send, to the UE, quantity information of control information to be sent. A quantity of control information to be sent to the UE is N, and N is an integer greater than or equal to 1. The user equipment determines, based on the quantity information, that a quantity of control information that needs to be detected is N, and the user equipment detects the control information from N TRPs. The quantity information of the control information to be sent may be sent by using the first transmission parameter set, and the control information may be sent by using the second transmission parameter set. When the second transmission parameter set is two-level DCI in this embodiment, the TRP may also send, to the UE in level-1 DCI of the second transmission parameter set, the quantity information of the control information to be sent, that is, the level-1 DCI of the transmission parameter set may include the quantity information of the control information to be sent. The control information may be sent by using level-2 DCI of the second transmission parameter set. The TRP sends, to the UE, the quantity information of the control information to be transmitted, and after obtaining the quantity information, the UE can determine the quantity of control information to be detected, and detect the corresponding quantity of control information. Regardless of single-point transmission or coordinated multipoint transmission/reception, at least one TRP may use downlink control information in a same format, and there is no need to extend the downlink control information. In different transmission, there is also no need to frequently change the format of the downlink control information. Therefore, both the TRP and the UE can easily implement different transmission.

In this embodiment of the present invention, the TRP may send, to the UE, the quantity information of the control information to be sent, that is, the TRP may send, to the UE, the quantity information of the control information to be sent.

In this embodiment of the present invention, the control information may also be control information sent to the UE by the TRP, for example, may include any type of information for performing control, scheduling uplink or downlink transmission, or data transmission. Alternatively, the control information may also be referred to as downlink sent control information or downlink control information. The control information is sent by using a second transmission parameter set, for example, may be transmitted by using a PDCCH in the second transmission parameter set format. The control information is also sent by using level-2 DCI of the second transmission parameter set, for example, may be transmitted by using a PDCCH in the level-2 DCI format or by using a PDSCH.

In this embodiment of the present invention, the TRP may send a first transmission parameter set to the UE, the first transmission parameter set includes quantity information of second transmission parameter sets to be sent, and at least one TRP may send a second transmission parameter set to same UE. The TRP that sends the first transmission parameter set may be one of the at least one TRP that sends the second transmission parameter set, that is, the TRP that sends the first transmission parameter set participates in sending of the second transmission parameter set. Alternatively, the TRP that sends the first transmission parameter set may not be one of the at least one TRP, that is, the TRP that sends the first transmission parameter set does not participate in sending of the second transmission parameter set. The UE may receive the quantity information that is sent by the TRP and that is of the second transmission parameter sets to be sent, and then detect a quantity of second transmission parameter sets that is corresponding to the quantity information. The second transmission parameter set may be sent by at least one TRP. For example, in single-point transmission shown in FIG. 8A, the TRP 501 may send, to the UE 402, quantity information of second transmission parameter sets to be sent to the UE 402. For example, the quantity information is 1, and the TRP 501 sends a second transmission parameter set to the UE 402. In coordinated multipoint transmission/reception shown in FIG. 8B, the TRP 503 or the TRP 505 or the TRP 507 may send, to the UE 404, quantity information of second transmission parameter sets to be sent to the UE 404, for example, the quantity information is 3. The TRP 503, the TRP 505, and the TRP 507 separately send a second transmission parameter set to the UE 404. After receiving the quantity information, the UE 404 determines that three second transmission parameter sets need to be detected, and then detects the second transmission parameter sets separately sent by the TRP 503, the TRP 505, and the TRP 507. Alternatively, in the example of FIG. 8B, the TRP that sends the first transmission parameter set does not participate in sending of the second transmission parameter set. For example, the TRP 503 sends, to the UE 404, quantity information of second transmission parameter sets to be sent to the UE 404. The quantity information is at least 1. For example, the quantity information is 2, and the TRP 505 and the TRP 507 separately send a second transmission parameter set to the UE 404. After receiving the quantity information, the UE 404 determines that two second transmission parameter sets need to be detected, and then detects the second transmission parameter sets separately sent by the TRP 505 and the TRP 507.

In this embodiment, the TRP sends, to the UE, the quantity information of the second transmission parameter sets to be transmitted. After obtaining the quantity information, the UE can determine a quantity of second transmission parameter sets to be detected, and detect the corresponding quantity of second transmission parameter sets. Regardless of single-point transmission or coordinated multipoint transmission/reception, at least one TRP may use a second transmission parameter set in a same format, and there is no need to extend the second transmission parameter set. In different transmission, there is also no need to frequently change the format of the second transmission parameter set. Therefore, both the TRP and the UE can easily implement different transmission.

Existing various wireless communications systems may also be configured to use the solution in this embodiment in which the TRP may send, to same UE, the quantity information of the second transmission parameter sets to be sent, and at least one TRP may send the second transmission parameter set to same UE, and other described solutions provided by all the embodiments. These systems include but are not limited to, for example, a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (single carrier FDMA, SC-FDMA) system, and another network. The terms "network" and "system" may be interchanged in this embodiment of the present invention. A radio technology such as Universal Terrestrial Radio Access (UTRA) or CDMA2000 may be implemented in the CDMA network. UTRA may include CDMA (WCDMA) and another variation of CDMA. CDMA2000 may cover interim standards (interim standard, IS) 2000 (IS-2000), IS-95, and IS-856. A radio technology such as a Global System for Mobile Communications (global system for mobile communications, GSM) may be implemented in the TDMA network. A radio technology such as evolved Universal Terrestrial Radio Access (evolved UTRA, E-UTRA), Ultra Mobile Broadband (UMB), IEEE 802.11 (Wi-Fi), IEEE 802.16 (WiMAX), IEEE 802.20, or Flash OFDMA may be implemented in the OFDMA network. UTRA is corresponding to UMTS, and E-UTRA is corresponding to an evolved version of UMTS. A new version of UMTS, namely, E-UTRA, is used in 3GPP Long Term Evolution (LTE) and LTE Advanced (LTE Advanced, LTE-A). UTRA, E-UTRA, UMTS, LTE, LTE-A, and GSM are recorded and described in documents of the standardization organization 3GPP. CDMA2000 and UMB are recorded and described in documents of the standardization organization 3GPP2.

In a further evolved system of the LTE system, a new radio access technology (new radio access technology) system (which may be referred to as an "NR" system), or a 5G system or any next generation system developed by a standardization organization, a TRP may send, to same UE, quantity information of second transmission parameter sets to be sent, and at least one TRP may send a second transmission parameter set to the same UE. All technical solutions provided in the embodiments of the present invention may be applied to these systems.

In this embodiment of the present invention, the first transmission parameter set sent by the TRP to the UE may include the quantity information of the second transmission parameter sets to be sent to the UE. The quantity information of the second transmission parameter sets to be sent to the UE is used to indicate to the UE a quantity of second transmission parameter sets to be sent to the UE. The UE receives the quantity information of the second transmission parameter sets to be sent to the UE, and based on the quantity information, the UE may determine a quantity of second transmission parameter sets that need to be received. Optionally, the quantity information of the second transmission parameter sets to be transmitted may uniformly indicate a transmission mode. That is, different quantity information of second transmission parameter sets to be transmitted may indicate different transmission modes. For example, when the quantity information of the second transmission parameter sets to be transmitted indicates a quantity 1, a single-point transmission mode, namely, a centralized transmission mode or a non-coordinated transmission mode, may be indicated. When the quantity information of the second transmission parameter sets to be transmitted indicates a quantity greater than or equal to 2, a coordinated multipoint transmission/reception mode, namely, a distributed transmission mode or a joint transmission mode, may be indicated. The UE may determine a current transmission mode based on the quantity information of the second transmission parameter sets to be transmitted.

Optionally, the quantity information of the second transmission parameter sets to be sent to the UE may be determined based on a quantity of TRPs that are to send a second transmission parameter set to the UE. For example, when only one TRP is to send the second transmission parameter set to the UE, a quantity of second transmission parameter sets may be set to 1. Alternatively, when more than one TRP is to separately send a second transmission parameter set to the UE on a same carrier, a quantity of second transmission parameter sets may be a quantity of corresponding TRPs, and in this case, the quantity of second transmission parameter sets is greater than or equal to 2.

Optionally, the quantity information of the second transmission parameter sets to be sent to the UE may also be set to a fixed value, and the fixed value may be an integer greater than or equal to 1. If the quantity of second transmission parameter sets to be sent to the UE is set to the fixed value, the quantity information of the second transmission parameter sets to be sent to the UE does not change with the quantity of TRPs that are to send the second transmission parameter set to the UE, and the UE may detect second parameter sets whose quantity is the fixed value.

Optionally, an upper limit of the quantity of second transmission parameter sets may also be limited, that is, the quantity of second transmission parameter sets does not exceed a specified threshold, and the threshold may be greater than or equal to 2. A value of the threshold may be determined based on an overall system resource usage situation. When the quantity of TRPs that are to send the second transmission parameter set to the UE does not exceed the threshold, the quantity information may be determined based on an actual quantity of TRPs that are to send the second transmission parameter set to the UE on a same carrier; or if the quantity of TRPs that are to send the second transmission parameter set to the UE exceeds the threshold, the quantity of second transmission parameter sets is equal to the threshold. Limiting the threshold of the quantity of second transmission parameter sets may avoid transmission of excessive second transmission parameter sets, so as to avoid affecting system performance because excessive physical resources are occupied, and reduce complexity of processing the excessive second transmission parameter sets by the UE and reduce resulted energy consumption.

In this embodiment, the first transmission parameter set may further include resource information for transmitting the second transmission parameter set, and the resource information indicates a candidate resource for transmitting the second transmission parameter set. The resource information may include resource information required by at least one TRP to separately transmit the second transmission parameter set. When a plurality of TRPs need to separately transmit second transmission parameter sets, a candidate resource used by each TRP to transmit the second transmission parameter set is separately indicated. The resource information may be, for example, subband information, a control channel resource, resource set information, or quasi co-location (QCL) information that carries the second transmission parameter set. Optionally, when there are at least two TRPs that need to separately transmit second transmission parameter sets, the candidate resources may be on a same carrier or may be on different carriers. That is, the at least two TRPs may send respective second transmission parameter sets to same UE on a same carrier or different carriers. In coordinated multipoint transmission/reception, transmit antenna ports corresponding to at least two TRPs that provide coordinated multipoint transmission/reception for same UE respectively belong to different QCL groups, and have different QCL parameters. Large-scale properties of channels over which antenna ports of TRPs in different QCL groups reach the UE are different. For example, the large-scale property (large-scale property) may be one or more of a channel average gain, delay spread, an average delay, a Doppler frequency shift, Doppler spread, and a spatial characteristic (such as a beam arrival angle) of a receiving side. Antenna ports corresponding to TRPs at different geographical locations may be considered to be non-QCL. It may be considered that antenna ports that belong to a same antenna port group meet a QCL condition. Different antenna ports are grouped based on corresponding QCL parameters, and the UE is instructed to perform corresponding differentiation, so that a UE side performs channel estimation and signal demodulation for different antenna ports by using corresponding QCL parameters, thereby improving channel estimation precision and demodulation performance on the UE side.

In this embodiment, if at least two TRPs need to send second transmission parameter sets to same UE, the second transmission parameter sets sent by the different TRPs may be the same or may be different. The first transmission parameter set may further include content indication information of a second transmission parameter set, and the content indication information of the second transmission parameter set may indicate that the second transmission parameter sets sent by the at least two TRPs to the same UE are the same or different.

In this embodiment, if at least two TRPs need to send second transmission parameter sets to same UE, the second transmission parameter sets sent by the different TRPs may be the same or may be different. Whether the at least two second transmission parameter sets that need to be sent are the same includes whether content of the second transmission parameter sets is the same. That the at least two second transmission parameter sets that need to be sent are the same may be that all second transmission parameter sets in the at least two second transmission parameter sets are the same, or may be that some second transmission parameter sets in at least three second transmission parameter sets are the same. That the at least two second transmission parameter sets that need to be sent are different may be that all second transmission parameter sets in the at least two second transmission parameter sets are different, or may be that some second transmission parameter sets in at least three second transmission parameter sets are different. That some second transmission parameter sets in the at least two second transmission parameter sets are the same means that there is another different second transmission parameter set in the at least two second transmission parameter sets. Similarly, that some second transmission parameter sets in the at least two second transmission parameter sets are different means that there are other same second transmission parameter sets in the at least two second transmission parameter sets. Optionally, the at least two second transmission parameter sets that need to be sent may be grouped into different groups, second transmission parameter sets in a same group are the same, and second transmission parameter sets that belong to different groups are different.

The UE may learn whether the at least two second transmission parameter sets that need to be sent are the same. It may be determined, in an explicit or implicit manner, whether the at least two second transmission parameter sets that need to be sent are the same.

Explicit indication information may be used to indicate whether the at least two second transmission parameter sets are the same. The first transmission parameter set may further include content indication information of a second transmission parameter set, and the content indication information of the second transmission parameter set may indicate that the second transmission parameter sets sent by the at least two TRPs to the same UE are the same or different. For example, if there are four second transmission parameter sets to be sent, content indication information of the second transmission parameter sets may indicate that all the four second transmission parameter sets are the same; or indicates that all the four second transmission parameter sets are different; or may indicate that the first and the second transmission parameter sets in the four second transmission parameter sets are the same, and the third and the fourth transmission parameter sets are the same. Alternatively, the content indication information may indicate that the first and the second transmission parameter sets in the four second transmission parameter sets are different from the third and the fourth transmission parameter sets, and the like.

In this embodiment, associated control channel resources may be configured for the second transmission parameter sets, so that the UE can implicitly determine, by using the associated control channel resources configured for the second transmission parameter sets, whether the at least two second transmission parameter sets are the same. The configured associated control channel resources may be, for example, a search space, a time-frequency resource, or a physical control channel candidate. The UE may determine, by using search spaces, time-frequency resources, or physical control channel candidates associated with the second transmission parameter sets, whether the second transmission parameter sets are the same. A same search space may be configured for same second transmission parameter sets, and different search spaces may be configured for different second transmission parameter sets. Therefore, the UE may determine, based on the search spaces associated with the second transmission parameter sets, whether the at least two second transmission parameter sets are the same. If search spaces associated with two second transmission parameter sets are the same, the UE confirms that the two second transmission parameter sets are the same. An associated fixed time-frequency resource may be configured for same second transmission parameter sets. For example, second transmission parameter sets for which different time resources are configured but a same frequency-domain resource is occupied are the same. For another example, second transmission parameter sets for which a same time-frequency resource is configured are the same. In this way, the UE may determine, based on associated time-frequency resources configured for the at least two second transmission parameter sets, whether the at least two second transmission parameter sets are the same. An associated fixed physical control channel candidate may be configured for same second transmission parameter sets. For example, it is configured that control channel information corresponding to at least two groups of control channel candidates at one aggregation level is the same, and each of the at least two groups of control channel candidates includes at least one control channel candidate. For example, the aggregation level is 4, including eight control channel candidates, that is, there may be eight control channel element (CCE) sets. Each CCE set includes four CCEs. CCEs included in different CCE sets are orthogonal to each other, and are grouped into two groups according to a division rule of CCEs occupied by a predefined control channel candidate or a division rule of CCEs occupied by a control channel candidate configured by a network. The first group is corresponding to the first half of CCEs occupied by all control channel candidates, that is, corresponding to the first four control channel candidates. The second group is corresponding to the second half of the CCEs occupied by all the control channel candidates, that is, corresponding to the last four control channel candidates. In this way, the UE may determine, based on the associated control channel candidates configured for the at least two second transmission parameter sets, whether the at least two second transmission parameter sets are the same. The division rule of the CCEs occupied by the control channel candidate configured by the network may be configured when the control channel resources are configured. For example, the division rule of the CCEs may be explicitly configured by using the first transmission parameter set.

Optionally, when second transmission parameter sets that at least two TRPs are to separately send are different, the first transmission parameter set may further include antenna port group information. The antenna port group information may indicate information about an antenna port allowed to be used by a data channel, and the data channel may be a physical downlink shared channel (PDSCH) or a physical uplink shared channel (PUSCH). The second transmission parameter set may further share some demodulation reference signals (DMRS) with the PDSCH, that is, the PDSCH and a physical downlink control channel may share some DMRSs. In this case, the physical downlink control channel may perform channel estimation and demodulation by using the some DMRSs shared with the PDSCH, thereby reducing pilot overheads caused when the DMRSs are individually sent to the physical downlink control channel for channel estimation and demodulation.

Optionally, the first transmission parameter set may further include QCL parameter configuration information corresponding to an antenna port group. The QCL parameter configuration information may be used by the UE to determine a QCL parameter set that needs to be used when the UE receives or demodulates a channel, and the QCL parameter set includes a QCL parameter set used for receiving or demodulating at least one of a channel that carries a second parameter set and a data channel scheduled by a second parameter set. For example, the QCL parameter configuration information may be used to configure a plurality of groups of QCL parameters. A value in each group of QCL parameters may be a channel large-scale parameter value corresponding to at least one of a channel state information-reference signal (CSI-RS), a phase-noise reference signal (PN-RS), a synchronization channel, a parameter (such as an angle of arrival or receive beam information) representing a UE-side space-related characteristic, and the like. For example, the QCL parameter configuration information may be at least one of a corresponding CSI-RS resource or ID, a PN-RS resource or ID, a synchronization channel resource or ID, and a resource or an ID of a parameter (such as an angle of arrival or receive beam information) representing a UE-side space-related characteristic.

Optionally, when the antenna port for sending the second parameter set and the antenna port for sending the data channel scheduled by the second parameter set are different or do not meet a QCL requirement, the QCL parameter configuration information included in the first transmission parameter set needs to be separately configured for the antenna port for sending the second parameter set and the antenna port for sending the data channel scheduled by the second parameter set. That is, the QCL parameter configuration information may include QCL parameter configuration information of the antenna port for sending the second parameter set and QCL parameter configuration information of the antenna port for sending the data channel scheduled by the second parameter set. The two types of QCL parameter configuration information are different.

Optionally, the first transmission parameter set may further include QCL parameter indication information corresponding to an antenna port group. In combination with the QCL parameter configuration information, the QCL parameter indication information may be used to assist the UE in separately performing channel estimation and signal demodulation on at least one of a channel that carries the second parameter set and a data channel scheduled by the second parameter set. For example, the QCL parameter configuration information may be used to configure a plurality of groups of QCL parameter sets, and the QCL parameter indication information may indicate a QCL parameter set corresponding to an antenna port that carries a specific channel or signal. The QCL parameter indication information indicates specific QCL parameter configuration information corresponding to each group of antenna ports of the channel that carries the second parameter set and/or the data channel scheduled by the second parameter set.

When the QCL parameter configuration information included in the first transmission parameter set needs to be separately configured for the antenna port for sending the second parameter set and the antenna port for sending the data channel scheduled by the second parameter set, correspondingly, the first transmission parameter set may include QCL parameter indication information of an antenna port for sending the second transmission parameter set and QCL parameter indication information of an antenna port used for the data channel scheduled by the second transmission parameter set.

In this embodiment of the present invention, the first transmission parameter set may further include rank information. Optionally, the rank information in this embodiment of the present invention may be rank information indicating transmission of each physical layer code word, or may be rank information of data scheduled by the second transmission parameter set. In this embodiment, for two-level DCI, the second transmission parameter set is sub-level DCI, for example, level-2 DCI, and the first transmission parameter set that includes the rank information may be level-1 DCI. By using a rule of mapping a code word to a layer, different TRPs may use different QCL antenna ports to send their respective second transmission parameter sets and data channels scheduled by corresponding second parameter sets.

In this embodiment of the present invention, the first transmission parameter set may further include layer mapping information, used to predefine a mapping relationship from a code word to a layer.

In this embodiment of the present invention, the first transmission parameter set may further include beam information. The beam information may include sending beam information, receiving beam information, or sending and receiving beam pair information. A beam may be understood as a space resource, may refer to a transmit precoding vector and/or a receive precoding vector having an energy transmission directivity, and can identify the transmit precoding vector and/or the receive precoding vector by using index information. The energy transmission directivity may mean that at a specific spatial location, a signal obtained after the precoding vector performs precoding processing has a relatively good receive power, such as meeting a receive demodulation signal-to-noise ratio. The energy transmission directivity may also mean that same signals received from different spatial locations by using the precoding vector have different receive powers. One device may have different precoding vectors. Different devices may also have different precoding vectors, that is, corresponding to different beams. For a configuration or a capability of a communications device, one communications device may use one or more of a plurality of different precoding vectors at a same moment, that is, may form one or more beams at the same time. The beam information may be identified by using the index information. The index information may be corresponding to a correspondingly configured resource identity (ID) of the UE, for example, an ID or a resource of a correspondingly configured CSI-RS, or may be an ID or a resource of a correspondingly configured uplink sounding reference signal (SRS); or may be index information that is explicitly or implicitly carried by using a signal or a channel carried by the beam, including but not limited to sending a synchronization signal or a broadcast channel by using the beam to indicate the index information of the beam.

In this embodiment of the present invention, one or more pieces of information in the foregoing described first transmission parameter set may be used for uplink scheduling, or may be used for downlink scheduling, or may be used for uplink scheduling and downlink scheduling.

Optionally, in this embodiment of the present invention, the foregoing described antenna port group information, rank information, layer mapping information, resource allocation result information, and beam information may not be included in the first transmission parameter set, but are included in the second transmission parameter set for sending. Optionally, the second transmission parameter set includes multi-level DCI, such as two-level DCI, and the information may be included in level-1 DCI of the second transmission parameter set. Optionally, when the control channel and the data channel do not share DMRSs, the antenna port of the control channel is different from the antenna port of the data channel. The antenna port group information of the control channel, the QCL parameter configuration information of the antenna port, the QCL parameter indication information of the antenna port, and the like are included in the first transmission parameter set. The antenna port group information of the data channel indicated by the control channel, the QCL parameter indication information of the antenna port, and the like are included in the second transmission parameter set. Optionally, the second transmission parameter set includes multi-level DCI, such as two-level DCI. Then, the antenna port group information of the data channel indicated by the control channel, the QCL parameter indication information of the antenna port, and the like may also be included in level-1 DCI of the second transmission parameter set.

During uplink scheduling, the second transmission parameter set may further include at least one of subband precoding information and power control information. Optionally, the second transmission parameter set includes multi-level DCI, such as two-level DCI. Then, the subband precoding information may be included in level-2 DCI of the second transmission parameter set, and the power control information may be included in level-1 DCI or the level-2 DCI of the second transmission parameter set.

In this embodiment, optionally, one second transmission parameter set may indicate resource allocation information and a modulation and coding scheme of one physical layer code word, and correspondingly, a quantity of second transmission parameter sets may be equal to a quantity of physical layer code words that the UE needs to receive. Different code words are mapped to different layers, and are sent by using antenna ports of different groups indicated by the antenna port group information.

Optionally, when the second transmission parameter set is used to indicate uplink scheduling information, the quantity of second transmission parameter sets may be a quantity of beam sets that perform simultaneous uplink communication. Optionally, the quantity information of the second transmission parameter sets is corresponding to a quantity of uplink code words of scheduled UE. The second transmission parameter set may further include level-1 beam information indicating uplink sending of the UE, such as at least one of a beam identity measured during uplink beam scanning or a precise detection process, a sounding reference signal (SRS) resource identity, a broadband corresponding to the beam, or long-term precoding matrix indicator (precoding matrix indicator, PMI) information (for example, a level-1 code book W1 when a two-level code book structure is used).

In this embodiment of the present invention, the TRP may send, to the UE, quantity information of control information to be sent. A quantity of control information to be sent to the UE is N, and N is an integer greater than or equal to 1. The user equipment determines, based on the quantity information, that a quantity of control information that needs to be detected is N, and the user equipment detects the control information from N TRPs. When the second transmission parameter set is two-level DCI in this embodiment, the TRP may send, to the UE in level-1 DCI of the second transmission parameter set, the quantity information of the control information to be sent, that is, the level-1 DCI of the transmission parameter set may include the quantity information of the control information to be sent. When the quantity of control information to be sent is greater than or equal to 2, the level-1 DCI of the second transmission parameter set may further include DCI content indication information, that is, equivalent to the foregoing content indication information of the second transmission parameter set.

The DCI content indication information indicates whether at least two pieces of control information to be sent are the same, and the UE may perform corresponding processing on the at least two pieces of control information based on the indication information. A processing manner is the same as that described above, that is, if the DCI content indication information indicates that the at least two pieces of control information to be sent are the same, the UE may combine the detected at least two pieces of control information, so as to obtain a diversity gain, thereby improving reliability of control information transmission. If the DCI content indication information indicates that the at least two pieces of control information to be sent are different, the UE may separately determine and obtain different data channels, so as to further perform data transmission. The level-1 DCI of the second transmission parameter set may further include the foregoing QCL parameter indication information. Optionally, the level-1 DCI of the second transmission parameter set may further include rank information indicating transmission of each quasi co-location code word. Optionally, the level-1 DCI of the second transmission parameter set may further include rank information. Optionally, the rank information may be rank information indicating transmission of each physical layer code word, or may be rank information of data scheduled by the control information. The level-1 DCI of the second transmission parameter set further includes beam information. The beam information indicates a transmit beam of level-2 DCI of the second transmission parameter set, or indicates a receive beam of level-2 DCI of the second transmission parameter set, or indicate a transmit beam and a receive beam of level-2 DCI of the second transmission parameter set. The control information may be sent by using the level-2 DCI of the second transmission parameter set. The other various parameters described in the foregoing embodiment may still be sent in the first transmission parameter set or in the second transmission parameter set in the foregoing described manner. The content described in the foregoing embodiment may also be applied to an implementation in which the level-1 DCI of the transmission parameter set may include the quantity information of the control information to be sent.

Figure 9:
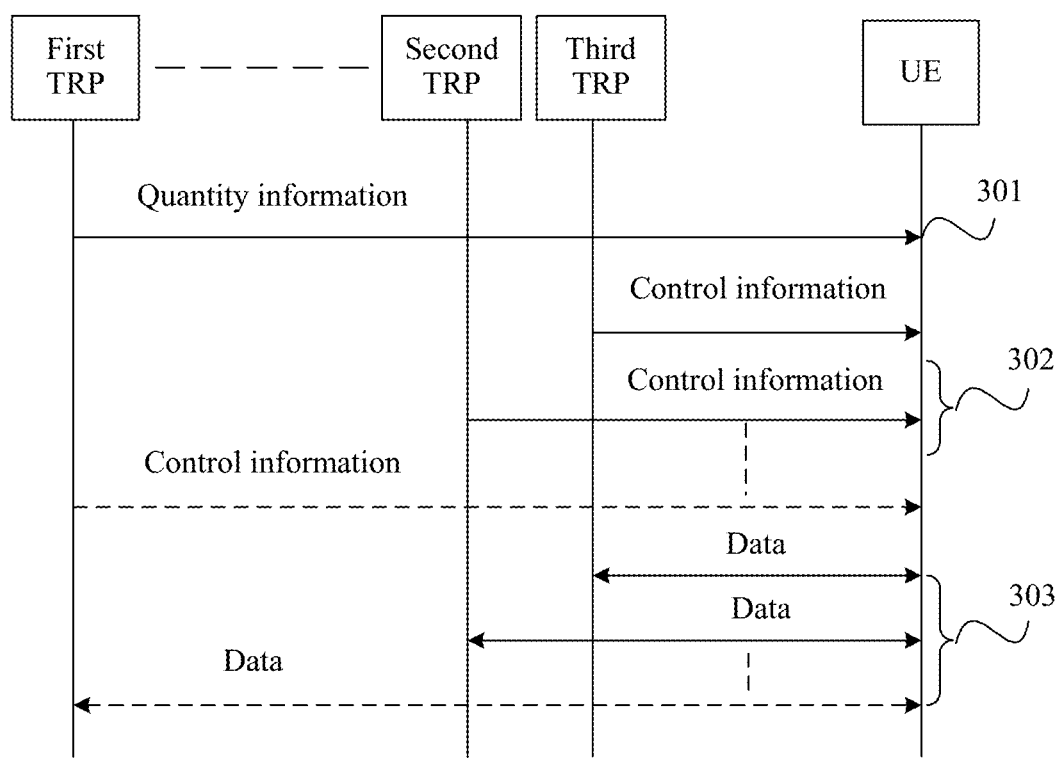
FIG. 9 is a schematic flowchart of a communication method according to an embodiment of the present invention.

With reference to the communications system shown in FIG. 8 and the content described in the foregoing embodiments, as shown in FIG. 9, an embodiment of the present invention provides a communication method, which is an information obtaining method. In this method, a TRP may send, to UE, quantity information of control information to be sent. A quantity of control information to be sent to the UE is N, and N is an integer greater than or equal to 1. The user equipment determines, based on the quantity information, that a quantity of control information that needs to be detected is N, and the user equipment detects the control information from N TRPs. In operation 301, the TRP sends, to the UE, the quantity information of the control information to be sent, and the UE receives the quantity information of the control information to be sent.

In this embodiment, a first transmission parameter set may include the quantity information of the control information to be sent. The control information is sent by using a second transmission parameter set, that is, the TRP sends the first transmission parameter set to the UE, and the first transmission parameter set includes quantity information of second transmission parameter sets to be sent.

In the example shown in FIG. 9, a first TRP may send the first transmission parameter set, and the first TRP may be the TRP 501 in the implementation of the communications system shown in FIG. 8A. Alternatively, a first TRP such as the TRP 503, the TRP 505, or the TRP 507 in the implementation of the communications system shown in FIG. 8B sends the first transmission parameter set to the UE 404.

In this embodiment, the first transmission parameter set may include the quantity information of the second transmission parameter sets to be sent, and information that may be included in the first transmission parameter set described in the foregoing embodiment.

In this embodiment, quantity information of second transmission parameter sets transmitted on a same carrier is indicated to the UE, so that not only coordinated multipoint transmission/reception can be supported, but also UE single-connection transmission can be well backward compatible.

In this embodiment of the present invention, the first transmission parameter set may be sent to the UE in different manners.

Optionally, the first transmission parameter set may be sent by using a radio resource control (RRC) message. For example, the first transmission parameter set may be sent in an initial access process, a handover process, or an RRC reconfiguration process of the UE by using the RRC message. The RRC message may further include an information element (IE) for configuring another radio resource, and the radio resource may be corresponding to one or more of a physical downlink shared channel, a physical uplink shared channel, a physical uplink control channel, a channel state measurement reference signal (channel state information reference signal, CSI-RS), an uplink channel measurement reference signal (sounding reference signal, SRS), and the like. The RRC message may also carry only the first transmission parameter set. Sending the first transmission parameter set by using the RRC message may save a control channel resource, and because the RRC message is carried by using a PDSCH, the first transmission parameter set may be sent by using relatively low modulation order and code rate, thereby ensuring transmission reliability.

Optionally, the first transmission parameter set may also be sent by using a medium access control (MAC) control element (CE). The MAC CE may carry some or all information in the first transmission parameter set, for example, the MAC CE carries information related to receiving of a PDCCH by the UE. The first transmission parameter set is sent by using the MAC CE, so that PDCCH configuration can be updated relatively quickly, so as to better match an actual physical channel.

Optionally, the first transmission parameter set may be sent by using DCI in a complete format. For example, if the communications system in this embodiment of the present invention provides at least two pieces of DCI in a complete format, the first transmission parameter set may be sent in the DCI in a complete format.

Optionally, in this embodiment of the present invention, if multi-level DCI is provided, the first transmission parameter set may be sent by using level-1 DCI. In this case, the second transmission parameter set may be sent by using level-2 DCI.

Optionally, in operation 301, the quantity information of the control information to be sent may be sent by using level-1 DCI of the second transmission parameter set, that is, the first TRP sends the level-1 DCI of the second transmission parameter set to the UE. The level-1 DCI includes the quantity information of the control information to be sent.

In operation 302, at least one TRP may send control information to same UE.

In this embodiment, when the first transmission parameter set includes the quantity information of the control information to be sent, and the control information is sent by using the second transmission parameter set, at least one TRP sends the second transmission parameter set to same UE.

In this embodiment, the TRP that sends the first transmission parameter set may be one of the at least one TRP that sends the second transmission parameter set, that is, the TRP that sends the first transmission parameter participates in sending of the second transmission parameter set. Alternatively, the TRP that sends the first transmission parameter set may not be one of the at least TRP, that is, the TRP that sends the first transmission parameter set does not participate in sending of the second transmission parameter set. For example, in operation 302, the first TRP may send the second transmission parameter set to the UE, and optionally, the first TRP may not send the second transmission parameter set to the UE.

The UE may determine, based on the quantity information that is of the second transmission parameter sets to be transmitted to the UE and that is included in the first transmission parameter set, a quantity of second transmission parameter sets that need to be received, and detect the corresponding determined quantity of second transmission parameter sets. If the UE determines that the quantity of second transmission parameter sets that need to be received is N, and N is an integer greater than or equal to 1, the UE detects N second transmission parameter sets.

During multipoint transmission, the quantity that is of second transmission parameter sets to be transmitted and that is indicated by the quantity information that is of the second transmission parameter sets to be transmitted to the UE and that is included in the first transmission parameter set is at least 2. In this case, the UE determines that the quantity N of second transmission parameter sets that need to be received is an integer greater than or equal to 2. The TRP sends, to the UE, the quantity information of the second transmission parameter sets to be transmitted. After obtaining the quantity information, the UE can determine the second transmission parameter sets to be detected, and detect the corresponding quantity of second transmission parameter sets. During coordinated multipoint transmission/reception, different TRPs may use second transmission parameter sets in a same format, and there is no need to extend the second transmission parameter set. In different transmission, there is no need to frequently change the format of the second transmission parameter set. Therefore, both the TRP and the UE can easily implement different transmission.

For example, the UE may perform blind detection, based on the quantity of second transmission parameter sets to be received, a second transmission parameter on a candidate resource specified by resource information. If the quantity of second transmission parameter sets that need to be received is 1, the UE considers that the TRP sends only one second transmission parameter set in a scheduling unit, and performs blind detection on the candidate resource. If one second transmission parameter is detected, the UE considers that all second transmission parameter sets that need to be received are detected, and completes detection. If the quantity of second transmission parameter sets that need to be received is 2, the UE performs detection on two second transmission parameter sets on the candidate resource specified by the resource information. If two second transmission parameter sets are detected, detection is completed. If detection on two second transmission parameter sets is completed, and all candidate resources are detected, but only one second transmission parameter set is detected, the UE considers that a network side sends only one second transmission parameter set in the scheduling unit, and performs subsequent data receiving or sending based on control information indicated by the second transmission parameter set.

In the transmission mode shown in FIG. 8A, the UE 402 may receive the second transmission parameter set sent by the TRP 501. In the transmission mode shown in FIG. 8B, when the TRP that sends the first transmission parameter participates in sending of the second transmission parameter set, the UE 404 may receive the second transmission parameter sets separately sent by the TRP 503, the TRP 505, and the TRP 507. When the TRP that sends the first transmission parameter set does not participate in sending of the second transmission parameter set, if the TRP 503 sends the first transmission parameter set, the UE 404 may receive the second transmission parameter sets separately sent by the TRP 505 and the TRP 507.

In coordinated multipoint transmission/reception provided in this embodiment of the present invention, the at least two TRPs may separately send second transmission parameter sets to the same UE. Formats of the second transmission parameter sets separately sent by the at least two TRPs may be the same, that is, PDCCHs that separately carry the second transmission parameter sets have a same DCI format. The UE may retrieve the PDCCHs in the same DCI format. The formats of the second transmission parameter sets separately sent by the TRPs in coordinated multipoint transmission/reception may also be the same as a format of a second transmission parameter set separately sent by a TRP in single-point transmission.

Optionally, content of the second transmission parameter sets separately sent by the at least two TRPs to the same UE may be the same or may be different. If the first transmission parameter set received by the UE includes content indication information of the second transmission parameter sets, the UE determines, based on the indication information, whether content of the second transmission parameter sets is the same, so as to perform corresponding processing. When the content indication information of the second transmission parameter sets indicates that the second transmission parameter sets separately sent by the at least two TRPs to the same UE are the same, the UE may independently or jointly receive and combine the at least two second transmission parameter sets, thereby improving transmission reliability of the second transmission parameter sets. When the content indication information of the second transmission parameter sets indicates that the second transmission parameter sets sent by the at least two TRPs to the same UE are different, the UE independently demodulates each second transmission parameter set, does not perform content combination, and performs data scheduling and transmission based on each second transmission parameter set, that is, at least one of downlink data receiving and uplink data sending is included.

Optionally, content of the second transmission parameter sets separately sent by the at least two TRPs to the same UE may be the same or may be different. If the first transmission parameter set received by the UE includes content indication information of the second transmission parameter sets, the UE determines, based on the indication information, whether content of the second transmission parameter sets is the same, so as to perform corresponding processing. When the content indication information of the second transmission parameter sets indicates that the second transmission parameter sets separately sent by the at least two TRPs to the same UE are the same; or the UE may determine, based on associated control channel resources configured for the second transmission parameter sets, that the second transmission parameter sets separately sent by the at least two TRPs to the same UE are the same, the UE may independently or jointly receive and combine the at least two second transmission parameter sets, thereby improving transmission reliability of the second transmission parameter sets. When the content indication information of the second transmission parameter sets indicates that the second transmission parameter sets sent by the at least two TRPs to the same UE are different; or the UE may determine, based on associated control channel resources configured for the second transmission parameter sets, that the second transmission parameter sets separately sent by the at least two TRPs to the same UE are different, the UE independently demodulates each second transmission parameter set, does not perform content combination, and performs data scheduling and transmission based on each second transmission parameter set, that is, at least one of downlink data receiving and uplink data sending is included.

For example, the content of the second transmission parameter sets sent by the at least two TRPs may be the same. Then, when sending on a link between one of the TRPs and the UE is interrupted, or the second transmission parameter set on the link is not successfully sent, the second transmission parameter set may be sent to the UE by using another TRP. Therefore, sending reliability of the second transmission parameter set may be improved. In particular, for example, in a high frequency (high frequency, HF) scenario, because the TRP and the UE communicate with each other by using a narrow beam, and high-frequency communication has a relatively poor diffraction capability, an obstruction easily occurs. For example, during normal communication, a communications link is suddenly blocked by a moving object. When an obstruction occurs, a normal communications link is easily interrupted. Therefore, in this embodiment of the present invention, sending reliability of the second transmission parameter set may be improved.

Alternatively, for example, the content of the second transmission parameter sets sent by the at least two TRPs may be different. Therefore, according to the solution provided in this embodiment of the present invention, implementation of non-coherent joint transmission (non-coherent joint transmission, NCJT) transmission may be supported. Each TRP may independently send a different second transmission parameter set to the same UE, and the corresponding second transmission parameter set indicates scheduling information of the corresponding TRP for the UE, so that each TRP is capable of independently performing data scheduling and independently sending data to the UE, thereby implementing NCJT and reducing a quantity of blind detection performed by the UE on the control channel.

Optionally, in coordinated multipoint transmission/reception, the at least two TRPs may separately send the second transmission parameter sets to the same UE on a same carrier, or may separately send the second transmission parameter sets to the same UE on different carriers.

Optionally, in coordinated multipoint transmission/reception, when DCI in a complete format is formed by sub-level DCI, the second transmission parameter set is sub-level DCI, such as level-2 DCI. When the first transmission parameter set includes rank information, the UE may obtain layer information and port information during data transmission based on the received rank information and in combination with a rule of mapping a code word to a layer. If the first transmission parameter set further includes QCL parameter configuration information corresponding to the code word or QCL parameter configuration information corresponding to the control channel that carries the second transmission parameter set, after receiving the QCL parameter configuration information, the UE may perform channel estimation and demodulation on the control channel.

Optionally, in operation 301, when the quantity information of the control information to be sent may be sent by using level-1 DCI of the second transmission parameter set, at least one TRP may send the control information by using level-2 DCI of the second transmission parameter set, that is, the second transmission parameter set includes the control information.

Optionally, after the second transmission parameter set is received, the method may further include operation 303. In operation 303, the UE may further perform data transmission with at least one TRP based on a data channel indicated by the control information.

In coordinated multipoint transmission/reception provided in this embodiment of the present invention, at least two TRPs independently schedule data transmission by independently sending the second transmission parameter sets or the control information. When there are different carriers, data transmission performed by the different TRPs and the same UE may be performed on a same carrier or may be performed on different carriers. Data that is independently pre-coded may be the same, so that data transmission reliability can be improved. Data that is independently pre-coded may be different, so that a data transmission capacity of the entire system can be increased. Therefore, according to the solution in this embodiment of the present invention, data transmission reliability may be improved, and the data transmission capacity of the system is increased.

In this embodiment of the present invention, the quantity information of the control information to be transmitted or the quantity information of the second transmission parameter sets to be transmitted may uniformly indicate a transmission mode, for example, may distinguish a single-point transmission mode from a multipoint transmission mode; and may indicate the single-point transmission mode or the multipoint transmission mode. That is, different quantity information of second transmission parameter sets to be transmitted or different quantity information of control information to be transmitted may indicate different transmission modes. Optionally, in this embodiment, the transmission mode and a channel state information measurement configuration parameter may be decoupled. The channel state information measurement configuration parameter includes configuration of a CSI-RS channel measurement part, configuration of a channel interference measurement part, mode configuration of a channel state information feedback, period configuration of a new state information feedback, or the like. The single-point transmission mode and the multipoint transmission mode may be indicated by using the quantity information of the control information or the quantity information of the second transmission parameter sets, and the channel state information measurement configuration parameter is not bound with the information indicating the transmission mode for sending, but is sent by using other higher layer signaling and/or physical layer signaling. In this way, accuracy of channel state information measurement and feedback may be improved, so that communication can be effectively enabled to adapt to an actual channel change, and communication efficiency can be improved. For example, the TRP may send the quantity information of the control information or the quantity information of the second transmission parameter sets to the UE, and the quantity information is 1. Then, the UE determines that a current transmission mode is non-coordinated transmission. The TRP may send channel state measurement configuration information to the UE based on a channel change situation, to instruct the UE to measure quality of a plurality of channels. If the plurality of channels meet multipoint transmission, coordinated transmission may be performed. The TRP may first send the quantity information of the second transmission parameter sets or the quantity information of the control information in a form of DCI, a MAC CE, or multi-level DCI, and the quantity information is greater than or equal to 2. Then, the UE may immediately switch to a multipoint coordination policy for transmission. Similarly, coordinated multipoint transmission/reception may be quickly and dynamically switched to non-coordinated transmission, so that communication can be effectively enabled to adapt to an actual channel change, and communication efficiency can be improved.

In this embodiment of the present invention, if QCL related information in the first transmission parameter set may be dynamically configured, and the first transmission parameter set is configured in a non-dynamic manner, dynamic point selection (DPS) coordinated transmission may be further implemented. N TRPs may be selected as candidate TRP nodes, and N is an integer greater than or equal to 2. M TRPs are dynamically selected from the candidate TRPs to send data to same UE, and $1 \leq M \leq N$. In this embodiment, the quantity information that is sent by the TRP to the UE and that is of the second transmission parameter sets or the quantity information that is sent by the TRP to the UE and that is of the control information is N. Therefore, the UE detects N second transmission parameter sets or N pieces of control information on a candidate resource. Because only M TRPs are selected to participate in coordinated transmission, the UE can detect only M second transmission parameter sets or M pieces of control information. Within a validity period of the quantity information of the second transmission parameter sets or the quantity information of the control information, a network side may randomly and dynamically select any quantity of TRPs from the N nodes to send the quantity information of the second transmission parameter sets or the quantity information of the control information, but there is no need to notify corresponding quantity information of second transmission parameter sets or corresponding quantity information of control information each time a TRP participating in coordinated transmission changes, because the UE may perform detection with a maximum range of N nodes. In this scenario, the network side is prevented from frequently delivering higher layer signaling or physical layer signaling that is used to carry the first transmission parameter set, and the UE is prevented from frequently receiving the signaling, thereby saving air interface resources and reducing energy consumption of the UE.

In this embodiment of the present invention, a plurality of second transmission parameter sets or a plurality of pieces of control information may support coordinated transmission of a plurality of TRPs. A plurality of pieces of quantity information of second parameter sets or a plurality of pieces of quantity information of control information may be corresponding to a plurality of PDCCHs or a plurality of pieces of DCI, and each piece of DCI or each PDCCH can transmit scheduling information of a specific TRP. To support non-coherent joint transmission having a non-ideal backhaul, different TRPs independently schedule resources and send data, and each TRP independently sends a PDCCH. In this case, each piece of DCI carries resource scheduling information of a related TRP, and all DMRS ports corresponding to a data channel scheduled by one piece of DCI may be considered quasi co-location. Compared with single-TRP transmission, formats of all DCI in NCJT transmission are the same, and a difference lies in that the UE needs to detect more than one piece of DCI or more than one PDCCH from different TRPs. In addition, a plurality of second transmission parameter sets or a plurality of pieces of control information are supported, so that control channel reliability can be improved, especially an effect of reducing interruption in a high-frequency channel scenario. In this case, different TRPs may transmit same control information to same target UE at the same time. A same quantity of control information, namely, DCI, may be configured in the first transmission parameter set, and when the UE receives the DCI, the target UE may combine the DCI to obtain a diversity gain. Therefore, the first transmission parameter set may indicate physical layer control channels or control information sent from different TRPs.

Most parameters in the first transmission parameter set may be semi-statically configured and may be configured by using an RRC message. However, for coordinated transmission, transmission periods for some parameter configuration in the first transmission parameter set may be several or even dozens of transmission time intervals (transmission time interval, TTI). Therefore, related configuration may be performed by using layer 1 or layer 2. The some parameter configuration includes configuration of the quantity of second transmission parameter sets or configuration of the quantity of control information, configuration about whether content of second transmission parameter sets or content of control information is the same, or the like mentioned in the present invention.

The first transmission parameter set may be semi-statically configured. Signaling cycles of a transmission mode (transmission scheme) set indication and a semi-static configuration/indication of multipoint transmission can be long enough to adapt to a design of layer 3. Signaling cycles of indications of a plurality of layer-1 control channels/pieces of information from a plurality of different TRPs need to be at least several TTIs and at most dozens of TTIs, and may be designed at layer 1 or layer 2. Therefore, the first transmission parameter set may support at least one of a layer-3 indication of a transmission mode set, semi-static configurations/indications transmitted by a plurality of TRPs, and layer-1 or layer-2 indications of a plurality of layer-1 control channels/pieces of information from a plurality of different TRPs.

FIG. 10 shows a schematic diagram of an embodiment of UE according to the present invention. UE 40 shown in the figure may be the UE 402 or the UE 404 in the embodiments shown in FIG. 8 and FIG. 9. The UE 40 in the embodiment of FIG. 10 may be configured to implement content that the UE 402 or the UE 404 participates in implementing in the embodiments described in FIG. 8 and FIG. 9, including all content of the first transmission parameter set and/or the second transmission parameter set described in all the foregoing embodiments.

Figure 10A:
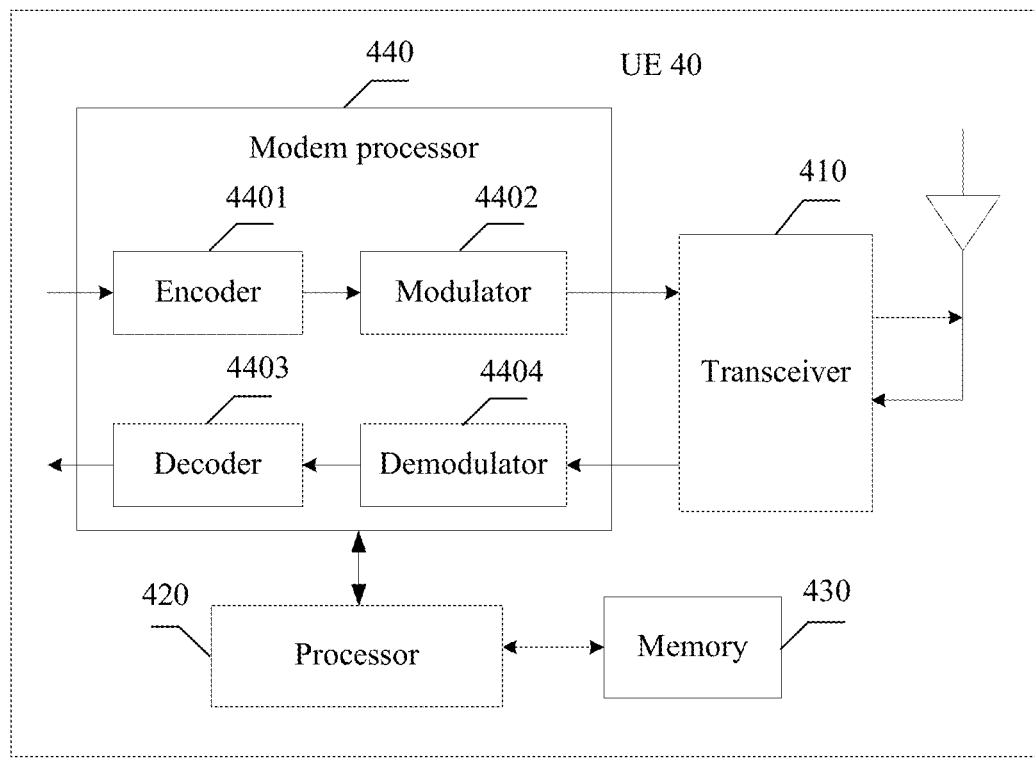
FIG. 10A is a schematic structural diagram of UE according to an embodiment of the present invention.

The UE 40 shown in FIG. 10A includes a transceiver 410, a processor 420, and may further include a memory 430 and a modem processor 440.

The transceiver 410 adjusts (for example, through analog conversion, filtering, amplification, and up-conversion) an output sample and generates an uplink signal. The uplink signal is transmitted to the TRP 50 in the foregoing embodiment by an antenna. In a downlink, the antenna receives a downlink signal transmitted by the TRP 50 in the foregoing embodiment. The transceiver 410 adjusts (for example, through filtering, amplification, down-conversion, and digitization) a signal received from the antenna and provides an input sample. For example, the transceiver 410 may receive quantity information that is sent by a TRP and that is of control information to be sent, and may further receive control information sent by at least one TRP. Further, the transceiver 410 may receive downlink data sent by at least one TRP, or send uplink data to the at least one TRP. In the modem processor 440, an encoder 4401 receives service data and a signaling message that are to be sent in an uplink, and processes the service data and the signaling message (for example, performs formatting, encoding, and interleaving). A modulator 4402 further processes (for example, performs symbol mapping and modulation) encoded service data and an encoded signaling message, and provides an output sample. A demodulator 4404 processes (for example, performs demodulation) the input sample, and provides a symbol estimation result. A decoder 4403 processes (for example, performs de-interleaving and decoding) the symbol estimation result and provides decoded data and a decoded signaling message to be sent to the UE. The encoder 4401, the modulator 4402, the demodulator 4404, and the decoder 4403 may be implemented by the combined modem processor 440. These components perform processing based on a radio access technology used in a radio access network.

The processor 420 controls and manages an action of the UE 40, and is configured to perform processing performed by the UE 402 or 404 in the foregoing embodiment. For example, the processor 420 may determine, based on the quantity information of the control information to be sent, a quantity of control information that needs to be received, and detect the corresponding determined quantity of control information. The processor 420 is configured to support the UE 40 in executing the content of the UE in this embodiment of the present invention. The memory 430 is configured to store program code and data used for the UE 40.

Figure 10B:
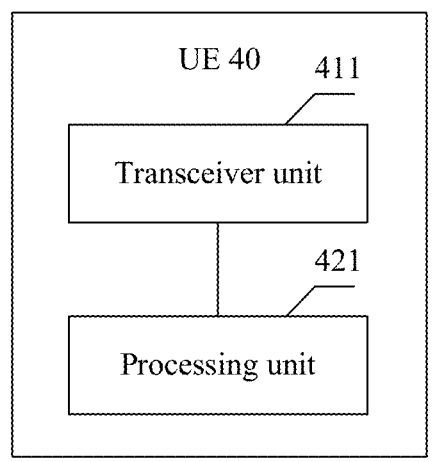
FIG. 10B is a schematic structural diagram of another UE according to an embodiment of the present invention.

As shown in FIG. 10B, an embodiment of the present invention provides an example of another UE 40. The UE 40 includes a transceiver unit 411 and a processing unit 421. The transceiver unit 411 may be configured to receive quantity information that is sent by a TRP and that is of control information to be sent, may further receive control information sent by at least one TRP, and may further receive downlink data sent by at least one TRP or send uplink data to the at least one TRP. The processing unit 421 may be configured to determine, based on the quantity information of the control information to be sent, a quantity of control information that needs to be received, and detect the corresponding determined quantity of control information.

FIG. 11 shows a schematic structural diagram of a TRP 50 according to an embodiment of the present invention. The TRP 50 shown in FIG. 11 may be the TRP in the embodiments shown in FIG. 8 and FIG. 9, such as the TRP 501, the TRP 503, or the TRP 505. The TRP 50 in the embodiment shown in FIG. 11 may be configured to implement content that the TRP participates in implementing in all the foregoing embodiments.

Figure 11A:
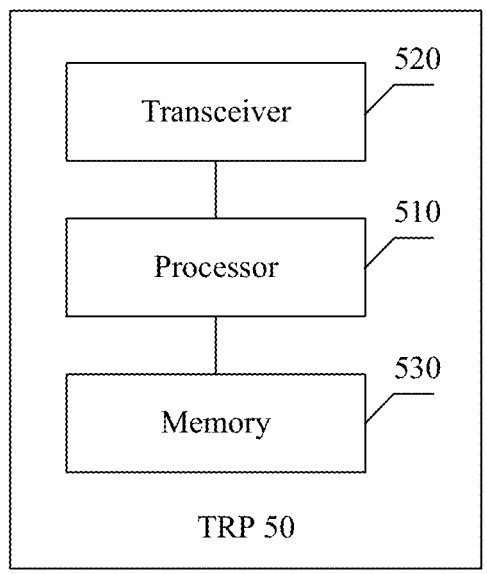
FIG. 11A is a schematic structural diagram of a TRP according to an embodiment of the present invention.

The TRP 50 shown in FIG. 11A includes a processor 510, a transceiver 520, and a memory 530. The transceiver 520 may be configured to support information receiving and sending between the TRP 50 and the UE 50 in the foregoing embodiment. For example, the processor 510 may determine quantity information of control information to be sent, and the transceiver 520 may send, to the UE, the quantity information of the control information to be sent, and send the control information to the UE. Further, the transceiver 520 may further send downlink data to the UE and receive uplink data sent by the UE. The TRP 50 may further include the memory 530, which may be configured to store program code and data of the TRP 50. It may be understood that FIG. 11 shows only a simplified implementation of the TRP 50.

Figure 11B:
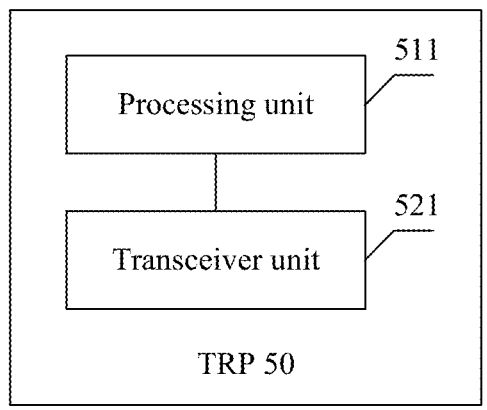
FIG. 11B is a schematic structural diagram of another TRP according to an embodiment of the present invention.

The TRP 50 described in FIG. 11B includes a processing unit 511 and a transceiver unit 521. The processing unit 511 may be configured to determine quantity information of control information to be sent, and the transceiver unit 521 may be configured to send, to the UE, the quantity information of the control information to be sent, and may send the control information to the UE. Further, the transceiver unit 521 may further send downlink data to the UE and receive uplink data sent by the UE.

A person skilled in the art can understand that information and signals may be expressed by using any technology techniques. For example, data, an instruction (instructions), a command, information, a signal, a bit, a symbol, and a chip may be expressed by a voltage, a current, an electromagnetic wave, a magnetic field or a magnetic particle (magnetic particles), an optical field or an optical particle (optical particles), or any combination thereof.

A person skilled in the art may further understand that various illustrative logical blocks (illustrative logic block) and operations (operation) that are listed in the embodiments of the present invention may be implemented by using electronic hardware, computer software, or a combination thereof. In order to display the interchangeability between the hardware and the software, functions of the foregoing various illustrative components and operations have been generally described. Whether the functions are implemented by using hardware or software depends on particular applications and an implementation requirement of the entire system. For each particular application, a person skilled in the art may use various methods to implement the functions. However, this implementation should not be understood to go beyond the protection scope of the embodiments of the present invention.

The various illustrative logical blocks, modules, and circuits described in the embodiments of the present invention may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or an implementation of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Operations of the methods or algorithms described in the embodiments of the present invention may be directly embedded into hardware, a software module executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Alternatively, the storage medium may further be integrated into the processor. The processor and the storage medium may be arranged in an ASIC, and the ASIC may be arranged in a user terminal. Alternatively, the processor and the storage medium may also be arranged in different components of the user terminal.

In one or more example implementations, the functions described in the embodiments of the present invention may be implemented by using hardware, software, firmware, or any combination thereof. If the functions are implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present application, technologies in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and implementations but may also be extended to a maximum scope that is consistent with the principles and disclosed new features of the present application.

What is claimed is:

1. A communication method for use in a wireless communication system, comprising:

receiving, by user equipment, information about a control channel resource set comprising at least one resource element group and at least one search space, wherein the information about the control channel resource set is used by the user equipment to determine a maximum quantity M of downlink control information that needs to be detected, where M is an integer greater than or equal to N, and N is an integer greater than 1;

receiving, by the user equipment, N pieces of downlink control information, wherein each of the N pieces of downlink control information comprises downlink data transmission information; and receiving, by the user equipment on a same carrier and a same time-domain resource based on the N pieces of downlink control information, downlink data sent by N network side devices.

2. The method according to claim 1, wherein the downlink data transmission information comprises first information used to receive the downlink data, antenna port numbers indicated by the first information in the N pieces of downlink control information being different from each other or combinations that are of an antenna port number and a reference signal scrambling manner and that are indicated by the first information in the N pieces of downlink control information being different from each other.

3. The method according to claim 1, wherein the user equipment receives the N pieces of downlink control information sent by a first network side device, and the N pieces of downlink control information comprise one or more of the following cases (1) and (2):
  (1) the N pieces of downlink control information comprise first-format downlink control information and/or second-format downlink control information, wherein downlink data transmission information in the second-format downlink control information comprises downlink data resource element mapping information and quasi co-location indicator information, and the downlink data resource element mapping information and the quasi co-location indicator information are used to receive the downlink data; and
  (2) downlink data transmission information in any one of the N pieces of downlink control information comprises network side device indication information of a network side device corresponding to the downlink control information.

4. The method according to claim 1, wherein the user equipment receives the N pieces of downlink control information sent by at least two network side devices, and the method further comprises:
  receiving, by the user equipment, search space information that is of a downlink control channel of at least one second network side device in the N network side devices and that is sent by a first network side device to the user equipment, wherein search space is a group of candidate control channel element sets, and is used by the user equipment to perform, in the control channel element set, blind detection on to-be-received downlink control information.

5. The method of claim 1 wherein M is an integer greater than N.

6. A communication method for use in a wireless communication system, comprising:
  sending, by a first network side device to user equipment, information about a control channel resource set comprising at least one resource element group and at least one search space, wherein the information about the control channel resource set is used by the user equipment to determine a maximum quantity M of downlink control information that needs to be detected, where M is an integer greater than or equal to N, and N is an integer greater than 1;
  generating, by the first network side device, at least one piece of downlink control information, wherein the downlink control information is at least one piece of downlink control information in N pieces of downlink control information, and the N pieces of downlink control information comprise downlink data transmission information used when N network side devices send downlink data to the user equipment on a same carrier and a same time-domain resource; and
  sending, by the first network side device, the at least one piece of downlink control information to the user equipment.

7. The method according to claim 6, wherein the downlink data transmission information comprises first information used to send the downlink data, antenna port numbers indicated by the first information in the N pieces of downlink control information being different from each other or combinations that are of an antenna port number and a reference signal scrambling manner and that are indicated by the first information in the N pieces of downlink control information being different from each other.

8. The method according to claim 6, wherein the first network side device sends the N pieces of downlink control information to the user equipment, and the N pieces of downlink control information comprise one or more of the following cases (1) and (2):
  (1) the N pieces of downlink control information comprise first-format downlink control information and/or second-format downlink control information, wherein downlink data transmission information in the second-format downlink control information comprises downlink data resource element mapping information and quasi co-location indicator information, and the downlink data resource element mapping information and the quasi co-location indicator information are used to receive downlink data; and
  (2) downlink data transmission information in any one of the N pieces of downlink control information comprises network side device indication information of a network side device corresponding to the downlink control information.

9. The method according to claim 6, wherein the method further comprises:
  sending, by the first network side device to the user equipment, search space information of a downlink control channel of at least one second network side device in the N network side devices, wherein search space is a group of candidate control channel element sets, and is used by the user equipment to perform, in the control channel element set, blind detection on to-be-received downlink control information.

10. The method of claim 6 wherein M is an integer greater than N.

11. A communications apparatus for use in a wireless communication system, comprising:
  a receiver, configured to receive information about a control channel resource set comprising at least one resource element group and at least one search space, wherein the information about the control channel resource set is used by the communication apparatus to determine a maximum quantity M of downlink control information that needs to be detected, where M is an integer greater than or equal to N, and N is an integer greater than 1;
  the receiver is further configured to receive N pieces of downlink control information, wherein each of the N pieces of downlink control information comprises downlink data transmission information; and
  a processor, configured to control the receiver to receive, on a same carrier and a same time-domain resource based on the N pieces of downlink control information, downlink data sent by N network side devices.

12. The apparatus according to claim 11, wherein the downlink data transmission information comprises first information used to receive the downlink data, antenna port numbers indicated by the first information in the N pieces of downlink control information being different from each other or combinations that are of an antenna port number and a reference signal scrambling manner and that are indicated by the first information in the N pieces of downlink control information being different from each other.

13. The apparatus according to claim 11, wherein the receiver is further configured to receive search space information that is of a downlink control channel of at least one second network side device in the N network side devices and that is sent by a first network side device to the user equipment, wherein search space is a group of candidate control channel element sets, and is used by the user equipment to perform, in the control channel element set, blind detection on to-be-received downlink control information.

14. The apparatus according to claim 11, wherein the receiver is further configured to receive quantity information that is sent by a network side device and that is of control information to be sent;

the processor is further configured to determine, based on the quantity information, that a quantity of control information that needs to be detected is N, and detect the control information.

15. A communications apparatus for use in a wireless communication system, comprising:

a transmitter, configured to send, to the user equipment, information about a control channel resource set comprising at least one resource element group and at least one search space, wherein the information about the control channel resource set is used by the user equipment to determine a maximum quantity M of downlink control information that needs to be detected, wherein M is an integer greater than or equal to N, and N is an integer greater than 1; and a processor, configured to generate at least one piece of downlink control information, wherein the downlink control information is at least one piece of downlink control information in N pieces of downlink control information, and the N pieces of downlink control information comprise downlink data transmission information used when N network side devices send downlink data to user equipment on a same carrier and a same time-domain resource;

wherein the transmitter is further configured to send the at least one piece of downlink control information to the user equipment.

16. The apparatus according to claim 15, wherein the downlink data transmission information comprises first information used to send the downlink data, antenna port numbers indicated by the first information in the N pieces of downlink control information being different from each other or combinations that are of an antenna port number and a reference signal scrambling manner and that are indicated by the first information in the N pieces of downlink control information being different from each other.

17. The apparatus according to claim 15, wherein the transmitter is further configured to send the N pieces of downlink control information to the user equipment, and the N pieces of downlink control information comprise one or more of the following cases (1) and (2):

(1) the N pieces of downlink control information comprise first-format downlink control information and/or second-format downlink control information, wherein downlink data transmission information in the second-format downlink control information comprises downlink data resource element mapping information and quasi co-location indicator information, and the downlink data resource element mapping information and the quasi co-location indicator information are used to receive downlink data; and (2) downlink data transmission information in any one of the N pieces of downlink control information comprises network side device indication information of a network side device corresponding to the downlink control information.

18. The apparatus according to claim 15, wherein the transmitter is further configured to send to the user equipment, search space information of a downlink control channel of at least one second network side device in the N network side devices, wherein search space is a group of candidate control channel element sets, and is used by the user equipment to perform, in the control channel element set, blind detection on to-be-received downlink control information.

19. The apparatus of claim 15 wherein M is an integer greater than N.

* * * * *